(12) United States Patent
Siver et al.

(10) Patent No.: US 10,699,428 B2
(45) Date of Patent: Jun. 30, 2020

(54) VOLUMETRIC DEPTH VIDEO RECORDING AND PLAYBACK

(71) Applicant: BLINXEL PTY LTD, Victoria (AU)

(72) Inventors: Glen Siver, Victoria (AU); David Gregory Jones, Medway, MA (US)

(73) Assignee: BLINXEL PTY LTD, Victoria (AU)

( * ) Notice: Subject to any disclaimer, the term of this patent is extended or adjusted under 35 U.S.C. 154(b) by 91 days.

(21) Appl. No.: 15/766,697

(22) PCT Filed: Oct. 6, 2016

(86) PCT No.: PCT/AU2016/050938
§ 371 (c)(1),
(2) Date: Apr. 6, 2018

(87) PCT Pub. No.: WO2017/059490
PCT Pub. Date: Apr. 13, 2017

(65) Prior Publication Data
US 2019/0019303 A1    Jan. 17, 2019

(30) Foreign Application Priority Data

Oct. 6, 2015   (AU) ................................ 2015904066

(51) Int. Cl.
*G06T 7/521*        (2017.01)
*G06T 7/80*         (2017.01)
(Continued)

(52) U.S. Cl.
CPC .............. *G06T 7/521* (2017.01); *G01B 11/24* (2013.01); *G01S 13/08* (2013.01); *G01S 13/867* (2013.01);
(Continued)

(58) Field of Classification Search
CPC .. G06T 7/521; G06T 7/90; G06T 7/80; G06T 2207/10024; G06T 2207/10028;
(Continued)

(56) References Cited

U.S. PATENT DOCUMENTS

| | | | |
|---|---|---|---|
| 9,754,167 B1* | 9/2017 | Holz | .................. G06K 9/00671 |
| 2010/0278431 A1* | 11/2010 | Mathe | ................ G06K 9/00201 |
| | | | 382/190 |

(Continued)

OTHER PUBLICATIONS

Han, J. et al., "Enhanced computer vision with Microsoft Kinect Sensor: A review", IEEE Transactions on cybernetics 2013, vol. 43, No. 5, pp. 1318-1334.

(Continued)

*Primary Examiner* — Amandeep Saini
(74) *Attorney, Agent, or Firm* — Lee & Hayes, P.C.

(57) ABSTRACT

Embodiments generally relate to a machine-implemented method of automatically adjusting the range of a depth data recording executed by at least one processing device. The method comprises determining, by the at least one processing device, at least one position of a subject to be recorded; determining, by the at least one processing device, at least one spatial range based on the position of the subject; receiving depth information; and constructing, by the at least one processing device, a depth data recording based on the received depth information limited by the at least one spatial range.

13 Claims, 42 Drawing Sheets

(51) Int. Cl.
*G01B 11/24* (2006.01)
*G06K 9/22* (2006.01)
*G06K 9/00* (2006.01)
*G06T 7/246* (2017.01)
*H04N 13/344* (2018.01)
*G01S 17/89* (2020.01)
*G01S 13/08* (2006.01)
*H04N 13/271* (2018.01)
*H04N 13/189* (2018.01)
*G01S 13/86* (2006.01)
*G01S 17/08* (2006.01)
*G01S 15/08* (2006.01)
*G06T 7/90* (2017.01)

(52) U.S. Cl.
CPC .............. *G01S 15/08* (2013.01); *G01S 17/08* (2013.01); *G01S 17/89* (2013.01); *G06K 9/00201* (2013.01); *G06K 9/00369* (2013.01); *G06K 9/00671* (2013.01); *G06K 9/228* (2013.01); *G06T 7/251* (2017.01); *G06T 7/80* (2017.01); *G06T 7/90* (2017.01); *H04N 13/189* (2018.05); *H04N 13/271* (2018.05); *H04N 13/344* (2018.05); *G06T 2207/10024* (2013.01); *G06T 2207/10028* (2013.01); *G06T 2207/30196* (2013.01)

(58) Field of Classification Search
CPC .......... G06T 2207/30196; G06T 7/251; G06K 9/00369; G06K 9/00201; G06K 9/00671; G06K 9/228; G01S 17/08; G01S 17/89; G01S 13/08; G01S 13/867; G01S 15/08; H04N 13/344; H04N 13/189; H04N 13/271; G01B 11/24
USPC ......................................................... 382/154
See application file for complete search history.

(56) References Cited

U.S. PATENT DOCUMENTS

| | | |
|---|---|---|
| 2012/0306907 A1* | 12/2012 | Huston .............. G06K 9/00671 345/619 |
| 2012/0308115 A1 | 12/2012 | Sun |
| 2015/0249817 A1 | 9/2015 | Roelen et al. |
| 2016/0037152 A1* | 2/2016 | Kim ........................ G06T 7/593 348/47 |
| 2017/0249503 A1* | 8/2017 | Guo .................... G06K 9/00335 |
| 2018/0053309 A1* | 2/2018 | Maani ..................... G06T 7/251 |

OTHER PUBLICATIONS

PCT Search Report for corresponding International Application No. PCT/AU2016/050938 dated Feb. 2, 2017, 7 pages.
Zhang, C. et al., "Calibration between depth and color sensors for commodity depth cameras", Proc. IEEE EMBC (2011), pp. 1-6.

\* cited by examiner

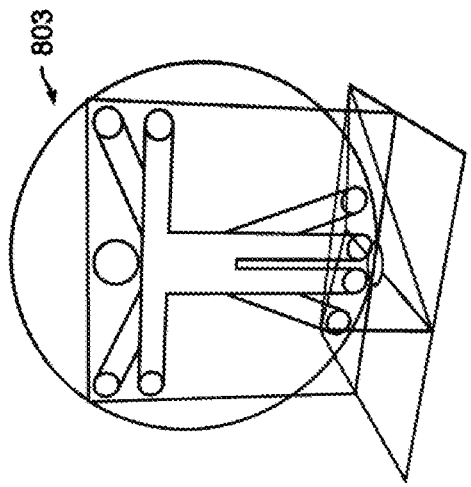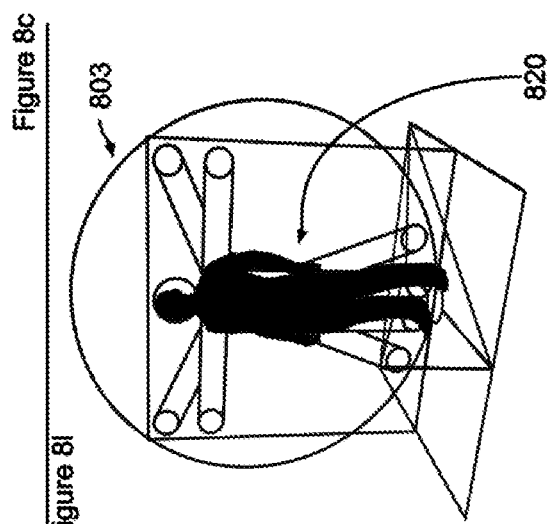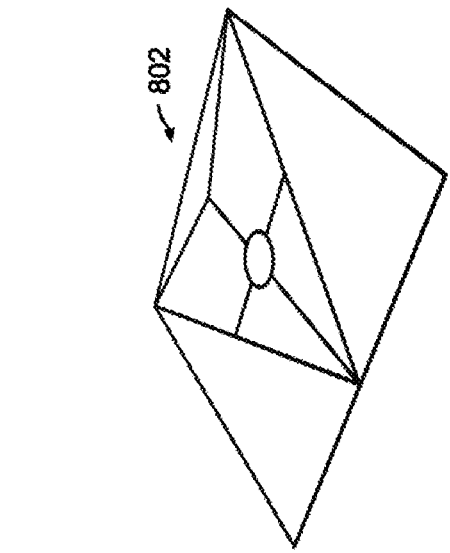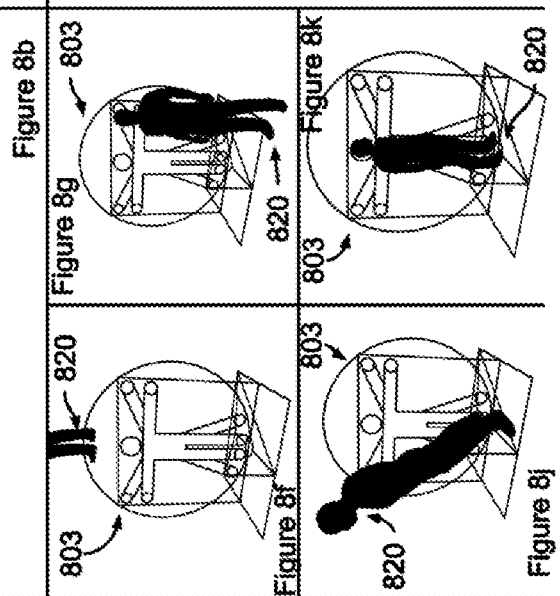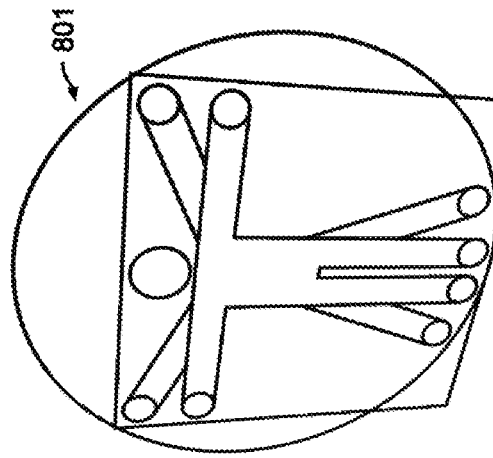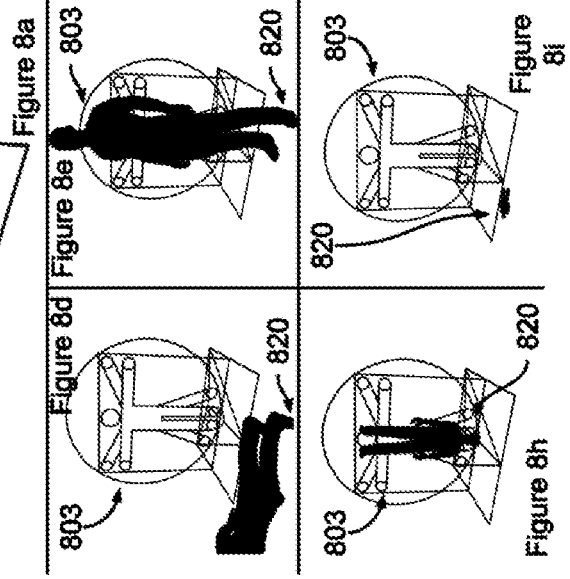
Figure 8

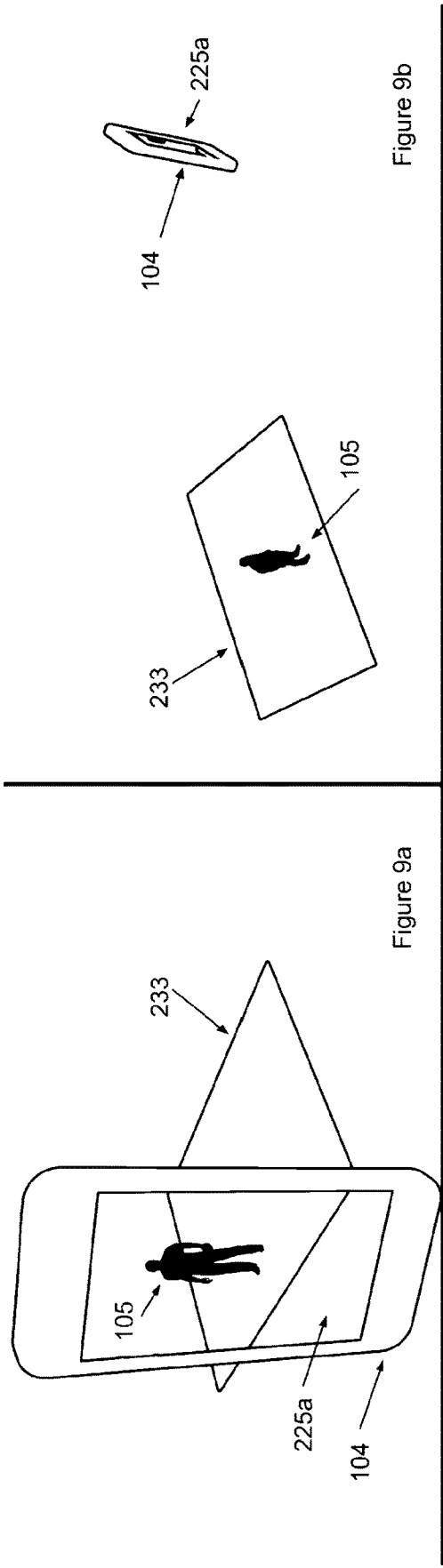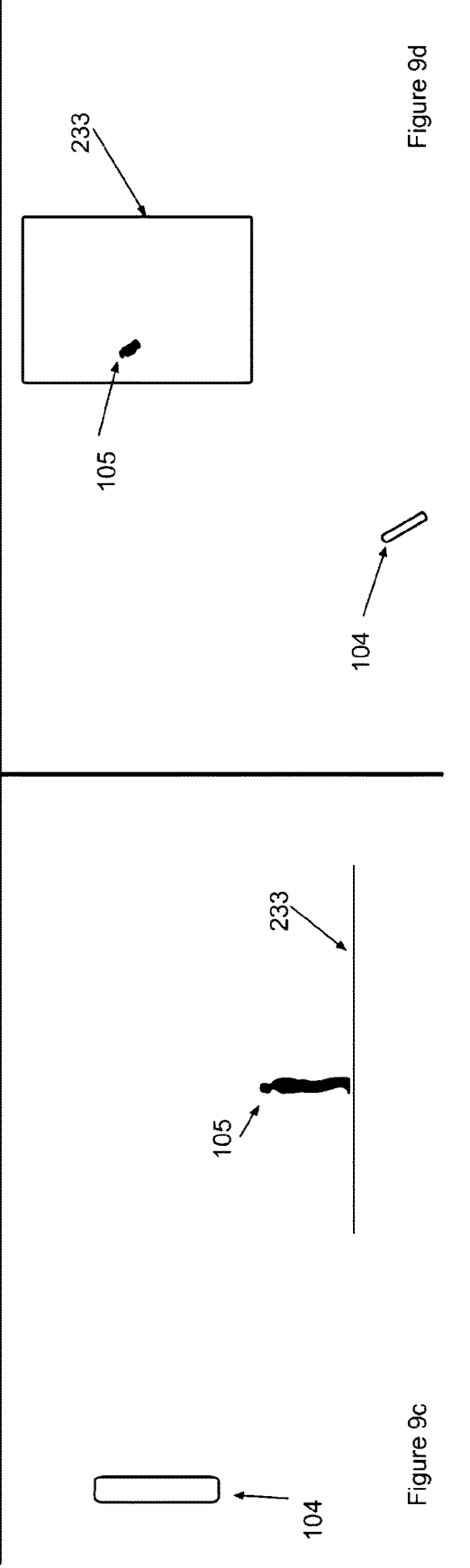
Figure 9

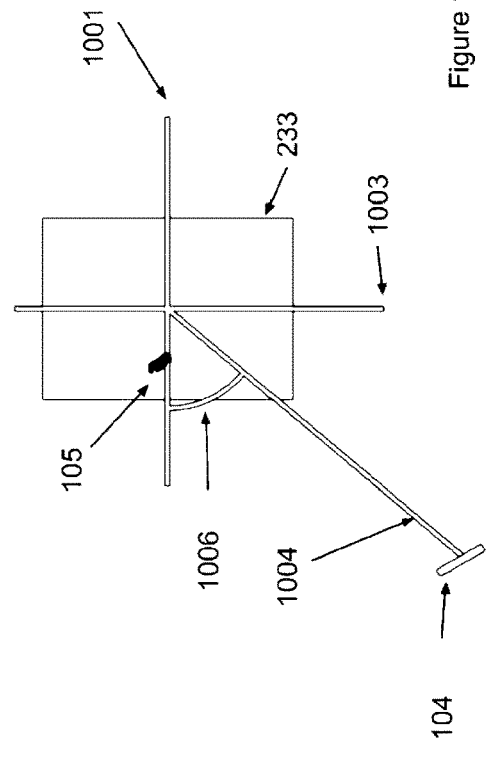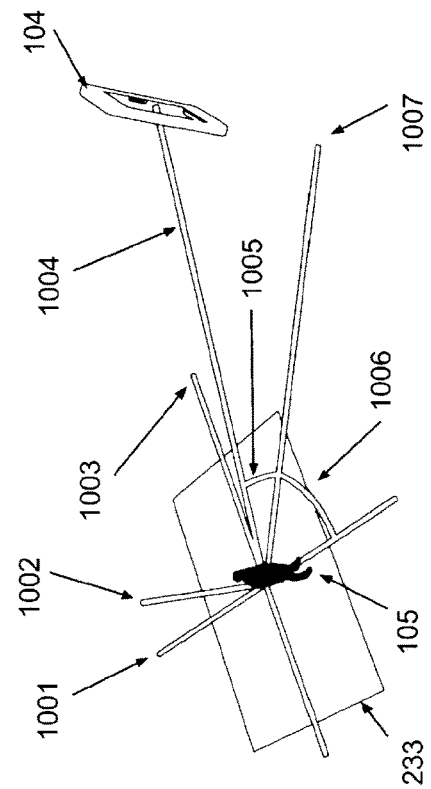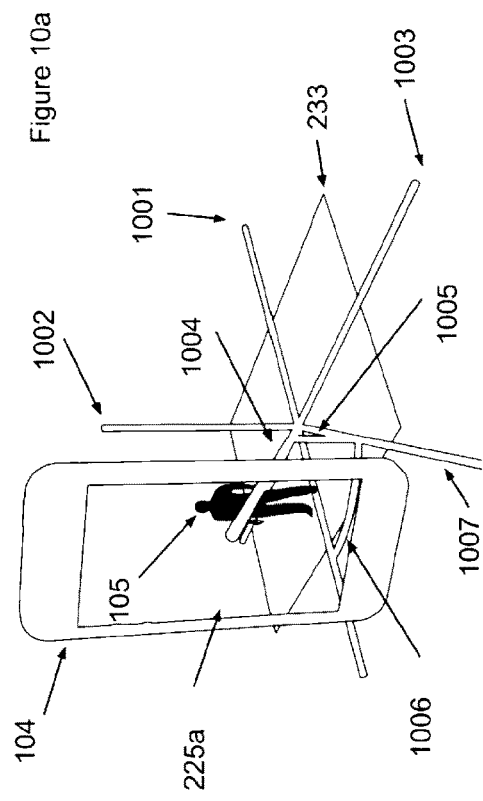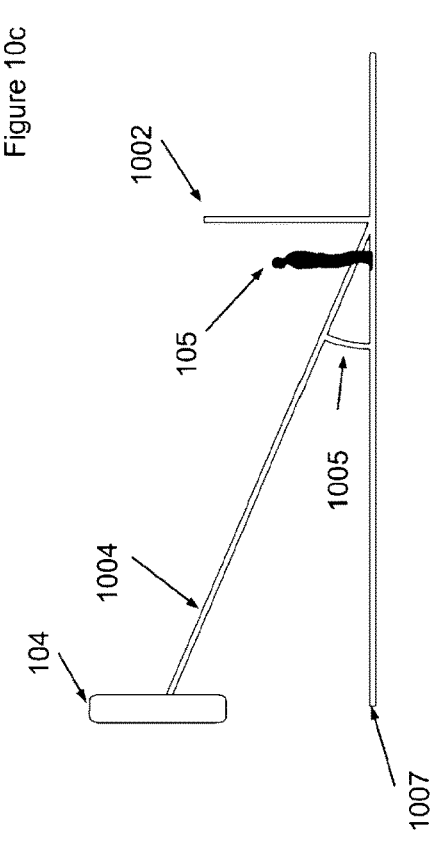
Figure 10

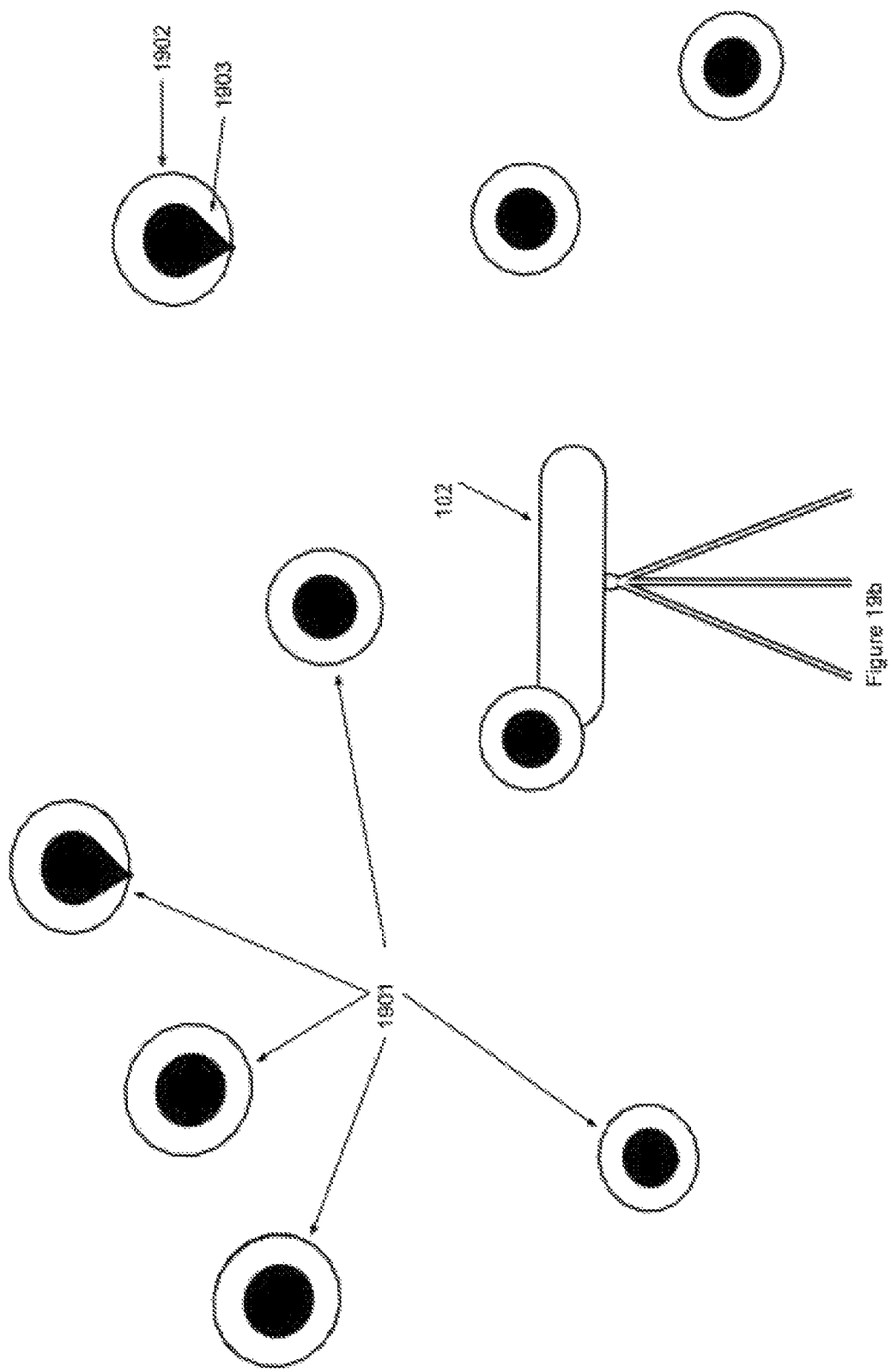

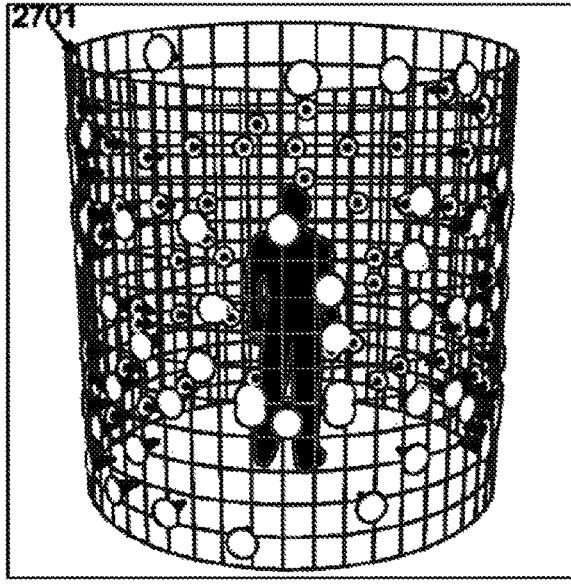
Figure 27a
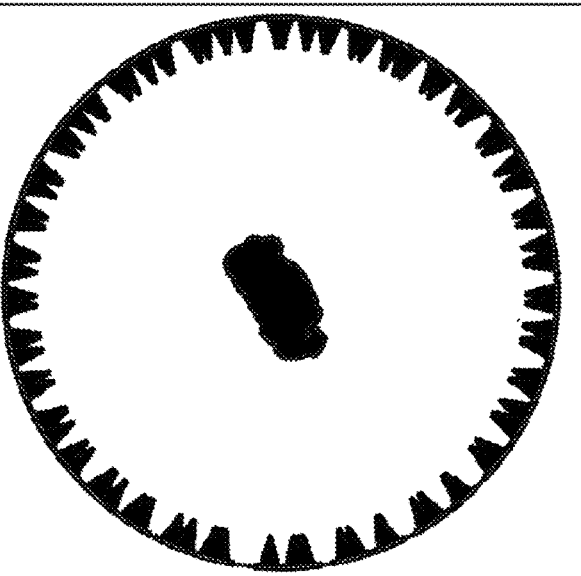
Figure 27b
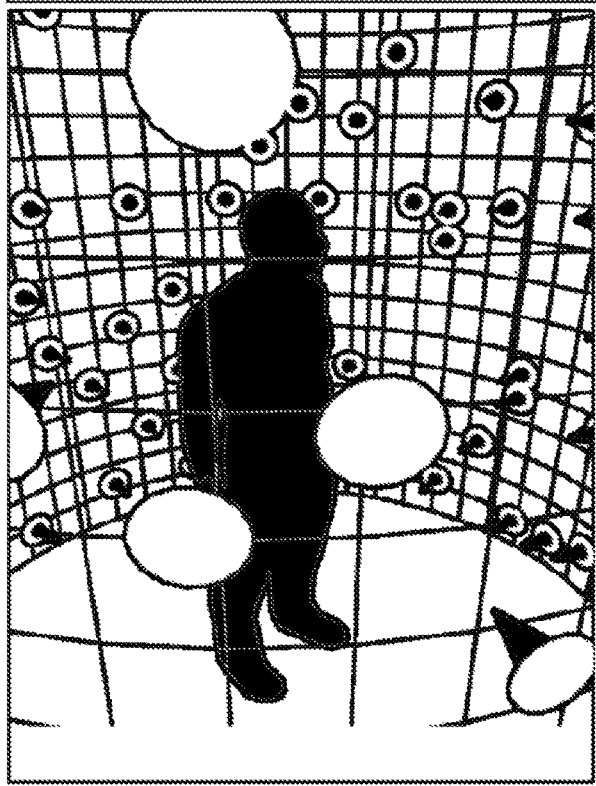
Figure 27c
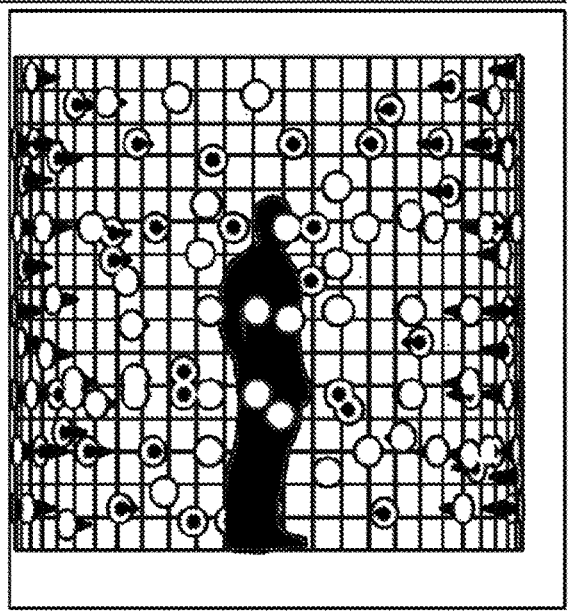
Figure 27d
Figure 27

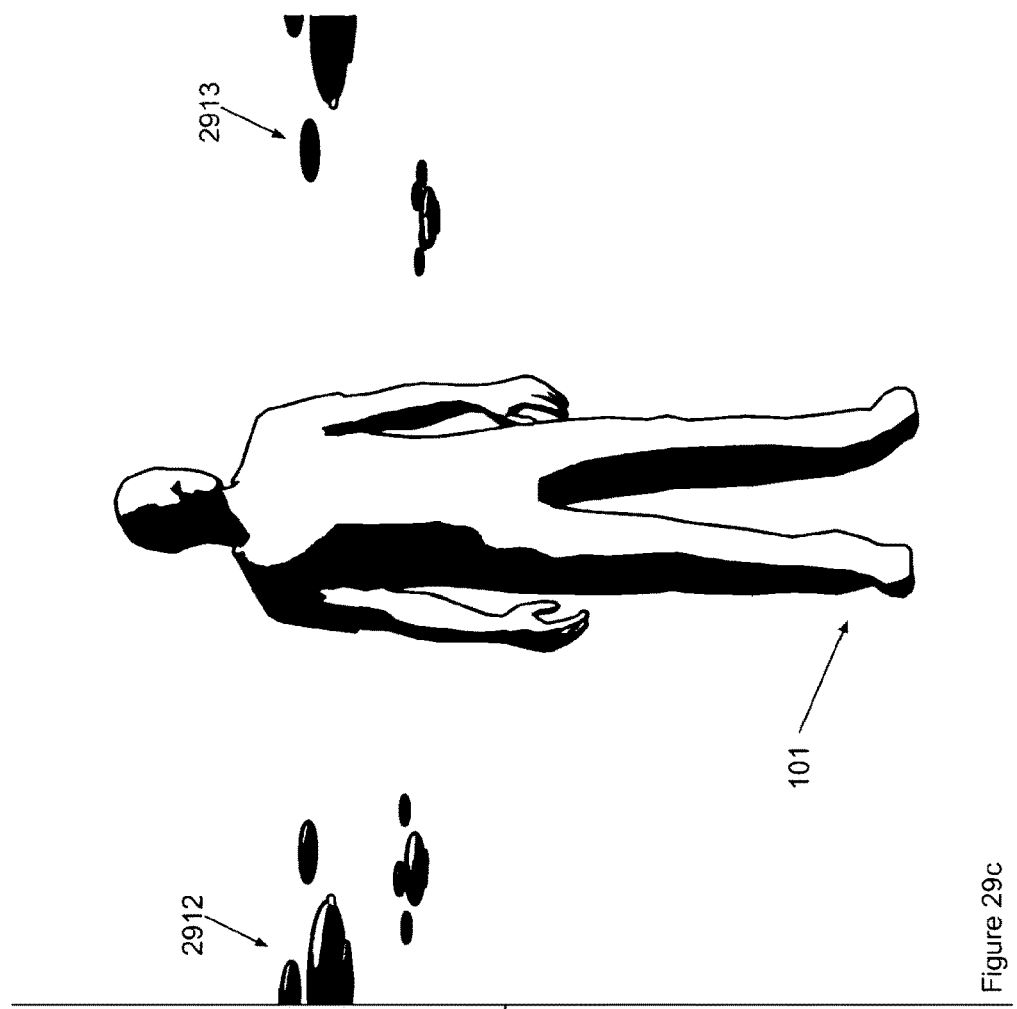
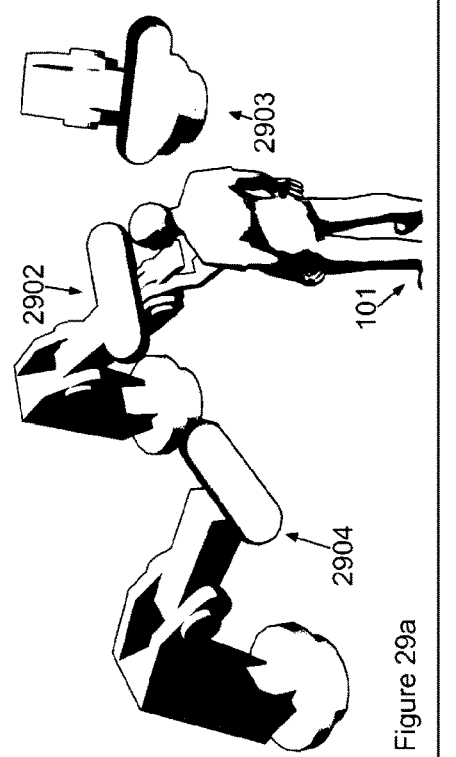
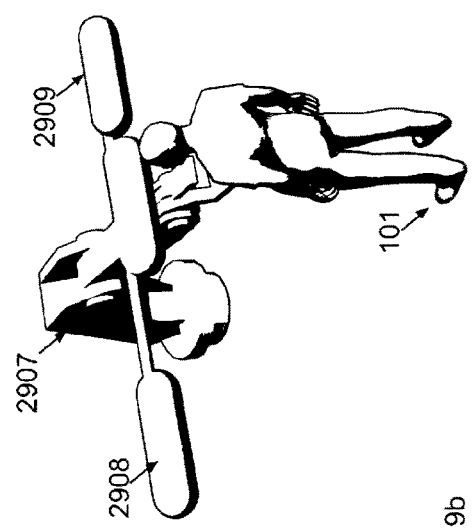
Figure 29a
Figure 29b
Figure 29c

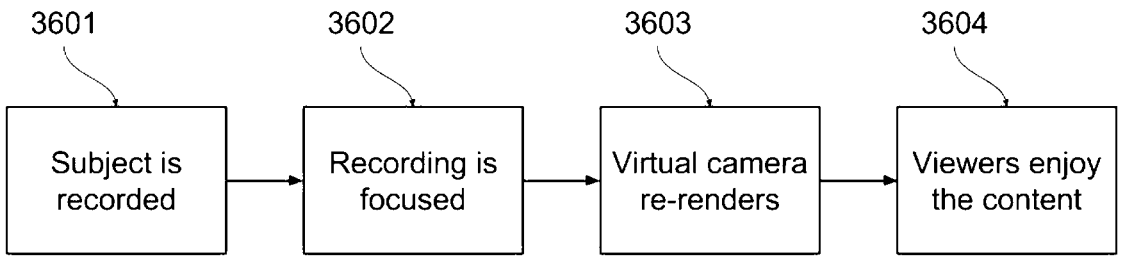
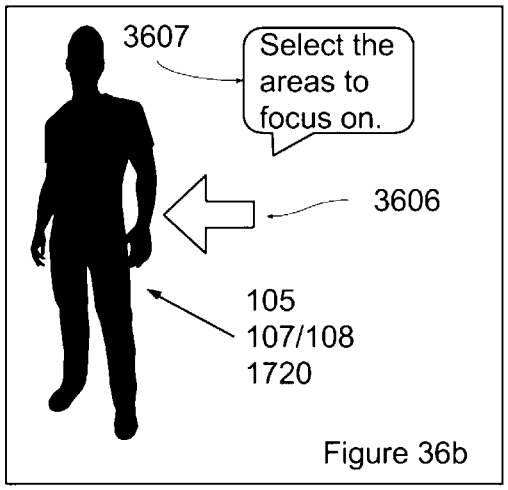
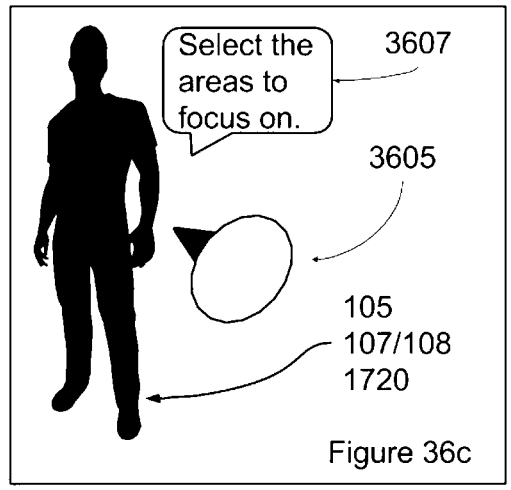
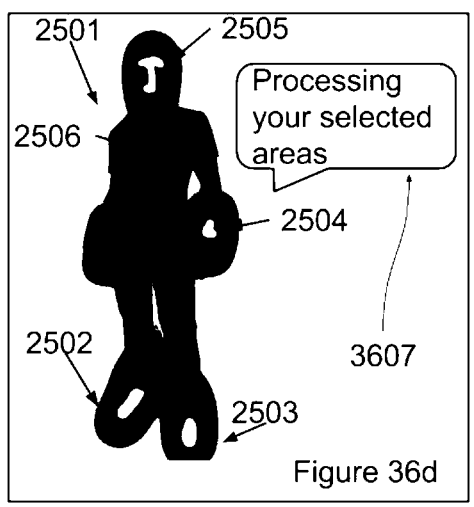
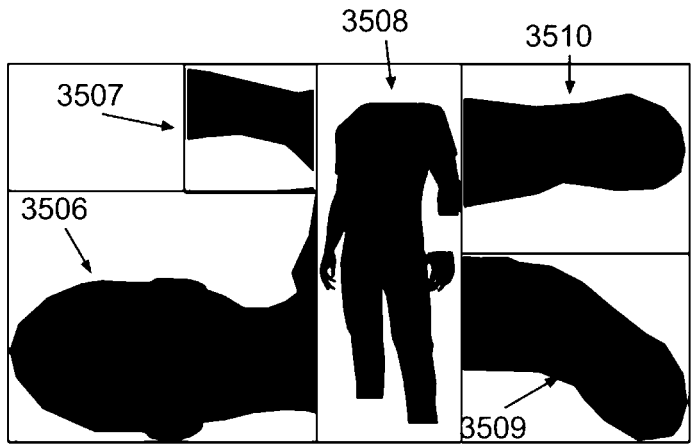
Figure 36

VOLUMETRIC DEPTH VIDEO RECORDING AND PLAYBACK

TECHNICAL FIELD

The invention relates generally to methods, devices and systems for creating and displaying three dimensional content. In particular, described embodiments are directed to: methods, devices and systems for reducing production complexity; recording the entire volume of a given subject; reducing data size, recording key analytical data from viewing devices; to methods, devices and systems for displaying a subject on devices of limited processing capacity; and displaying the key analytical data to performers or producers in real time or on demand in various formats.

BACKGROUND

In three dimensional modelling, many hours of highly skilled labour are required to produce content that is appealing and engaging, particularly to obtain realistic results. In the area of commercial three dimensional graphics, this cost and complexity is often a major focus and expense.

Automated modelling systems exist which attempt to process images through the application of image and feature recognition algorithms. Such techniques frequently exhibit processor intensive behaviours, and may be hampered by the need to clean up the automated results. Typically methods are targeted towards desktop playback, and are unsuited for mobile or embedded processors.

Capture techniques are generally judged by comparing production time, effort, data size, viewing platform demands and visual fidelity.

It is desired to address or ameliorate one or more shortcomings or disadvantages associated with prior systems for the production of real-time three dimensional content, or to at least provide a useful alternative to existing methods and systems.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a machine-implemented method of automatically adjusting the range of a depth data recording executed by at least one processing device, the method comprising: determining, by the at least one processing device, at least one position of a subject to be recorded; determining, by the at least one processing device, at least one spatial range based on the position of the subject; receiving depth information; and constructing, by the at least one processing device, a depth data recording based on the received depth information limited by the at least one spatial range.

Some embodiments may further comprise tracking the subject to determine an updated position of the subject; and adjusting the at least one spatial range based on an updated position of the subject.

The at least one spatial range may define at least one volume.

The at least one spatial range may be calculated based on a position of the subject and a predetermined buffer distance.

The buffer distance may be determined automatically. The buffer distance may be between 1 and 3 m. The buffer distance may be between 1.5 and 2 m.

The buffer distance may be selected by a user.

The method of any one of claims 1 to 8, further comprising configuring the processing device to accept user input, wherein the subject to be recorded is selected based on user input received by the processing device.

Some embodiments may further comprise displaying on a display of the processing device a user interface allowing the subject to be selected; wherein the subject to be recorded is selected using the user interface.

Some embodiments may further comprise the processing device displaying the subject to be recorded on the user interface in a visually distinguished form from any non-selected subjects shown on the display.

The position of the subject may be determined by the processing device using depth data.

The position of the subject may be determined by the processing device using data received from a positional tracker unit located on the subject.

A selected subject may be given an identification value and at least one identification feature of the subject is linked to the identification value.

The identification feature may be at least one of a shape, size, configuration, position or depth of the subject.

A body tracking module of the processing device may be configured to track the subject by examining a captured frame of the depth data recording, determining whether the frame contains any pre-determined identification features, and identifying the identification value of the subject linked to those identification features.

Some embodiments may further comprise storing the recorded data to memory.

Some embodiments may further comprise selecting a second subject, defining a second at least one spatial range corresponding to the second subject, and capturing depth information within the second at least one spatial range.

Some embodiment relate to a machine-implemented method of calibrating a depth recording executed by at least one processing device, the method comprising: displaying an alignment guide on a display of the processing device; and recording a volumetric video; wherein the alignment guide indicates a relative transformation, translation, rotation, and scale of the recording compared to a background scene in an augmented reality application.

The transformation may comprises at least one of a translation, rotation, scale, skew, oblique and perspective transformations.

The processing device may comprise a recording device.

Some embodiments may further comprise displaying on the display of the processing device a prompt, wherein the prompt encourages a user of the processing device to line up a subject of the recording with the alignment guide.

The alignment guide may comprise a two dimensional scale element, and a two dimensional rotate/translate element oriented perpendicularly to the two-dimensional scale element.

The scale element may show the relative scale of the content, decoupled from a background scene which the content is inserted against.

The rotate/translate element may show a relative rotation of the content, decoupled from a background scene which it may be inserted against.

The rotate/translate element may show the relative position of the content, decoupled from a background scene which it may be inserted against.

The alignment guide may comprise a three dimensional element.

Some embodiments relate to a machine-implemented method of calibrating a depth recording executed by at least one processing device, the method comprising: recording a volumetric video; and applying a perspective projection transformation to the recorded video; wherein the perspective projection transformation is configured to adjust the recorded video to compensate for lens distortion.

Some embodiments relate to a machine-implemented method of combining at least a first and second depth data recordings executed by at least one processing device, the method comprising: determining, by the processing device, a first viewing angle of a first depth data recording; determining, by the processing device, a second viewing angle of a second depth data recording; and generating a combined depth data recording comprising each of the first and second depth data recordings, wherein the visibility of each of the first and second depth data recordings within the combined depth data recording is determined by the processing device according to the first and second viewing angles.

Each depth data recording may comprise a plurality of depth data points.

The plurality of depth data points may be arranged into at least one set of plurality of depth data points that share a common viewing angle.

The visibility of the each of the first and second depth data recordings within the combined depth data recording may be altered by the processing device adjusting the display size of at least one of the plurality of depth data points.

The component of the virtual object may be viewed against a background image stream being captured by the processing device in real time.

The viewing angle of the component of the virtual object may be determined based on an angle between the processing device and a physical marker being captured by the processing device in real time.

The viewing angle of the component of the virtual object may be determined based on an angle between the processing device and a physical location being captured by the processing device in real time.

The visibility of the component of the virtual object is at a maximum when the viewing angle is at a normal to a capture angle of the component of the virtual object, and the visibility is at a minimum when the viewing angle is tangential to a capture angle of the component of the virtual object.

The component of the virtual object may be constructed based on depth data recorded by a depth data sensor of a subject, and wherein the capture angle of the virtual object is the angle of the depth data sensor to the subject.

The method may be performed for more than one component of the virtual object simultaneously.

The first depth data recording and the second depth data recording may be captured by a single depth data sensor, wherein the second depth data recording is captured based on depth data reflected from a surface.

Some embodiments relate to a machine-implemented method of tracking the viewing of three-dimensional content executed by at least one processing device, the method comprising: determining, by the processing device, at least one of a virtual viewing angle and a virtual viewing location of a viewing device relative to a piece of three-dimensional image content being displayed on the viewing device; and generating a virtual object in a virtual space to represent at least one of the viewing location and the viewing angle of the viewing device, the virtual object being configured for display on a display device, the display device being in communication with the processing device.

Some embodiments may further comprise determining at least one of a virtual viewing angle and a virtual viewing location of at least one further viewing device relative to a piece of three-dimensional content being displayed on the viewing device; and generating at least one further virtual object in a virtual space to represent at least one of the viewing location and the viewing angle of the at least one further device, the at least one further virtual object being configured for display on the display device.

Some embodiments may further comprise displaying any generated virtual objects in a virtual space shown on the display device.

The display device may be a wearable viewing device.

At least one of the virtual viewing angle and the virtual viewing location of the viewing device may be determined based on the relative position of the viewing device to a physical marker object being viewed by the viewing device.

The display of the virtual object on the processing device may be generated in real time as the virtual content is being viewed on the viewing device.

The virtual object may be displayed in virtual space on the processing device relative to a viewing location and a viewing angle of a sensor device to a physical marker object being viewed by the sensor device, wherein the sensor device is in communication with the processing device.

The virtual viewing location and a virtual viewing angle of the viewing device may be recorded over time.

The virtual object may comprise a location component, showing the virtual viewing location of the device relative to the piece of three-dimensional content.

The location component may have a disk-like shape.

The virtual object may comprise an angle component, showing the virtual viewing angle of the device relative to the piece of three-dimensional content.

The angle component may have a cone-like shape.

The virtual viewing location and the virtual viewing angle of each virtual object may be used to generate an overlay on the content being displayed on the processing device, the overlay being generated by the processing device based on a relative time spent by each virtual object in any virtual viewing location and virtual viewing angle.

Some embodiments may further comprise the processing device generating a hemispherical representation of the virtual viewing location and virtual viewing angle of each virtual object.

Some embodiments may further comprise the processing device generating a cylindrical representation of the virtual viewing location and virtual viewing angle of each virtual object.

Some embodiments may further comprise generating a virtual note for display, the virtual note being associated with the virtual object.

The content of the virtual note may be generated based on user input received by the viewing device.

Some embodiments may further comprise displaying the virtual note in a virtual space shown on the display device.

Some embodiments relate to a machine-implemented method of controlling a physical apparatus through interaction with a virtual environment executed by at least one processing device, the method comprising: determining at least one of a virtual viewing angle and a virtual viewing location of a device relative to a piece of three-dimensional content being displayed on the device; and controlling a movement of an apparatus based on the virtual viewing angle and the virtual viewing location of the device.

The physical apparatus may be a remote physical apparatus.

At least one of the virtual viewing angle and the virtual viewing location of the device may be determined based on the relative position of the device to a physical marker object being viewed by the device.

A movement of the viewing device relative to the physical marker may be translated to a movement of the apparatus relative to the three-dimensional content.

The apparatus may be a robotic arm.

The apparatus may be a remotely operated vehicle.

The apparatus may include a depth sensor device.

The apparatus may include two or more depth sensor devices.

The content displayed on the viewing device may be captured by at least one depth sensor device.

Some embodiments relate to machine-implemented method of generating three-dimensional content for display executed by at least one processing device, the method comprising: determining a virtual position of a virtual camera within a three-dimensional environment; creating a virtual recording of the three-dimensional environment from a viewing perspective defined by the virtual position of the virtual camera; and generating data points corresponding to three-dimensional content based on the virtual recording.

The virtual position of the virtual camera may be predetermined based on input from an operator.

The virtual position of the virtual camera may be determined in real time based on a virtual position of a viewing device within the virtual environment.

Some embodiments may relate to a machine-implemented method of rendering three-dimensional content for display executed by at least one processing device, the method comprising: determining a visual importance weighting for each of a plurality of components of a data set; adjusting content quality of each component based on the weighting; and storing each of the adjusted components in a modified data set.

Some embodiments may further comprise storing information with each modified image data set, the information allowing the image data stored in the image data set to be reconstructed.

The visual importance weighting may be determined based on input from an operator.

The visual importance weighting may be determined based on feedback from devices displaying the virtual content.

The visual importance weighting may be proportional to the number of viewing devices determined by the at least one processing device to be oriented to be viewing each component.

Adjusting the content quality may comprise adjusting at least one of the scale, compression amount, bitrate and container quality of the data set.

Some embodiments may further comprise displaying the modified data set, determining a visual importance weighting for each of a plurality of components of the modified data set; adjusting content quality of each component based on the weighting; and storing each of the adjusted components in a further modified data set.

Some embodiments may further comprise repeating the steps on the further modified data set for at least one additional iteration.

Some embodiments relate to a computer-readable medium storing executable program code that, when executed by a computer, causes the computer to perform any of the methods described herein.

Some embodiments relate to a system comprising: a processing device having memory and a processor; wherein the memory comprises the computer-readable medium mentioned above.

Some embodiments relate to a system comprising means for performing any of the methods described herein.

Some embodiments relate to a system for automatically adjusting the range of a depth data recording, the system comprising: a processing device having memory and a processor, the processing device being configured to determine at least one position of a subject to be recorded, determine at least one spatial range based on the position of the subject, receive depth information, and construct a depth data recording based on the received depth information limited by the at least one spatial range.

Some embodiments may further comprise a depth sensor, wherein the processing device is configured to receive depth information from the depth sensor.

Some embodiments relate to a system for calibrating a depth recording, the system comprising: a processing device having memory, a processor, and a display, the processing device being configured to display an alignment guide on the display, and record a volumetric video, wherein the alignment guide indicates a relative translation, rotation, and scale of the recording compared to a background scene in an augmented reality application.

Some embodiments relate to a system for calibrating a depth recording, the system comprising: a processing device having memory and a processor, the processing device being configured to record a volumetric video and apply a perspective projection transformation to the recorded video, wherein the perspective projection transformation is configured to adjust the recorded video to compensate for lens distortion.

Some embodiments relate to a system for combining at least a first and second depth data recordings, the system comprising: a processing device having memory and a processor, the processing device being configured to determine a first viewing angle of a first depth data recording, determine a second viewing angle of a second depth data recording, and to generate a combined depth data recording comprising each of the first and second depth data recordings, wherein the visibility of each of the first and second depth data recordings within the combined depth data recording is determined by the processing device according to the first and second viewing angles.

Some embodiments relate to a system for tracking the viewing of three-dimensional content, the system comprising: a processing device having memory, a processor and a display, the processing device being configured to determine at least one of a virtual viewing angle and a virtual viewing location of a viewing device relative to a piece of three-dimensional image content being displayed on the viewing device, and to generate a virtual object in a virtual space for display on the display of the processing device to represent at least one of the viewing location and the viewing angle of the viewing device.

Some embodiments relate to a system for controlling a physical apparatus through interaction with a virtual environment, the system comprising: a processing device having memory, a processor and a display, the processing device being configured to determine at least one of a virtual viewing angle and a virtual viewing location of the device relative to a piece of three-dimensional content being displayed on the device, and to control a movement of an apparatus based on the virtual viewing angle and the virtual viewing location of the processing device.

Some embodiments may further comprise a physical apparatus configured to be controlled using the processing device.

Some embodiments relate to a system for generating three-dimensional content for display, the system comprising: a processing device having memory, a processor and a display, the memory containing code executable to implement a virtual camera module, the processing device being configured to determine a virtual position of a virtual camera within a three-dimensional environment, execute the virtual camera module to create a virtual recording of the three-dimensional environment from the virtual position of the virtual camera, and to generating three-dimensional content based on the virtual recording.

Some embodiments relate to a system for rendering three-dimensional content for display, the system comprising: a processing device having memory, a processor and a display, the processing device being configured to determine a visual importance weighting for each of a plurality of image components of an image data set, scale an image resolution of each image component based on the weighting, and store each of the scaled image components in an image data set.

BRIEF DESCRIPTION OF DRAWINGS

Embodiments are described in further detail below, by way of example with reference to the accompanying drawings, in which:

FIG. 8 is illustrations of the guide that allows recording operators to easily judge the position, rotation and scale of the subject in relation to the marker;

FIGS. 8a, 8b, 8c illustrate example guides for position, rotation and scale;

FIGS. 8d, 8e, 8f, 8g, 8h, 8i, 8j, 8k illustrate incorrect alignment.

FIG. 8l illustrates correct alignment.

FIG. 9 shows the three necessary components of an Augmented Reality experience;

FIG. 10 is a diagram of the method for calculating the position and orientation of an Augmented Reality viewing device;

FIG. 19b illustrates an example of a performer's actual view including a depth sensor;

FIG. 27 shows a cylindrical mapping of viewer nodes for analysis;

FIG. 29a shows multiple remote robots with depth sensors mounted, surrounding a subject to gain different view directions on the subject;

FIG. 29b shows a single remote robot with multiple sensors mounted;

FIG. 29c shows a group of drones with sensors mounted on each one;

FIG. 36 shows the redistribution of portions of a frame of content based on the feedback from either an operator or the iterative viewer feedback process.

DETAILED DESCRIPTION

Figure 1:
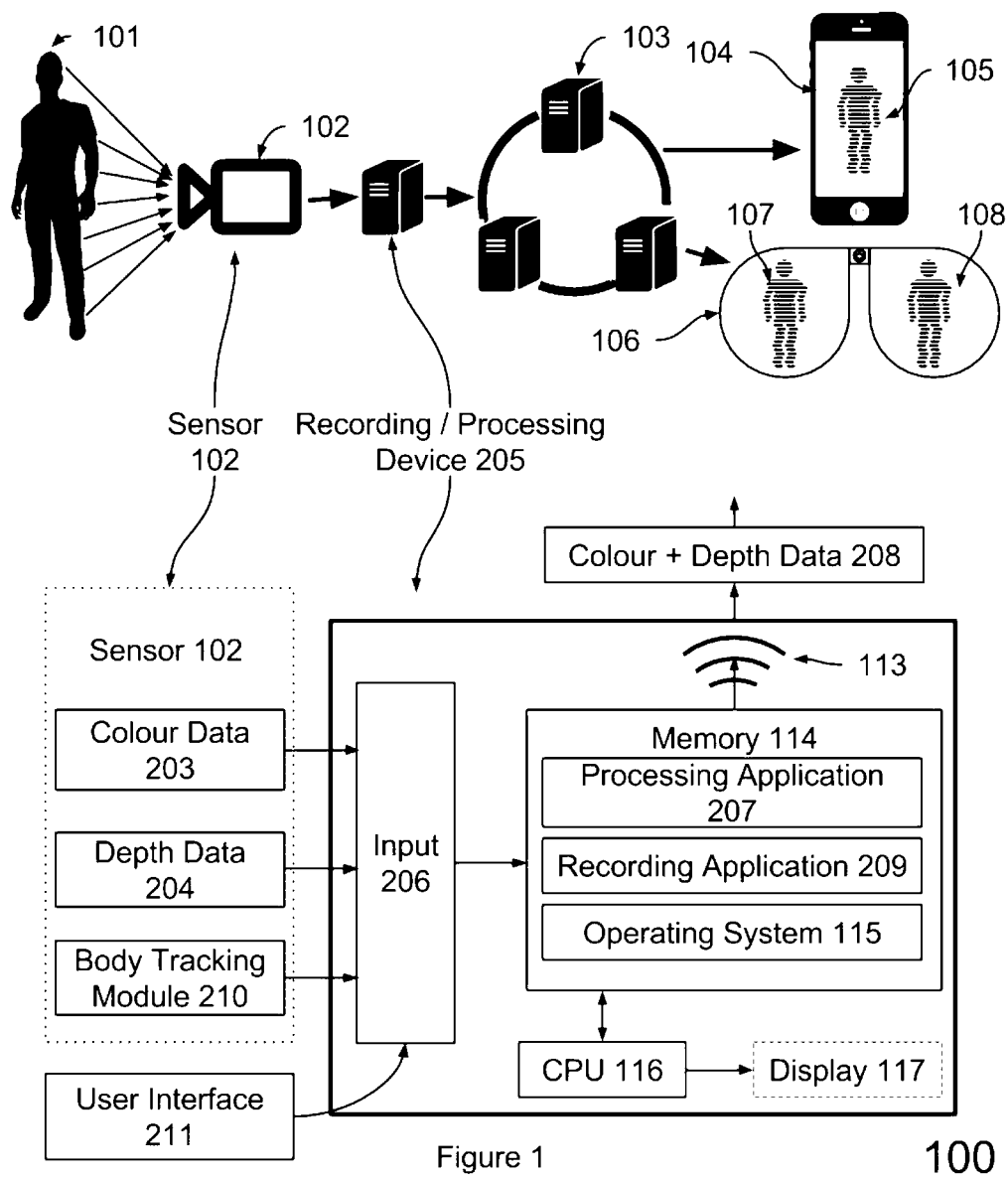
FIG. 1 is an overview of the steps involved in creating a volumetric video playback from a subject and displaying it on mobile or wearable devices, as well as a block diagram of a typical processing computer.

Embodiments relate generally to methods, devices and systems for the creation of volumetric video or assembled collections of volumetric video. Such embodiments may use depth cameras in combination with a subject for filming, and then displaying this volumetric video or assembled collection of volumetric videos as one or more point sets on mobile devices or desktop devices. The display may be via Augmented Reality or Virtual Reality. Some embodiments focus on ensuring that the result is an accurate reproduction of the look and shape of that original subject.

In particular, embodiments relate to:

Hardware and software tools used to record a subject through the medium of colour and depth information recorded from a single sensor, Hardware and software tools used to record a subject through the medium of colour and depth information recorded from an array of two or more sensors used in such a way as to increase the coverage of the subject, Hardware and software tools that allow colour and depth sensors to be mounted on remotely operated manipulators, vehicles, drones or other manually controlled, semi-autonomous or fully autonomous devices, Software tools that optimise the recording of the desired subject at the exclusion of unwanted content, Software tools that guide the recording operator through a calibration process that ensures correct placement of the subject, Hardware and software systems that display this colour and depth data as a volumetric video on a mobile device, Software tools that create a point set which is deformed by the volumetric video dataset at a viewable frame rate, Software tools that allow multiple volumetric video point sets to be assembled and displayed on device, so that assembled components resemble the original subject from multiple angles, Software tools that allow interested parties access to the positional and orientation data of a viewer's device at run time, Software tools that allow interested parties access to the positional and orientation data of a viewer's device for offline processing, Software tools that allow for one or more party to share access to the positional and orientation data of a viewer's device at run time or for offline processing, Software tools that feedback to the performer the positional and orientation data of a viewer's device at run time, Software tools that feedback to a third party the positional and orientation data of a viewer's device at run time, Software tools that allow one or more viewer to place notes on volumetric video content and to share those notes with others over a network, Software tools that aggregate and display the positional and orientation data of any number of viewer's devices at run time, or for offline analytics, Various optional display options for the analysis of viewer positions and orientations, as well as viewer times, points of interest and other activities, Software tools that process recorded colour and depth data for rapid online distribution, Software tools that process colour and depth information captured from an array of sensors into a single colour and depth information set through the application of virtual cameras, Software tools that feedback viewer positional and orientation data into a virtual camera to ensure that the virtual camera captures only the points of interest to the viewers, Software tools that record viewer positional and orientation data for offline processing into a virtual camera for re-rendering.

Overview

Human's visual perception becomes three dimensional when the two different two-dimensional images gathered by our eyes are blended together in the brain. The result is the depth perception humans use to understand spatial relationships just by sight.

When making a visual recording of a person, object or place, two dimensional media require humans to interpret the spatial relationships between aspects of the image or video. This interpretation is often ambiguous, and requires special photographic vocabulary to ensure that the scene is visually interpretable with as little effort on the part of the viewer as possible.

Creating a recording of a subject that is truly three dimensional, and allowing the viewer to perceive it as three dimensional removes this need for interpretation and allows any recording to be immediately digestible at an instinctive level.

Modern mobile phones and wearable interfaces offer a platform to view three dimensional content. Three dimensional games, maps and other content already exist to be consumed on these platforms. However the generation of these forms of content requires large budgets and large technological foundations.

A system that would allow anyone with minimal technical competence to create three dimensional content to be consumed on existing mobile and wearable devices is described below.

Referring generally to FIG. 1, a block diagram 100 of a recording, distributing and playback process for three dimensional content is shown, having a subject 101 to be recorded, a sensor 102 (shown in FIG. 2c) to record information, a recording/processing device 205, a processing network 103, which may comprise a file distribution network, and a mobile viewing device 104 or wearable eyewear device 106 for playing back the captured three dimensional content.

Mobile device 104 is configured to display content 105. Content 105 may be superimposed onto a stream of images captured in real time by a sensor 216 (shown in FIG. 2) of device 104 or 106, which may be a camera in some embodiments. Content 105 may be aligned to a marker 233 (shown in FIG. 2b) which may be a visual marker in the stream of images captured by sensor 216. Marker 233 may be a pattern, image, or other recognizable object that may be preconfigured to be recognized by player application 221(a/b) (shown in FIG. 2) running on device 104 or 106. In some embodiments, displayed content 105 may be aligned to features of the real world, as measured and defined through alternate tracking technologies, such as markerless feature detection, radio, GPS, or external camera tracking, or other similar position determining techniques, by themselves in conjunction with internal sensors such as accelerometers, magnetometers, and gyroscopes.

Subject 101 may be a person, an animal, an object or some other thing or place. Subject 101 may be an animate or inanimate object, a device or any other kind of element. Sensor 102 may comprise a camera or other image or data capturing sensor, which may capture image data including colour data 203 and depth data 204, also known as volumetric data. The data may be captured as a series of still images or frames. In some embodiments, sensor 102 may further capture additional data such as sound data or heat data. While the described embodiments relate to a depth sensor, in some other embodiments the sensor may be any sensor that can detect aspects of its surrounding environment. A depth sensor may use light, sound, lasers or other methods to detect the distance of objects from the sensor. In some embodiments, sensor 102 may comprise multiple sensors, such as a first sensor for capturing colour data, and a second sensor for recording depth data. In some embodiments, sensor 102 may comprise an array of sensors, such as two or more devices arrayed in such a way as to surround a subject and gather data from multiple angles at once. Therefor reference herein to sensor 102 is intended to include multiple sensor.

Colour data 203 may be captured by sensor 102 in conformance with a predetermined colourspace, where a colourspace is a format or model used for describing the way in which colours can be numerically represented within colour channels, and for describing how the colour information of specific channels is to be arranged. One type of colourspace is an index colourspace scheme, where a numerical index is used to represent each colour from a pre-determined set of colours as a number. The number corresponding to the required colour in the index is used in place of the colour in the image being stored.

Colourspaces that use an index having no relationship to the psycho-visual or physical colour may be called hybrid colourspace schemes. When using hybrid colourspaces, image storage methods that divide the image into blocks before storing them may use two or more reduced size channel representations and an index scheme to blend between the two or more channel representations (JPEG and DXT compression methods, for instance, do this).

For example, S3 Texture Compression (S3TC) uses two 24-bit colours per 4×4 block of pixels, which it blends on a pixel-pixel basis using two bits (0-3) for each of the sixteen pixels in the block. This effectively means that each 4×4 block uses four distinct colours and is represented with five bits per pixel (being (24+24)/16 bits for the block, plus 2 bits), as opposed to 24 bits per pixel normally. In this model, the two bits are the indexed scheme, and the two 24-bits are a reduced scheme.

Another way of considering this is that each 4×4 block is reduced to two pixels, and another sub-image controls the blending. The blending image is a full-size grainy representation of the image, and the colour image is a reduced scale mosaic that gets blended. Modern formats like PowerVR Texture Colour Format (PVRTC) apply this more literally, storing two half scale PNG images and a blending guide, allowing for very small file sizes (1-2 bits per pixel).

Using a hybrid colourspace allows the various channels to save data space by each using a specific and reduced colourspace, while closely preserving numerical accuracy.

Data captured by sensor 102 is passed, typically via physical connection, though sometimes stored separately and transferred, to recording/processing device 205. Recording/processing device 205 may contain an input module 206, memory 114, a CPU 116, display 117, and a network connection module 113. In some embodiments, device 205 may also contain sensor 102. In some embodiments, device 205 may be made up of multiple processing devices. In some embodiments, device 205 may be made up of computer program code running multiple local networked computers. In some embodiments, device 205 may be made up of computer program code running multiple remote networked computers. In some embodiments, sensor 102 may include a CPU and may be a processing device that is part of device 205.

Input module 206 may handle operator or audience input coming into recording/processing device 205, which may be provided through a number of input devices 211 including touch screens, keyboards, electronic mice, buttons, joysticks, or other input devices. Any data input received through recording/processing device input 206 module is stored in memory 114 until it is called upon by CPU 116 for processing in the processing application 207.

CPU 116 may have access to memory 114 via one or more buses (not shown) which may be wire or optical fibre buses in some embodiments, and may be arranged to facilitate parallel and/or bit serial connections. Memory 114 may include one or more memory storage locations, which may be in the form of ROM, RAM, flash, or other memory types. Memory 114 may store program code executable by CPU 116, which may include an operating system 115 and a processing application 207. As program code is executed by CPU 116, CPU 116 may write to and read from memory registers internal to CPU 116 (not shown) to perform intermediate calculations and store temporary data. Recording/processing device 205 may have one or more buses (not shown) to facilitate the transfer of data signals between components. The buses may be wire or optical fibre buses in some embodiments, and may be arranged to facilitate parallel and/or bit serial connections.

Executing processing application 207 on CPU 116 may cause display 117 to show data in the form of a user interface. CPU 116 may be one or more data processors for executing instructions, and may include one or more of a microcontroller-based platform, a suitable integrated circuit, a GPU or GPUs or other graphics processing units, and one or more application-specific integrated circuits (ASIC's). CPU 116 may include modules such as an Algorithmic Logic Unit (ALU), Floating Point Units (FPU), or Single-instruction multiple data units (SIMD) for mathematical and/or logical execution of instructions, such operations performed on the data stored in the internal registers. Display 117 may be a liquid crystal display, a plasma screen, a cathode ray screen device or the like, and may comprise a plurality of separate displays. In some embodiments, display 117 may include a head mounted display (HMD) or other wearable device 106.

Data output by recording/processing device 205 is passed to processing network 103 via network connection module 113. Network connection module 113 may include and supporting executable code to enable it to communicate with processing network 103 via a wireless communication protocol, such as WiFi or Bluetooth, or a wired communication protocol such as Ethernet, for example. In some embodiments, processing network 103 may be a single processing device, such as a desktop or laptop computer or a networked group of computer processing devices. In some embodiments, processing network 103 may include one or multiple tablet or handheld computing devices. In some embodiments, processing network 103 may include a server or server system, or a number of virtual and/or dedicated servers cooperating and in communication over a network. Processing network 103 acts as a distribution network or node to distribute recorded image (colour and depth) data of subject 101 to mobile device 104 or wearable device 106. In this respect, the processing network 103 may comprise the Internet and cloud-based processing systems.

Device 205 may process colour data 203 and depth data 204 to produce combined colour and depth data 208. Once processed by device 205, the combined colour and depth data 208 is passed to viewing device 104 or viewing device 106 via network 103. Viewing device 104 may typically be a mobile phone or mobile entertainment device. In some embodiments, a wearable viewing device 106 may be used, which may be a head-mounted display (HMD). In some embodiments, viewing device 104 may be a computer monitor, television screen, movie screen or some other image viewing mechanism. Viewing device 104 may an integrated part of processing network 103, or viewing device 104 may be a standalone device.

Processed, displayed content 105 appears on viewing device 104. This is the rendered, volumetric result of the process executed on processing network 103. As viewing device 104 is a single display device, displayed content 105 is a single image.

Processed content 107 and 108 appear on viewing device 106. This is the rendered, volumetric result of the process executed on processing network 103. As viewing device 106 is a dual display device, content 107 is rendered from the perspective of one eye, while content 108 is rendered from the perspective of the other eye.

In some embodiments, mobile device 104 or wearable device 106 may be a desktop computer, laptop computer, tablet or other stationary or mobile computing device.

Figure 2A:
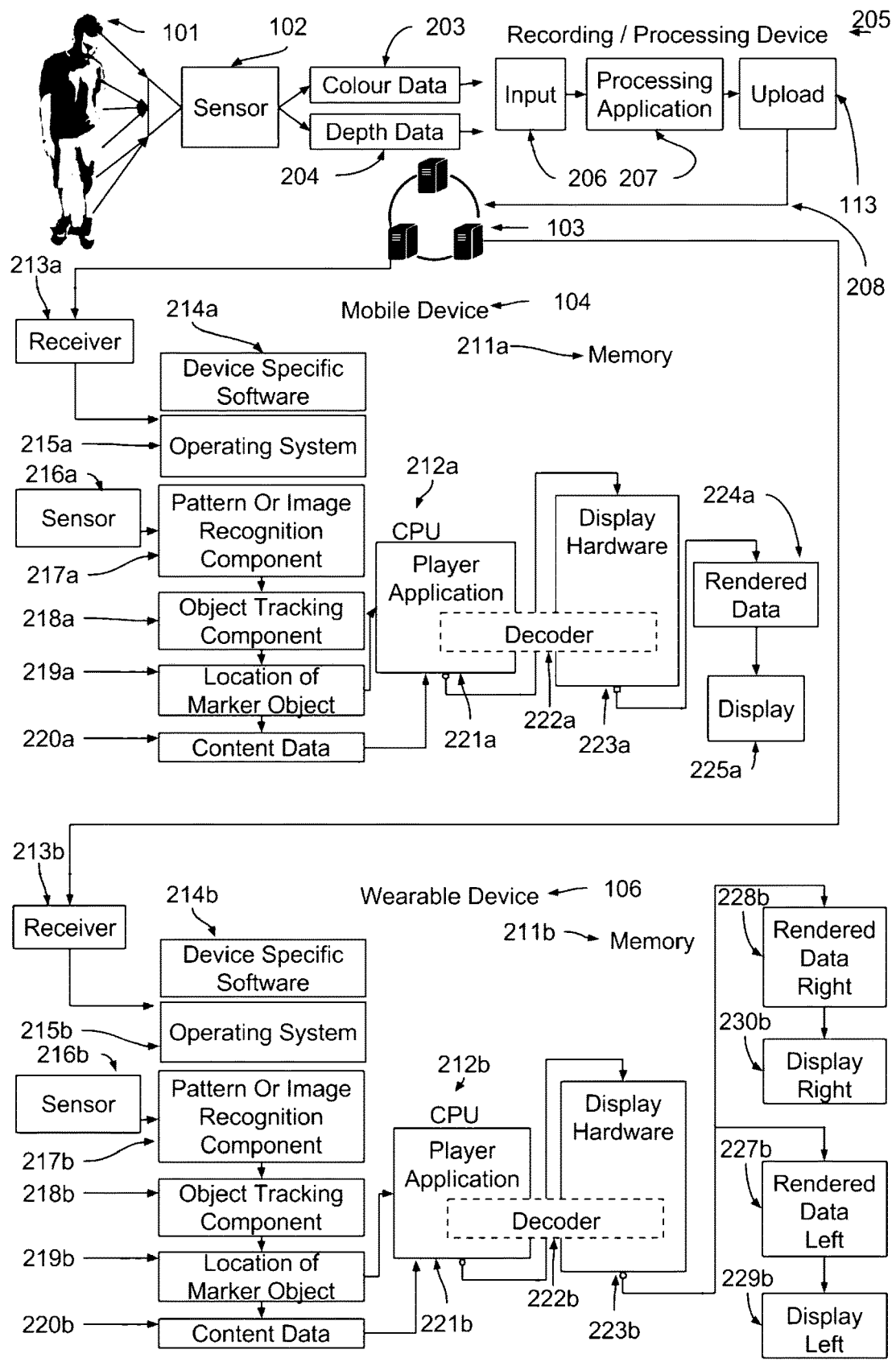
FIG. 2a is a block diagram of the systems that record, encode, upload, distribute, download, process and finally display the three dimensional reproduction of a human subject on a mobile or wearable device.
Figure 2B:
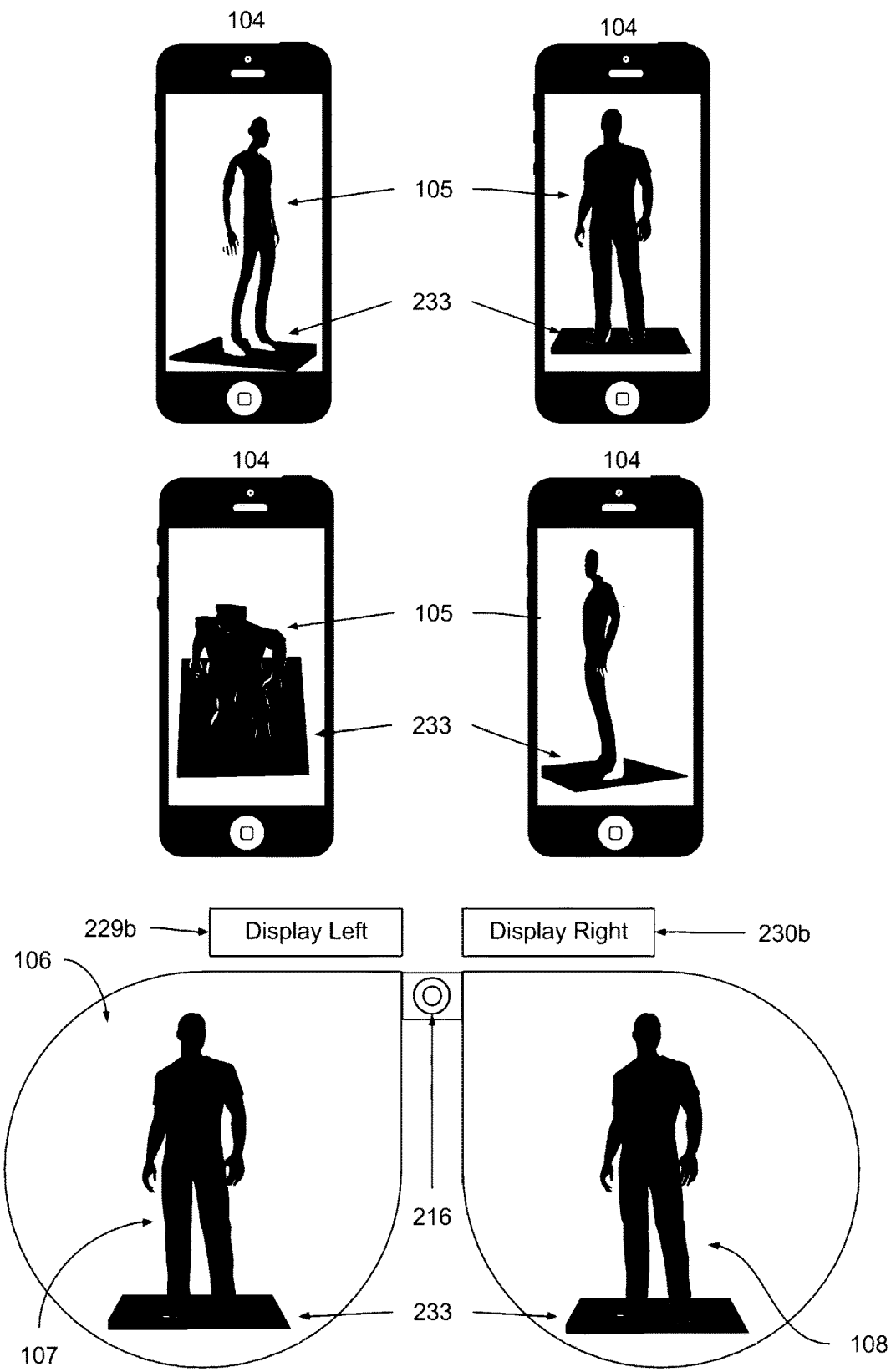
FIG. 2b is an illustration showing the appearance of reconstructed three dimensional content on a typical mobile device and on a typical wearable eyewear device.
Figure 2C:
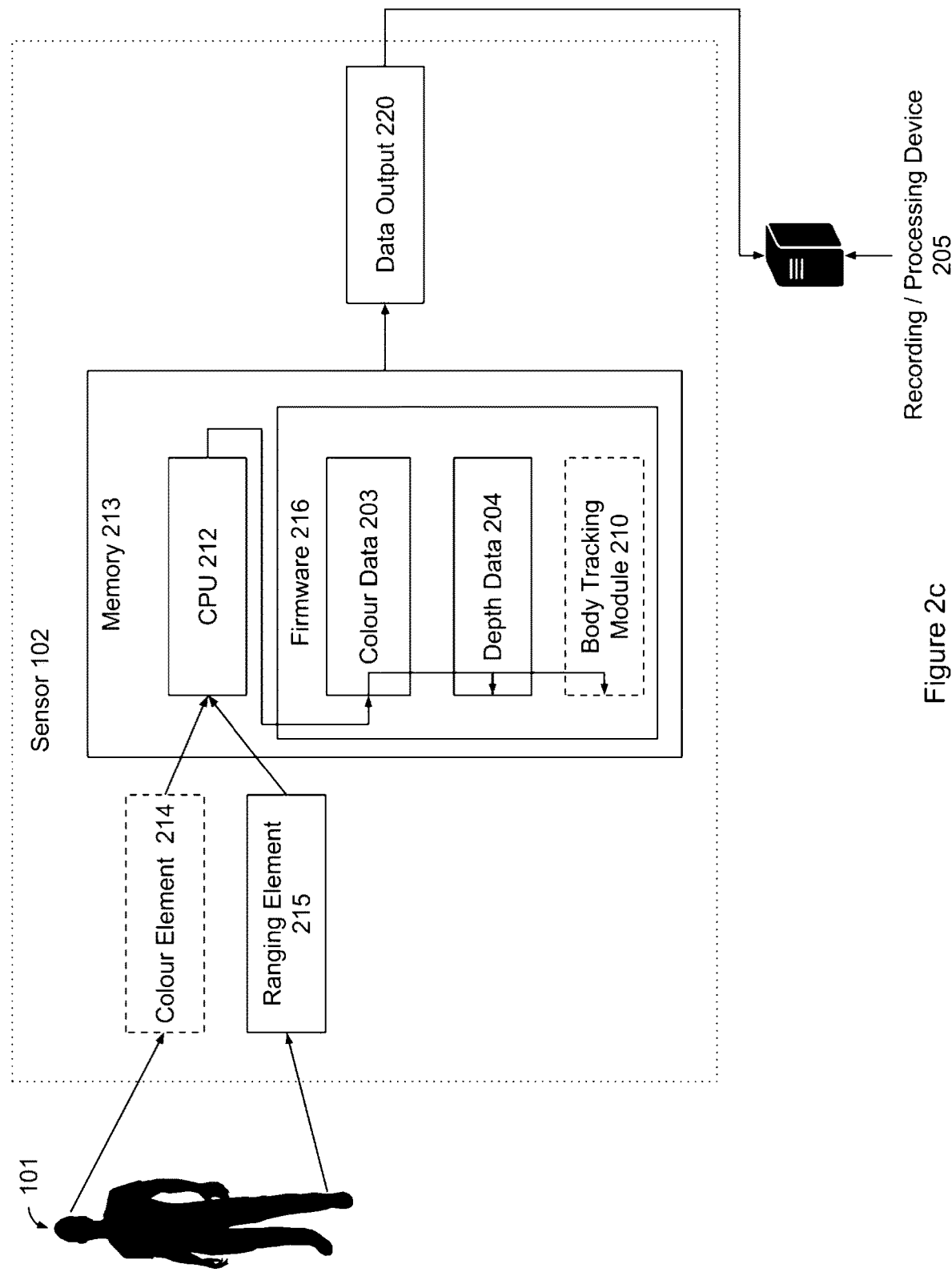
FIG. 2c is a block diagram depicting the modules and functions of a sensor which detects depth and optionally colour.

Referring generally to FIG. 2, 2*b*, 2*c*, a block diagram showing how colour and depth recording may be distributed to a device display is shown.

As shown in FIG. 2*c*, sensor 102 contains ranging element 215 and optional colour element 214. Ranging element 215 detects the distance from the sensor 102 to subject 101. The technique, resolution and accuracy of the data gathered depends on the technology used to detect the distance. Options include Patterned Light, Time of Flight, Viewpoint Parallax, LIDAR, SONAR, RADAR or other physical-world detection methods.

Ranging element 215 may be physically mounted within sensor 102, or it may be an external ranging element relaying data to a computer, laptop, handheld device or other computing device through a wired connection, a wireless connection, a local or remote network connection or any other data transmission method.

Colour element 214 may be a CMOS sensor CCD sensor or any other kind of image sensing technology.

Colour element 214 may be physically mounted within sensor 102, or it may be an external ranging element relaying data to a computer, laptop, handheld device or other computing device through a wired connection, a wireless connection, a local or remote network connection or any other data transmission method.

Once registered by any combination of the colour element 214 and/or the ranging element 215, the data is stored in memory 213, before it is passed to the CPU 212 of the sensor 102. The CPU 212 uses firmware 216 stored in memory 213 to separate the colour data 203 and the depth data 204.

In some embodiments, a body tracking module 210 may exist. Body tracking module 210 may be designed to track human forms, or other animate or inanimate objects. Body tracking is further discussed in Automated Subject Tracking in Depth Recording.

Once the sensor 102 has captured the incoming data and processed it the data is output 220 to the recording/processing device 205 via input 206 to processing application 207 where both colour 203 and depth 204 data types are combined into a single colour and depth data type 208. This process of combining colour and data may be performed according to the method described in patent application PCT/AU2016/050625, the entire contents of which is hereby incorporated by reference. Alternatively, the process of combining colour and depth may be performed according to other methods that would be known to a person skilled in the art. Recording/processing device 205 then uploads the colour and depth data 208 to the processing network 103 via network connection module 113.

Sensor 102 may be configured to send the stored data to recording/processing device 205 via a physical wired connection, using a USB or Ethernet protocol, for example, or via a wireless communication means, such as using Wi-Fi or Bluetooth. In some embodiments, data transfer may be initiated through sensor 102, which may include a user interface that allows a user to select a destination for data transfer. In some other embodiments, data transfer may be initiated by recording/processing device 205 sending a data transfer command to sensor 102.

In some embodiments, data other than colour or depth may be gathered by sensors 102. Heat, radiation, sound, wind speed and many other kinds of data may be gathered for processing by processing device 205.

When a viewer wishes to view displayed content 105 on their mobile device 104 (shown in FIG. 2b) they download the recorded and processed data from processing network 103. Mobile device 104 (shown in FIG. 2b) may contain an input module or receiver 213a, memory 211a, a CPU 212a, a display 225a and a decoder 222a. Mobile device 104 (shown in FIG. 2b) may have an inbuilt sensor 216a, which may be a camera in some embodiments. In some embodiments, sensor 216a may be independent of mobile device 104 (shown in FIG. 2b), and may communicate with mobile device 104 (shown in FIG. 2b) via a wired or wireless connection. Receiver 213a may handle user input to mobile device 104 (shown in FIG. 2b). CPU 212a may have access to memory 211a via one or more buses (not shown) which may be wire or optical fibre buses in some embodiments, and may be arranged to facilitate parallel and/or serial connections. Memory 211a may include one or more memory storage locations, which may be in the form of ROM, RAM, flash or other memory types. Memory 211a may store program code executable by CPU 212a, which may include an operating system 215a, device specific software 214a and a player application 221a. Memory 211a may also store software modules such as pattern or image recognition module 217a and object tracking module 218a, described in further detail below. Memory 211a may also store data such as marker 233 location data 219a and content data 220a, described in further detail below.

As program code is executed by CPU 212a, CPU 212a may write to and read from memory registers internal to CPU 212a (not shown) to perform intermediate calculations and store temporary data. Executing program code may cause display 225a to show data in the form of a user interface. CPU 212a may be one or more data processors for executing instructions, and may include one or more of a microcontroller-based platform, a suitable integrated circuit, a GPU or other graphics processing units, and one or more application-specific integrated circuits (ASIC's). CPU 212a may include an algorithmic logic unit (ALU) for mathematical and/or logical execution of instructions, such operations performed on the data stored in the internal registers. Display 225a may be a liquid crystal display, OLED display, a plasma screen, a cathode ray screen device, and may comprise a plurality of separate displays, or similar alternative display technology. Mobile Device 104 (shown in FIG. 2b) may have one or more buses (not shown) to facilitate the transfer of data signals between components. The buses may be wire or optical fibre busses in some embodiments, and may be arranged to facilitate parallel and/or bit serial connections.

When a viewer wishes to view content 107, 108 on their wearable device 106 they download or stream the recorded and processed data from processing network 103. Wearable device 106 may contain an input module or receiver 213b, memory 211b, a CPU 212b, display left 229b, display right 230b and a decoder 222b. Wearable device may have an inbuilt sensor 216b, which may be a camera in some embodiments. In some embodiments, sensor 216b may be independent of wearable device 106, and may communicate with wearable device 106 via a wired or wireless connection. Sensor 216b may be an external sensor physically removed from the viewer. Sensor 216b may track the viewer's location and the location and attitude of the viewer's wearable eyewear 106 through some visual, electromagnetic, physical or other method. Receiver 213b may handle input to wearable device 106. CPU 212b may have access to memory 211b via one or more buses (not shown) which may be wire or optical fibre buses in some embodiments, and may be arranged to facilitate parallel and/or serial connections. Memory 211b may include one or more memory storage locations, which may be in the form of ROM, RAM, flash or other memory types. Memory 211b may store program code executable by CPU 212b, which may include an operating system 215b, device specific software 214b and a player application 221b. Memory 211b may also store software modules such as pattern or image recognition module 217b and object tracking module 218b, described in further detail below. Memory 211b may also store data such as marker 233 location data 219b and content data 220b, described in further detail below.

As program code is executed by CPU 212b, CPU 212b may write to and read from memory registers internal to CPU 212b (not shown) to perform intermediate calculations and store temporary data. Executing program code may cause display left 229b and display right 230b to show data in the form of a user interface. CPU 212b may be one or more data processors for executing instructions, and may include one or more of a microcontroller-based platform, a suitable integrated circuit, a GPU or other graphics processing units, and/or one or more application-specific integrated circuits (ASIC's). CPU 212b may include an algorithmic logic unit (ALU) for mathematical and/or logical execution of instructions, such operations performed on the data stored in the internal registers. Display left 229b and display right 230b may be a liquid crystal display, OLED display, a plasma screen, a cathode ray screen device, and may comprise a plurality of separate displays, or similar alternative display technology. Wearable device 106 may have one or more buses (not shown) to facilitate the transfer of data signals between components. The buses may be wire or optical fibre busses in some embodiments, and may be arranged to facilitate parallel and/or bit serial connections.

Regardless of whether the device is mobile 104 (shown in FIG. 2b) or wearable 106 (shown in FIG. 2b), after colour+depth data is received by receiver 213(a/b), the data is handled by device specific software 214(a/b), which prepares it for use on each specific platform. Each different make, model and brand of mobile device, wearable device, tablet, media player or games device may have different device specific requirements. Device specific software 214(a/b) ensures that the incoming data conforms with the needs of the mobile or wearable platform. The internal workings of the device specific software 214(a/b) are different for each mobile or wearable platform and do not impact on the scope of this document.

The input signal received by receiver 213(a/b) may be received from any combination of a processing network 103, or from an external sensor connected directly via wired or wireless connection, or from a separate, external storage device or from a memory location.

For embodiments where the display device is mobile device 104 (shown in FIG. 2b), once colour+depth data has been handled by device specific software 214a, operating system 215a may make the data available to the player application 221a. Player application 221a may present parts of the data to display 225a in the form of user interface components. Player application 221a may begin decoding the data in conjunction with decoder software 222a run in the display hardware 223a. Decoder 222a loads data from memory 211a into display hardware 223a and decodes each frame in conjunction with player application 221a. This may be performed according to the method described in patent application PCT/AU2016/050625. Once the colour+depth data has been decoded, the display hardware 223a may render each frame, and pass rendered data 224a on to display 225a for viewing by the audience.

In some embodiments, the display device is wearable device 106. Player application 221b may present parts of the data to display left 229b and display right 230b in the form of user interface components. Player application 221b may begin decoding the data in conjunction with decoder software 222b run in the display hardware 223b. Decoder 222b loads from memory 211b into display hardware 223b and decodes each frame in conjunction with player application 221b. This may be performed according to the method described in patent application PCT/AU2016/050625. Once the colour+depth data has been decoded, the display hardware 223b may render each frame for the left eye and the right eye 228b. Rendered left data 227b and rendered right data 228b may be passed by display hardware 223a to display left 229b and display right 230b respectively, for viewing by the audience. The method for displaying the two images displayed on either display of wearable device 106 is explained in FIGS. 10 and 11.

Figure 3:
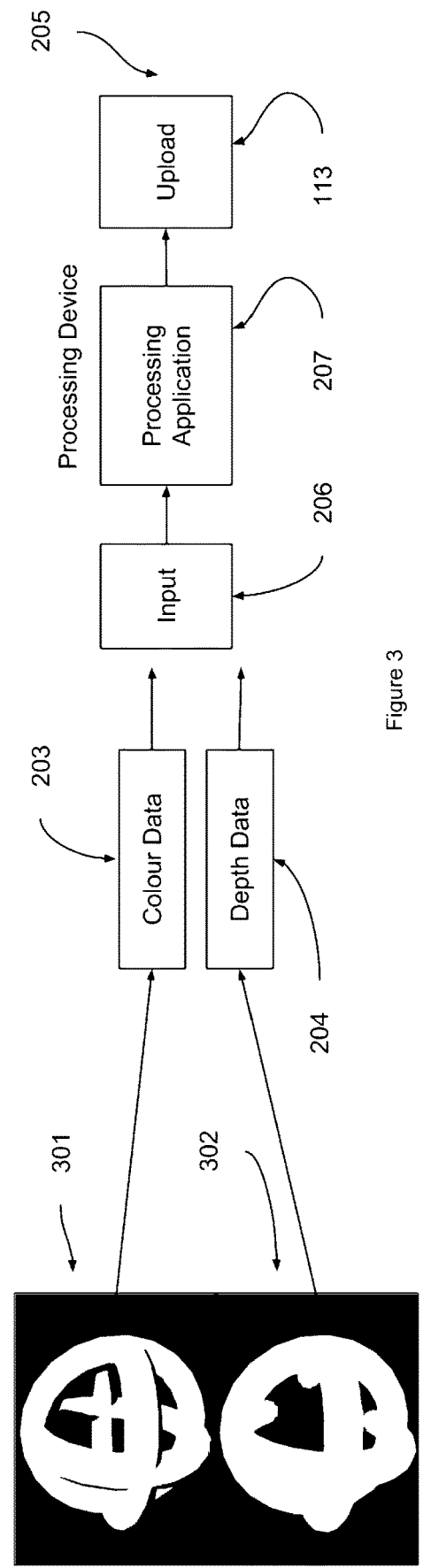
FIG. 3 is a block diagram of the systems that record, encode, upload, distribute, download, process and finally display the three dimensional reproduction of a computer generated or virtualized subject on a mobile device.

Referring generally to FIG. 3, representations 301 and 302 show a Pre-Rendered or virtualized subject composed of colour data 203 and depth data 204, respectively.

In the area of computer generated visual graphics, the final image to be displayed to the audience can be rendered and composited prior to consumption (pre-rendered), or the result can be generated in the viewing device from data and virtual assets compiled and rendered at the time they are consumed (in real-time).

In this context, the word "render" means to calculate the final image through processing any assets, textures, models, programming code, light models or more. Any combination of one or more of textures, models, lights, animations, computer code, physics simulation, visual effects and many more contributing factors may be taken into account when computer generated images are rendered. Once rendered, the image may be shown directly to a viewer, or stored in memory or on a disk or remote network for later manipulation, processing and/or display.

Whether pre-rendered or rendered in real-time, three dimensional graphics by their nature have depth, height and width. When the pre-rendered or real-time virtual assets are ready to be displayed to a viewer, they need to be rendered into a visible form by a virtual camera.

A virtual camera captures images from a virtual three-dimensional scene as if it were a camera in a location within that scene. This allows the viewer to view the scene from the location of the virtual camera.

When being rendered for display on a two dimensional display, the virtual cameras only output visual information that can displayed on those displays. The virtual cameras don't bother to record and display the depth of a virtual object from a two dimensional display, as this information would not be perceived by the viewer.

In the realm of computer graphics, the method for producing the final image as seen by the viewer may be simplified into two categories: Real-time and Pre-Rendered.

Real-time means that the visuals are generated at the time that they are perceived. All lighting, special effects, colours and interaction are done many times per second.

Pre-rendered means that all the calculations needed to produce the image or each frame of a video are done using as much time as required to make it look as intended. No shortcuts need be taken to create the visual result, as the rendering process can take many seconds, or even hours per image or frame. Pre-rendering is the method employed by film and television production where quality is a primary concern.

During the render process, the depth values of objects in the virtual scene may be captured for use in later processing stages. These depth values may be similar to the depth values captured by a depth sensor 102. These depth values may be used immediately in the stages of a render process, or they may be stored locally, in memory, on a drive or external storage device, or on a local or remote network. The depth values, if they were recorded at all, may be deleted immediately after use, or they may be saved for use in later manipulation or processing.

When displaying the pre-rendered or real-time graphics in a three dimensional medium like Augmented or Virtual Reality, any previously recorded depth information becomes an asset. This depth information 204 can be rendered and delivered to a recording/processing device 205, where it will be combined with colour data 203 in the same way as outlined in FIG. 2, with reference to recording/processing device 205. Once recording/processing device 205 receives the colour data 203 and the depth data 204 from a virtual computer generated source, the rest of the system as described in FIG. 2 processes it in exactly the same way.

These two separate data types are passed to recording/processing device 205 via input 206 to processing application 207 where both colour 203 and depth 204 data types are combined into a single colour and depth data type 208. This process/step may be performed according to the method described in patent PCT/AU2016/050625. Alternatively, the process may be performed according to other methods that would be known to a person skilled in the art. Recording/processing device 205 then passes the data to network connection module 113, which uploads the colour and depth data 208 to the processing network 103, best seen in FIG. 1.

Automated Subject Tracking in Depth Recording

Recording a subject using a standard video camera typically requires an operator to ensure that the subject is in focus. To do otherwise results in an unsatisfactory image, with unwanted effects such as inappropriate blurring, depth of field, or framing. Focus is ensured by making sure the lenses of the camera are configured for the distance, scene, and framing of the subject. When focusing on a particular subject, objects closer to or further from the camera than the subject will generally be out of focus, resulting in loss of potential quality in the capturing of those objects.

So too it is with depth recording. The difference is, when a subject is recorded using a depth sensor (such as depth sensor 101/102 shown in FIG. 1), proper configuration of the distances and framing results in several additional advantages.

Depth sensors frequently have an ideal depth range within which they can record distance from a sensor. Anything too close to the sensor is not detectable to the sensor, and anything beyond the furthest limit of the sensor will similarly not be recorded. The distance between the close and far distances is called the Depth Range. The Depth Range of a given sensor is generally described with reference to the sensor's minimum and maximum depths at which satisfactory recording can be achieved. These limits are defined by either the hardware or software of the sensor, or by a combination of both hardware and software. The depth is often configurable, either by adjusting the focus, placement, or through additional technology-specific aspects that may be adjustable for a specific camera, such as update frequency or light patterns.

When working with unknown depth range requirements, using the largest depth range is typically a preferred default, offering a subject the most physical space within which to move and still have their depth values recorded by the sensor. However there are several disadvantages to this approach.

One major disadvantage to using a very deep depth range is the amount of data created when recording the depth. If the recorder records the position of every object within that maximal default Depth Range, a great deal of data is created. The data created may be far more than may be required for the particular application, to the point where specialized hardware or storage solutions are frequently necessary to store the data being created. This extra data may also require a post-process stage to create a manageable smaller sized file for processing.

A more efficient solution is to limit the depth range to only encompass that which the performer will need for their performance, or a range that will capture only the objects or areas of location that are desired to be recorded. The resulting data will be optimised at recording time, speeding up the recording and processing stages of a typical production, in addition to reducing the storage requirements for depth data.

When a performance is well rehearsed and/or recording requirements are clearly understood, pre-defining the depth range may be generally satisfactory. However, many performances require the performer to be allowed more freedom to move towards and away from the sensor than this. Likewise, a camera operator may wish to move the camera around to frame the performer or other subjects of the video in a different way during the recording, changing the depth of filed. In this event it may be desirable to be able to adjust the depth range near and far settings dynamically as the performance or recording progresses.

This is a complex task requiring that the sensor operator understand not only the location of the performer relative to the sensor, but also the position of any extremities (hands, feet, props) that the performer is moving at all times. A way to automate this task would greatly benefit the recording process.

Figure 4:
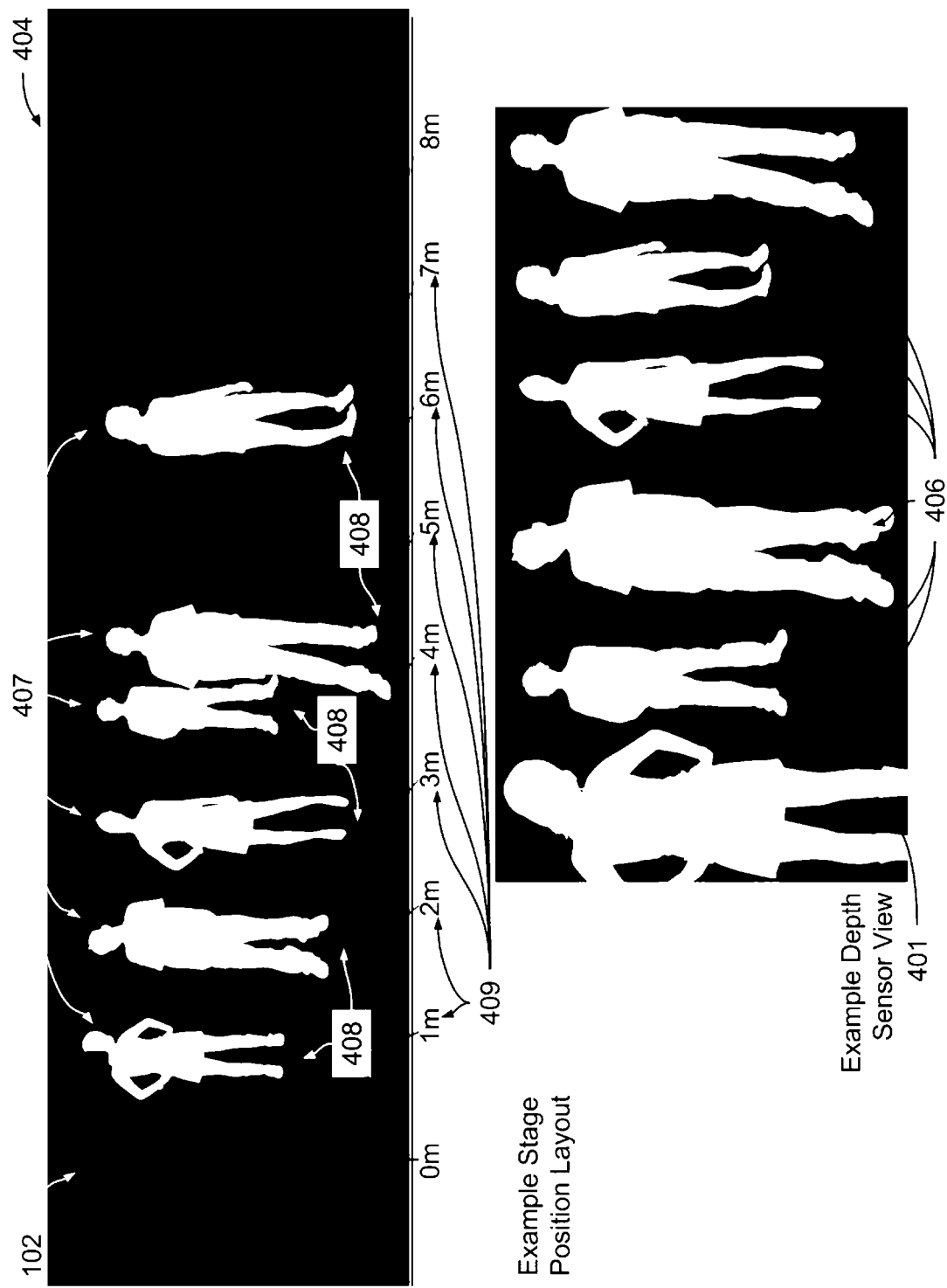
FIG. 4 is an image representative of what the operator might see in a recorder. The recorder is displaying the many subjects currently in the view.

Referring generally to FIG. 4, an example client side display 401 is shown, which may be displayed on display 117 of processing device 205. Processing device 205 may be directly connected to one or more sensors 102 via a cable, or a network connection.

FIG. 4 relates to a method by which a subject's distance from a depth sensor 102 may be tracked in real-time, and the depth range adjusted in real time to encompass a performer or other subjects 406 on a frame by frame basis. This automated depth range adjustment would track the one or more subjects 406, ensuring optimum recording conditions for data size, compression, storing and efficiency, as well as performance area.

When an operator of processing device 205 points a sensor 102 connected to processing device 205 at one or more subjects, these appear on the display 117 of device 205. In the example client side display 401 shown, these appear as subjects 406. Subjects 406 may be in any position in the view of the sensor. They may be at different distances from the sensor. In some embodiments, sensor 102 may have an effective range of between 0 and 100 metres, which may be between around 1 and 25 metres in some embodiments. In some embodiments, the effective range of sensor 102 may be around 8 meters. Other sensors may have shorter or longer ranges, depending on their design. For example, some sensors may have a range of several kilometres.

In some embodiments, processing application 207 running on processing device 205 may allow an operator to select a subject to isolate and track, allowing for the range of the depth data recording to be automatically adjusted and for the depth data to be recorded for the selected subject only. This prevents depth data from being recorded for the rest of the scene in view of sensor 102, saving data storage space and increasing processing efficiency. In some embodiments, more than one subject may be isolated and recorded in separate component elements that may later be reassembled. This would allow the two or more recordings to be independently compressed, independently recorded, as well as allowing two subjects to be recorded without needing to waste data on the non-used depth in between the two or more subjects.

Regardless of how the sensor is built, or the design limitations inherent to a given sensor, it is important for bandwidth and file size considerations that the area of depth actually recorded be as efficiently defined as possible, with respect to storage and container limitations, such as frequency of updates. In this case, being efficiently defined means having the most narrow depth range possible, without cutting out any areas of the subject being recorded. The smaller the depth range being recorded, the smaller the file size of the recording will be, in most cases. For some container formats, a source that has varying depth ranges may compress worse than a largely static source, and it may be necessary to only allow changes in depth range infrequently for the sake of file size and compression efficacy. This is due to many formats that would be used for depth video handling large-scale shifts poorly, such as a change in depth range. However, irrespective of video format and the rate at which the depth range is updated in a recording, compression remains a core aspect of the recording process, both for interface and for optimizing storage.

Depth range in this example is defined as the distance between the nearest point of interest from the sensor to the farthest point of interest. Where a particular selected subject is being recorded, the depth range will be the range from the point of that subject nearest the sensor 102 to the point of that subject furthest away from the sensor 102. With a human subject this range may typically be between around 1.5 to 2 meters.

Processing device 205 determines the range using data received from the operating software of sensor 102. The depth range is the distance from the nearest depth value to the farthest depth value in a set of depth values. Depth sets may be provided as a frame or sequence, or for a given subject. Where depth information is outside the range of sensor 102, such as being too close or too far, or in some cases not being visible to sensor 102, there may not be a depth value provided. For example, if sensor 102 is only detecting a single human subject within its field of view and range, sensor 102 can isolate a certain range of its resolvable depth, and discard excess information. In the case of FIG. 4, it is likely areas of the floor immediately surrounding the subject may return resolvable depth values, and will be included.

In order to allow for a restricted selection of depth values to be recorded, as described above, processing application 207 of processing device 205 identifies subjects in a frame, assigns the subjects an identification (ID) value and then tracks the subjects. This may be done according to the following method. A body tracking module 210 may be present in processing application 207, examining each captured frame of the incoming depth data 204. Processing application 207 may be configured to recognise the typical shape, size, configuration and depths of a range of human forms. If processing application 207 recognises any of the forms within the captured image as matching the predefined forms that might be a human, it assigns that form an ID value. For each frame being processed, processing application 207 re-examines the area of the incoming frame to see if it recognises a human like form in the same area as the registered human like form appeared in the previous frame. If it does recognise a human form in approximately the same position as one existed in the previous frame, and that shape is similar in shape and depth values as the one before (within tolerances) the software assigns the ID of the human shape from the previous frame to this human shape.

In some embodiments, sensor 102 may contain software that is configured to detect and track a person within the view of sensor 102. For example, in some embodiments, sensor 102 may be a Kinect sensor running Kinect SDK software that allows a subject to be tracked. The Kinect SDK may process the depth data 204 received by sensor 102, and return a masked shape which defines the area in the depth data 204 occupied by what the software recognises as a human. The Kinect SDK software may update the developer with the location of any human shapes it is able to recognise using built-in or included software and processes, which take the form of a body tracking module 210. This process, step or module 210 may be performed according to the method described in U.S. Pat. No. 8,660,303 B2 or WO 2010099035 A1. Alternatively, the process may be performed according to other methods that would be known to a person skilled in the art.

Figure 5:
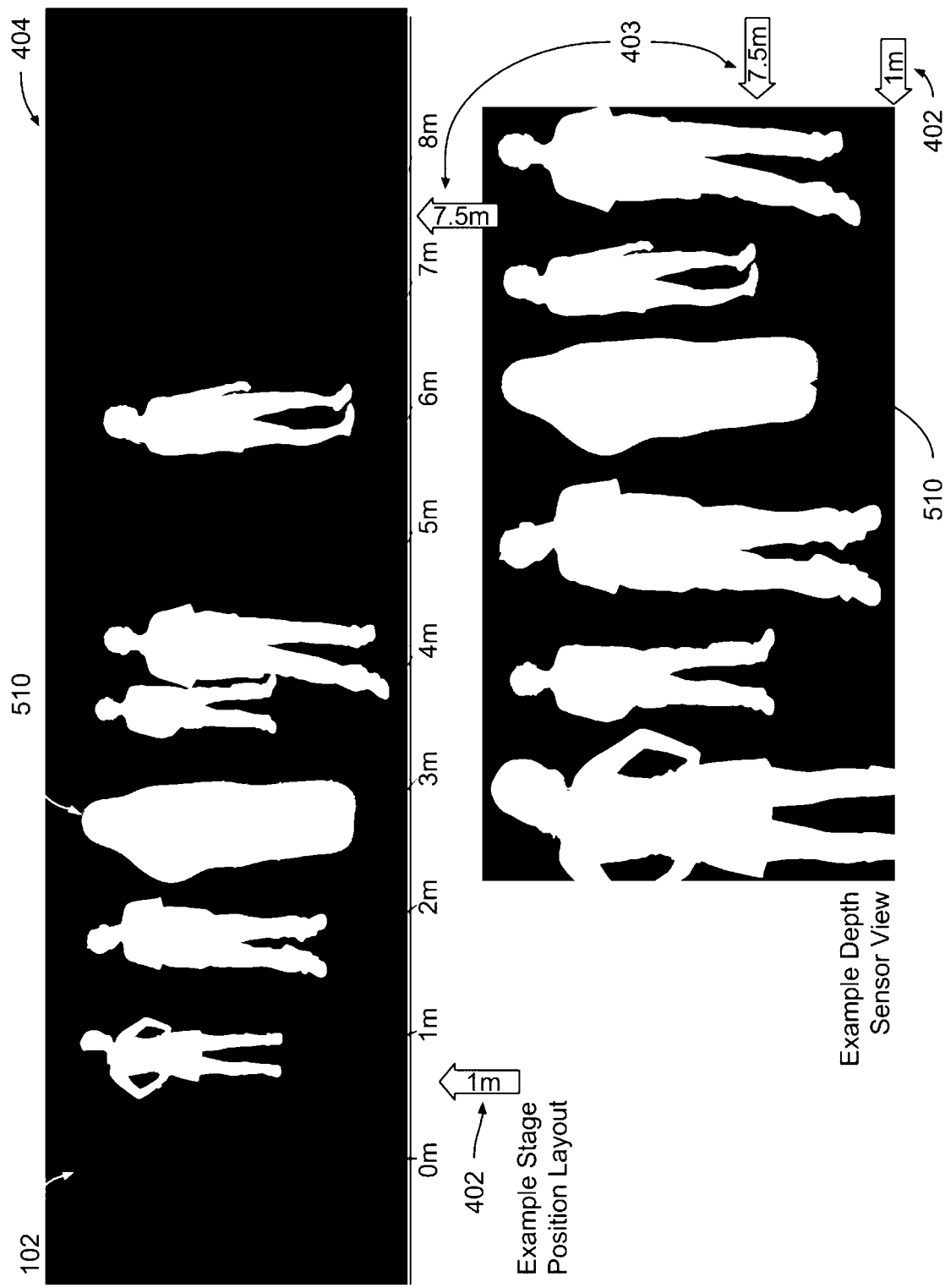
FIG. 5 is an image that displays the image shown in the recorder once the operator has selected one or more desired subjects.

The body tracking module 210 of processing application 207 passes data to a recording application 209 of processing application 207, allowing the recording application 209 to track a selected subject 510 (shown in FIG. 5). The detected shape of the selected subject 510 is saved in memory 114. This shape is used by the recording application 209 to determine the section of the frame to actually record. Further information on the tracking, selection and processing is outlined below with reference to FIGS. 5, 6 and 7.

The reason reduced data size is important relates to the way depth data is recorded and stored. The amount of data created in a given depth recording is a result of the precision, range, resolution and frequency of the recording. Precision relates to the accuracy of the depth measurement. The more accurate the depth measurements, the more data required to record that accuracy. The range relates to how much of the depth visible to the sensor is being recorded. If the range is reduced, areas beyond the defined range are not recorded, reducing data size. The resolution relates to the size of the frames in the recording. The larger the frame, the more data created. Frequency relates to the amount of times per second the sensor generates a measurement of depth. Higher frame rates create much more data.

Reducing any one or more of precision, range, resolution or frequency may have an effect on the data size of the finished recording.

Example client side display 401 shows subjects 406 in various positions, at various distances from sensor 102. Client side display 401 is an example that shows only a few possible configurations, and is non-exhaustive.

Example stage position layout 404 illustrates the distances each physical subject 407 (corresponding to virtual subjects 406) is positioned from sensor 102 at the time the client side display 401 is displayed. Each subject 407 occupies a position in space 408, each of which is a given distance 409 from sensor 102. The positions 408 and distances 409 shown are examples only.

Subjects 407 as shown in FIG. 4 are occupying the area between 1 m and 8 m from the sensor 102. The depth data 204 gathered from the sensor 102 contains distances to the various subject's locations 408, expressed as data-points or pixels. These data points contain the range of depth for each subject, as determined by sensor 102, and are frequently processed into an image or buffer.

In the example layout 404, the distance from the nearest data-point in the area of the depth data 204 to the farthest data-point in the area of the depth data 204 creates a depth range of 7 meters. This creates a great deal of information to be processed per frame.

Using the recording application 209 in conjunction with the tracking tools available to developers, it becomes possible to select a human subject or subjects 407 through the user interface of display 117, and have the recording application 209 track that subject or subjects 407 as they move about the recording space 404.

Selecting a desired subject allows for the recording application 209 to disregard the depth data which is associated with the undesired subjects. Disregarding this data reduces the amount of information which must be saved, which may reduce file size.

Referring generally to FIG. 5, once an operator selects a subject to be recorded, selected subject 510 provides visual feedback to the operator that a subject has been selected and may now be tracked for the purpose of recording. For example, the selected subject may be displayed in a different colour, have a coloured outline, be of a brighter intensity, or be otherwise visually emphasised or distinguishable from the non-selected subjects. In some embodiments, the subject may be selected using a mouse or a touch screen interface. The operator may be able to select the desired subject or subjects by clicking on them, or tapping the subject on the display. In some embodiments, a laser or location tracking device like a GPS fob or EM interference module may be used to track the location of the subject.

The tracking module of processing application 207 may register the location and distance of each pixel in the area defined by the selected subject 510, once per frame. Recording/processing device 205 may receive data related to the area of interest from sensor 102 via an input 206 and may store the coordinates in memory 114. CPU 116 of recording/processing device 205 may be configured to retrieve the area of interest from memory 114 and process it to determine the desired depth range. In the example layout shown in FIG. 5, the depth band's near range 402 is 1 meter and far range 403 is 7.5 meters, as the automated depth trimming process has not begun.

In the case of a positional tracker, for example a GPS fob, IR tracker or radio frequency tracker, the fob would relate to the recording application 209 the coordinates of the subject 510. The recording application 209 would not require the operator to select a given subject, as the tracker or fob would be tracked regardless of its position in the recording view.

In the case of a magnetic tracking token, the token's location in the field of recording would be determined by its location in the magnetic field emanating in the area in front of sensor 102.

In the case of a laser or other light based designator, the return from the laser would allow the recording application 209 to note the nominated subject and track the subject as outlined above.

Figure 6:
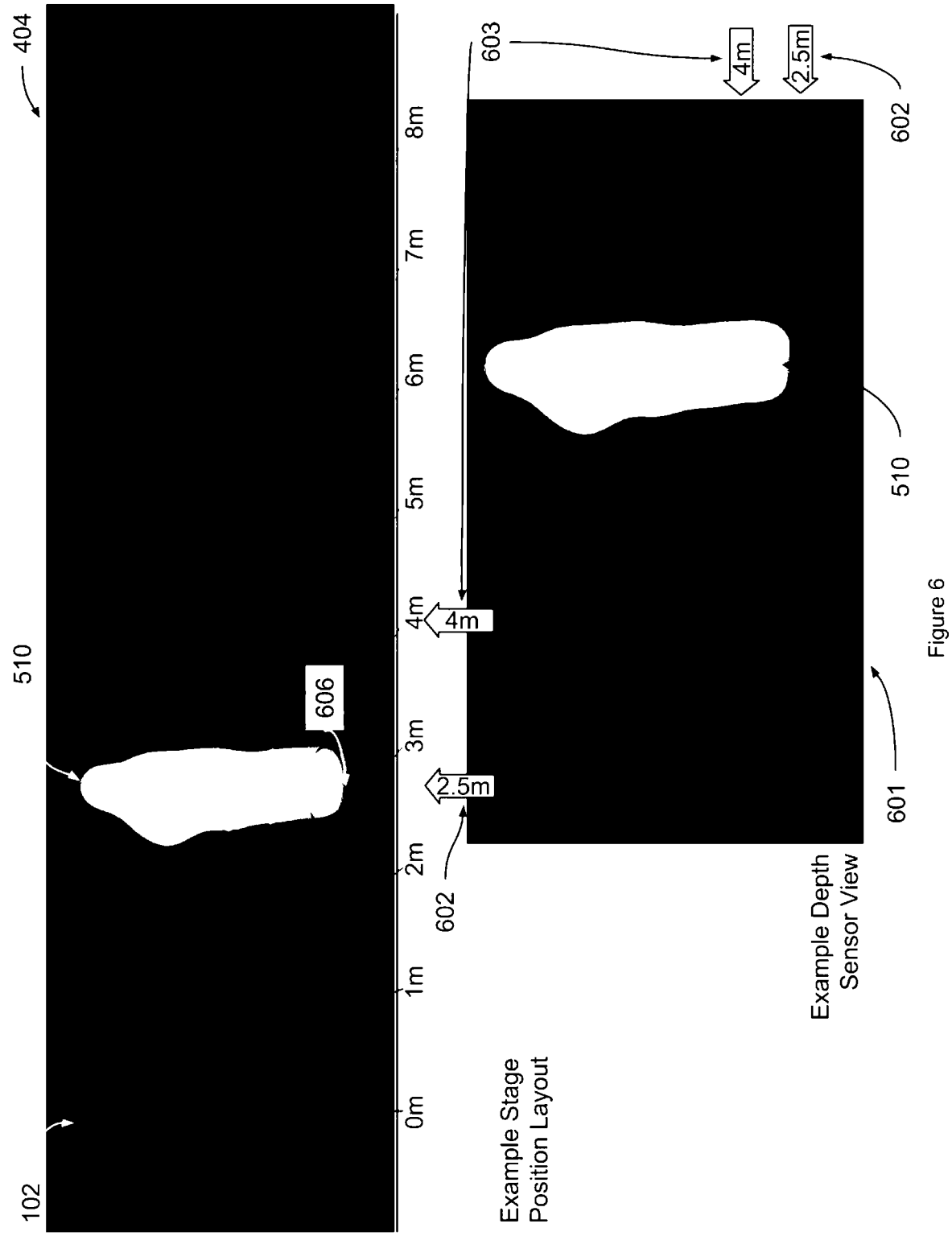
FIG. 6 is an image that displays the image shown after the recorder software automatically trims the depth range to bracket only the selected subject(s)

Referring generally to FIG. 6, example client side display update 601 shows the depth band's Near Range 602 and Far Range 603 have been automatically adjusted by processing application 207 to bracket Selected Subject 510.

The designation of the selected subject is saved to memory 114 of device 205 which is connected to the sensor 102. The depth values of the pixels which correlate to the selected, tracked subject 510 are sent to the CPU 116 of processing device 205. The recording application 209, residing in memory 114 and running on CPU 116, then receives the depth range of the selected subject from CPU 116. The automated depth calibration process used to determine depth range is defined in further detail below with reference to FIG. 7.

Selected Subject 510's position 606 is a volume of space defined by the tracking module of processing application 207.

The recording application 209 only records the area of the scene occupied by the selected subject 510. In the example shown in FIG. 6, the depth range being recorded has been reduced from 7.5 meters (as in FIG. 4) to 1.5 meters. Each image frame of depth data 204 captured by the sensor 102 contains a complete reference to the depth of every data-point in the captured depth data image 204. The depth values for each data-point are stored in memory 114 in the recording/processing device 205 and used by recording/processing device 205 to determine how much of the depth data to record. The data-points of the depth data 204 which are outside the designated depth range, and do not correspond to the area of the depth data 204 that is the selected subject 510 are discarded.

The result is a reduced data set by not needing to save every level of depth.

Figure 7:
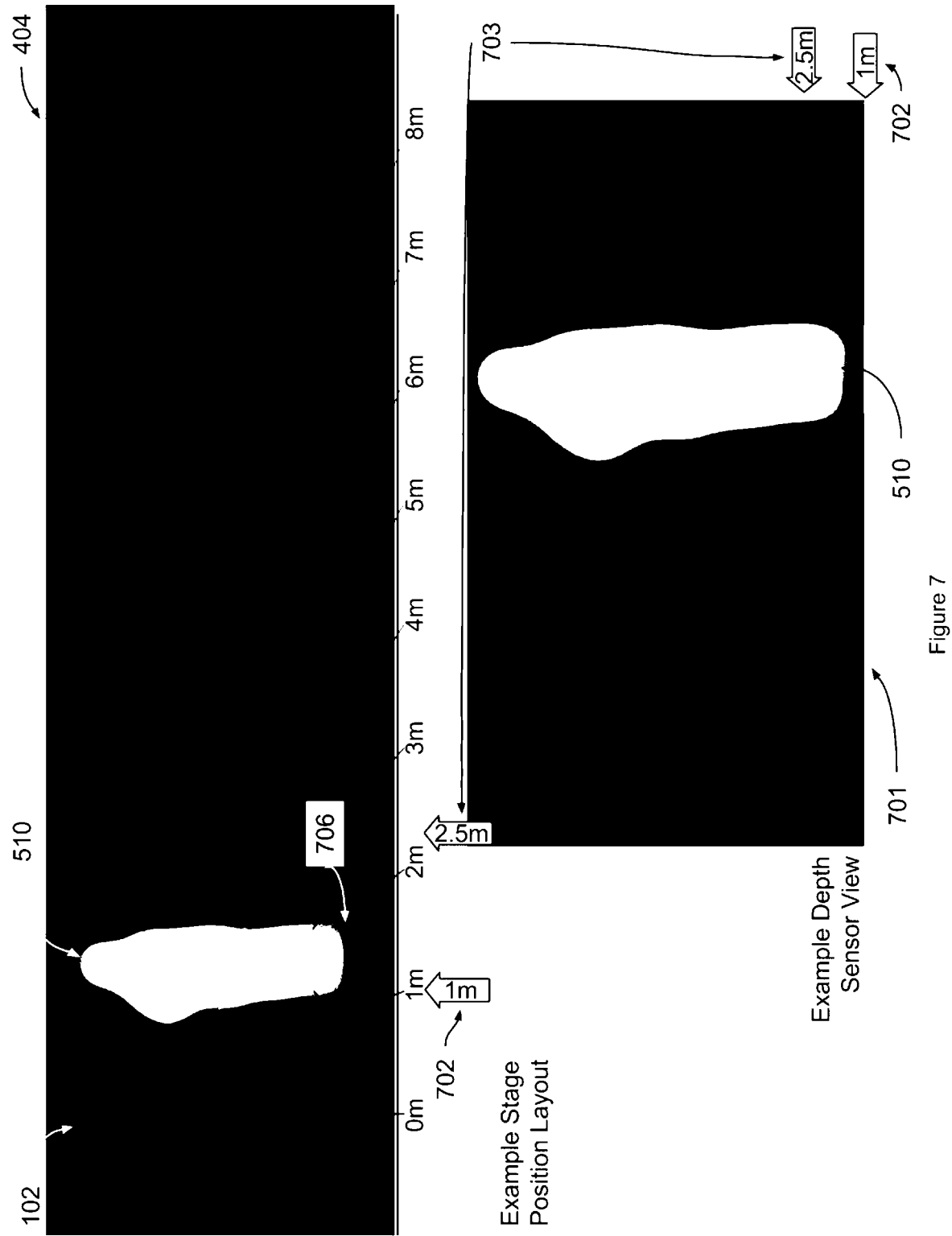
FIG. 7 is an example image that displays the image shown in the event that the selected subject(s) change their position relative to the position of the sensor.

Referring generally to FIG. 7, the scene of FIG. 6 is shown where selected subject 510 has moved towards sensor 102.

Tracking module of processing application 207 may be configured to recognise that the selected subject 510 is now in a new position 706 relative to the position of the sensor 102. In the event that position 706 is closer or further away from sensor 102 than original position 606 as shown in FIG. 6, Near Range 702 and Far Range 703 may be automatically adjusted by tracking module of processing application 207 to bracket Selected Subject 510.

The process begins with sensor 102 capturing a frame of data.

If the capability to do so exists, the tracking module within the processing application 207 may identify as many human forms as it can, up to the number of humans in the view, or the limits of the capabilities of the tracking module. The tracking module may have a limit of the amount of people it can track at any one time. In some embodiments, the tracking module may be configured to recognise and track other animate or inanimate objects. Possible tracked objects include but are not limited to animals, vehicles, toys, plants, household, commercial or industrial objects or any other kind of object or representation of an object or collection of objects.

The tracking module may store the result of the tracking operation in memory 114. This result may contain an image with each pixel having a depth value. Accompanying data may link one or more identified shapes within each frame as one or more tracked human subjects 510. This identifying data may be in the metadata for each frame of a video or sequence of images being output as depth data 204. In some embodiments, this metadata may be in a separate file, or it may remain in memory 114 and not committed to a file.

Depth data 204 is not required to set depth ranges for the recording application 209. The process outlined here in FIG. 7 is for an automated depth calibration process. In some embodiments, a more manual process may be preferred. Manually defined values may be used to refine the near and far range values for recording.

The user interface display 117 relays the results of the tracking module to the operator. This allows the operator to see any and all subjects, tracked or otherwise.

In some embodiments, designations are provided to the user interface, showing the operator which subjects are available to be tracked and which are not being tracked.

In some embodiments, the operator may manually define depth ranges. Depth ranges may be defined through entering values into a user interface, or through sliding user interface controls or some other data input method.

The operator may designate one or more subjects to be filtered, by using a mouse to click on one or more tracked subjects.

In some embodiments, the operator may designate one or more subjects by touching on the display 117 of a touch screen interface.

Processing software 207 of recording/processing device 205 may use the designations provided by the operator to determine which tracked and ID'd subjects to actually record.

The recording application 209 module may receive the output from the tracking module. This output may be unfiltered by any operator's choice of one or more designated tracked human subjects.

The recording/processing device 205 may use processing software 207 to find the near/far values for each designated subject.

The frame may then be processed by the recording application 209. The recording application 209 may be configured to recognise one or more selections made by the operator.

In the event that the operator is aware that the subject will likely be the only thing in the view that needs to be recorded, the shape of the identified human in the view is all that the recording application 209 needs to be aware of in order to refine the depth range for each frame. However, if the operator is aware that the subject may be holding a prop (e.g. a tennis racquet), or may be wearing a large piece of costume that extends beyond the limits of what a computer might recognise as a human form, the operator may elect to input buffer values to the depth range of the recording application 209.

These buffer values may be different for the near and the far buffers. The recording application 209 may be configured to add any buffer values to any near/far values provided by the tracking module.

The buffer values may be added to the near and/or far values of the depth range as detected by the tracking module. The buffer values may be configured to ensure that whatever props, staging, costumes or any other object that extends beyond the normal shape of an identifiable human will still be included in the selected depth range, and consequently not discarded.

The operator may input the value of the buffer via a user interface displayed on display 117. The buffer value may be stored in memory 114 of device 205.

The recording application 209 may be configured to process each frame, clamping, reducing and/or shifting any depth values that do not fit into the range as defined by the near and far values adjusted by the buffer values.

In some embodiments, when sensor 102 first outputs a frame of depth data 204 to recording/processing device 205, that depth data frame 204 contains all the information for the entire range that sensor 102 is capable of detecting. If the desired subject occupies only a small portion of that depth range, most of the recorded data is extraneous. Taking the near/far ranges (including any buffer values) into account, the recording application 209 can delete the depth information which is outside those ranges. The recording application 209 commits these results to memory 114.

The result of deleting the excess depth pixels from the initially recorded depth data is an image frame which is then saved to memory 114, internal or external storage, USB storage or an externally networked computer or storage medium.

In some embodiments, processing application 207 may allow the operator to activate an option to create a separate depth file in memory 114 for each designated subject and buffer for later processing.

In the event that more than one tracked subject is recorded and designated, one option the recording application 209 may have is to output each depth range to a separate buffer. This will allow the operator to treat each recorded subject differently, it opens up possibilities for post-processing and it means that, should the recording application 209 be able to process frames according to the method described in patent application PCT/AU2016/050625, each separated subject can be processed and combined optimally.

This process repeats for each frame captured by each sensor 102 of captured depth data 204.

As described below with reference to FIG. 8, the subject tracking module may be used in conjunction with a recording calibration tool 803 that quickly allows the operator to align a subject 101 in the view such that scale, rotation and location in relation to a marker 233 (as shown in FIG. 2) may be determined quickly and easily.

Initially the recording application 209 might use the recording calibration tool 803 to ensure that the subject is in the optimum position, rotation and scale. Once this tool has been used and the operator is satisfied that subject 101 is correctly calibrated, the operator may then select the subject using any of the methods described above for the subject tracking to begin.

Should the subject then move from the original position, the depth range would follow the subject, continuing to ensure the most efficient recording possible.

For further information on the relationship between the viewing device, the content and the marker, refer to FIG. 9.

Depth Recording Calibration Tools

When recording a subject using traditional video methods, the subject is generally located in an environment or scene. The environment may be composited in around the subject using post-production processes in some embodiments; however, the desired result is generally that the producer wishes to give the content of the recording context through the juxtaposition of the subject and the environment.

In the case of holographic recording for Augmented Reality, it is generally desired that only the subject is recorded, isolated from any environment. This allows the content of the recording to be superimposed onto a real-time image and viewed in the environment of the viewer's choosing through an augmented reality application. The viewer may also choose to view the content at a small scale or a large one. They may choose to view the content horizontally, vertically, or at arbitrary angles, either through a headset or via a handheld computing device.

Recording a subject without an environmental context or "background" creates challenges when it comes to later aligning the content to the viewer's world at the time of playing back the recording through a viewing device. For example, according to some embodiments, the ground beneath the feet of a human subject in a recording may not have been captured. At the time of playing back the recording, it can be difficult to determine where the feet of the human subject should be placed with respect to the background upon which the recording is being viewed, or where the ground or floor is of the environment that the viewer is superimposing the recording into during playback.

Without some form of empirical calibration it is not possible to predict exactly how the content will appear to the viewer. Position, scale, and orientation of the recording need to be determine to ensure that the viewer will have the best experience possible in viewing the content.

One way of ensuring that a producer or camera operator of a recording is able to align a recording for optimal viewing is to provide a visual guide to the operator at the time of recording. This guide will allow the operator to align the subject to a known set of position values. The subject of the recording can then be displayed to the viewer with the scale, position and orientation as defined by the producer at the time of recording.

By aligning the content being recorded to previously calibrated scale, location and orientation guides, the producer can be confident that their content will not require any further adjustment after the recording is complete in order for the playback of the recording to appear in the scale, position and orientation that they have selected. This "what you see is what you get" (WYSIWYG) methodology can greatly reduce the probability of operator error at the time of recording and increase the efficiency of the recording process, by reducing the need for processing post recording in order to alter the scale, position or orientation of the subject of the recording.

Referring generally to FIG. 8, diagrams depicting the translate, rotate, scale (TRS) guide show scale guide 801 (shown in FIG. 8a) and translate/rotate guide 802 (shown in FIG. 8b) in isolation. Translate, rotate, scale guide 803 (shown in FIG. 8c) illustrates the way the combined guides would appear to an operator using the tool. Scale guide 801 and translate/rotate guide 802 allow for a depth data recording to be calibrated, as described below.

When constructing a Virtual or Augmented Reality scene, one consideration is how well the content fits into the world being virtualized. Augmented Reality allows the viewer to perceive the real world as the setting for virtual content. This content has to look as though it "belongs" in the real world, or the illusion fails. Virtual reality replaces the real world with a virtualized world using closed wearable devices which completely obscures the viewer's vision of the real world.

To address issues with complexity in calibration, a scheme for easily understood visual guides was designed, as shown in FIG. 8.

The scale, the orientation and the location of virtual content shown in an augmented reality setting must be appropriately selected in relation to the scale, orientation and location of a physical trackable marker object 233 (as shown in FIG. 2) that will be used to display the content, in order to present a visually appealing scene to the viewer.

Most modern Augmented Reality scenes employ some kind of reference object or image. Some rely on sensors in the viewing device that can measure features in the real-world and understand the world's true size using built-in depth sensors. Either way, the content creator needs to understand both the size of the subject they are capturing and the size they would like it to be when it appears in Augmented Reality.

The orientation of the alignment content 820 should be constant in relation to the orientation of the marker 233. During a calibration phase of a recording process for capturing colour and image data of a subject, the orientation of the alignment content 820 in relation to the recorder software's virtual world's orientation is defined. The recorder transfers this relative orientation to the relationship between the final displayed content 105 or 107 and 108 and the marker 233.

TRS guide 803 may be presented to the operator as a user interface overlay, superimposed on the the display 117 of the recording/processing device 205. The operator may be prompted to line up the subject of interest with the scale guide.

Aligning the subject with the scale guide may be done by using various alignment tools, input controls and value fields present in the user interface of the recording application 209. In some embodiments, alignment may take place before or at the time of recording. In some embodiments, alignment may be performed after the recording has taken place.

Example calibration FIG. 8*d* shows alignment content 820 in the wrong position, scale and orientation.

Example calibration FIG. 8*e* shows alignment content 820 in the wrong position and scale, but the correct orientation.

Example calibration FIG. 8*f* shows alignment content 820 in the wrong position, but the correct scale and orientation.

Example calibration FIG. 8*g* shows alignment content 820 in the wrong position, but the correct scale and orientation.

Example calibration FIG. 8*h* shows alignment content 820 in the correct position and scale, but the wrong orientation.

Example calibration FIG. 8*i* shows alignment content 820 in the wrong position, scale and orientation.

Example calibration FIG. 8*j* shows alignment content 820 in the wrong position, scale and orientation.

Example calibration FIG. 8*k* shows alignment content 820 in the correct position and scale, but the wrong orientation.

Example calibration FIG. 8*l* shows alignment content 820 in the correct position, scale, and orientation.

Augmented Reality Details
Mobile Devices

The main functions of a typical Mobile Augmented Reality (AR) device are described below in further detail with reference to FIG. 2.

The purpose of using a mobile device in the consumption of augmented reality content is to take advantage of some of the components present in most modern smartphones. A camera or other sensor, a display and the internal computational components necessary for combining those parts with the augmented reality application and the content are all required for the consumption of augmented reality. Devices with these components have existed for some years, though their use as augmented reality viewing devices is not yet mainstream.

Augmented reality content may be displayed superimposed on a background image feed captured by a camera and displayed on a display of a mobile device. Computational components may be used to position and orient the augmented reality content on the display relative to a predetermined marker, being a pre-registered pattern or image, in the background image. The process of identifying and tracking a marker using a mobile device is discussed in further detail below with reference to FIG. 2.

Example mobile device 104 may contain a sensor 216*a*, memory 211*a*, and CPU 212*a*. Memory 211*a* may store software code that can be executed by CPU 212*a*. The software may include a pattern or image recognition component 217*a*, which may use computer vision to recognise patterns in the images captured by the sensor 216*a*. The software may further include a player application 221*a*, which may contain pre-loaded image and pattern datasets for the pattern recognition component 217*a* to compare against each frame of captured image data, in order to allow the pre-determined images and patterns to be identified. In some embodiments, player application 221*a* may communicate with a remote file server (not shown) to check against a database of previously registered patterns and images for the pattern or image recognition component 217*a* to recognise.

In some embodiments, the player application 221*a* may be configured to allow a user of the mobile device 104 to capture and register patterns and images from their immediate surroundings into player application 221*a*. In some embodiments, sensor 216*a* may comprise a depth sensor or other kind of sensor that allows the device to physically measure the real-world environment around the device. In some embodiments, the camera being used for pattern recognition component 217*a* may not be contained within mobile device 104. External sensors may serve this function. In some embodiments, the location and orientation of mobile device 104 may be determined through tracking provided by an external tracking system such as using infrared tracking or some other tracking method.

Once the pattern recognition component 217*a* matches patterns, images, or shapes registered in memory 211*a* with those captured by sensor 216*a*, it can begin tracking the location of that pattern in the camera's view in each frame. In some embodiments, pattern recognition component 217*a* may be located remotely from mobile device 104 on a separate processing device or network of processing devices. Image data may be sent to pattern recognition component 217*a* from mobile device 104, and data about any recognised patterns or images may be sent back to mobile device 104.

Memory 211*a* may store further software code including an object tracking component 218*a*, which may be executed by CPU 212*a* to continue tracking the pattern recognised by the recognition component 217*a*. Patterns which can be tracked must contain visual information which allows object tracking component 218*a* to be able to discern the orientation of the pattern. Patterns which contain patterns that make it impossible to discern which orientation the pattern is in in relation to the camera are unsuitable for this recognition and tracking technique. The location of the tracked object is stored in memory as location 219*a* of marker object 233.

Mobile devices 104 or any other processing device that employs depth sensors, that use techniques such as Patterned Light, Time of Flight, Viewpoint Parallax, LIDAR, SONAR, RADAR or other physical-world detection methods gather information about the composition of the physical world beyond the information captured by sensor 216*a*. Many of these sensors are able to provide data from which a location or features of a recording may be understood. This data may include the location and shape of features in the physical world. This coordinate system may then be used to place virtual content into a background image being captured by sensor 216*a* and displayed by device 104.

Assuming that the registered and identified pattern contains information that object tracking component 218*a* can track, the location and orientation of the pattern is known. This information may be referred to as a marker. This location and orientation information is passed to player application 221*a* once per update, as described below.

In many real-time applications, the update rate of displaying frames or processing outputs is corresponds with the frame rate. Each time a frame is made ready to display, or a piece of data is prepared for output to another function (internal or external to the device preparing the function), this is called an update.

Content data 220a may reside in memory 211a. In some embodiments, content data 220a resides in an external memory device, memory card or external network. In some embodiments, content data 220a is streamed from an external file server. In some embodiments, content data 220a may consist of a still image, a video file, an animated or non-animated three dimensional object, a sound, text or piece of software instruction.

Once per update, player application 221a receives the location 219a of the marker object 233 and the relevant portion of the content data 220a. The content may have animations which the player application 221a will execute. Regardless of the type of content 220a, be it flat graphical elements, 3D graphic data or other effect, the content is handled in a virtual space approximating the real world space perceived by mobile device 104. Methods for combining these spaces vary, typically consisting of one or more elements of marker objects 233, gyroscopes, accelerometers, magnetometers, tracking cameras such as infrared, and GPS, but those technologies are non-exclusive.

CPU 212a may pass the location 219a of marker object 233 and the location, orientation and scale of content data 220a as it relates to the frame to be rendered, on to the display hardware 223a. Display hardware 223a takes the known location, orientation and scale of the content data 220a and renders it to create rendered data 224a so that it can be shown on the display 225a. This process is continuously updated, such that the location, orientation and scale of the virtual object represented in content data 220a always appears to be in the correct real-world location as shown on display 225a.

As CPU 212a is generating the location, orientation and scale of content data 220a, sensor 216a's image for that frame is sent to display hardware 223a to be rendered "before" content data 220a, so as to appear behind content data 220a. This superimposes content data 220a on top of the image from sensor 216a, creating the visual impression that reality has been augmented by the virtual content 220a.

In FIG. 2b, example mobile devices 104 illustrate a piece of 3D displayed content data 105 rendered to be standing on marker object 233. The various angles illustrated here are examples only. Each example image shows marker 233 at different angles, and content data 220a is rendered by display hardware 223a to appear to be in the same location, orientation and scale as marker object 233.

The viewer is in no way restricted to these views, and may view the rendered content from any angle by changing the position of device 104 with reference to the identified marker.

Figure 11:
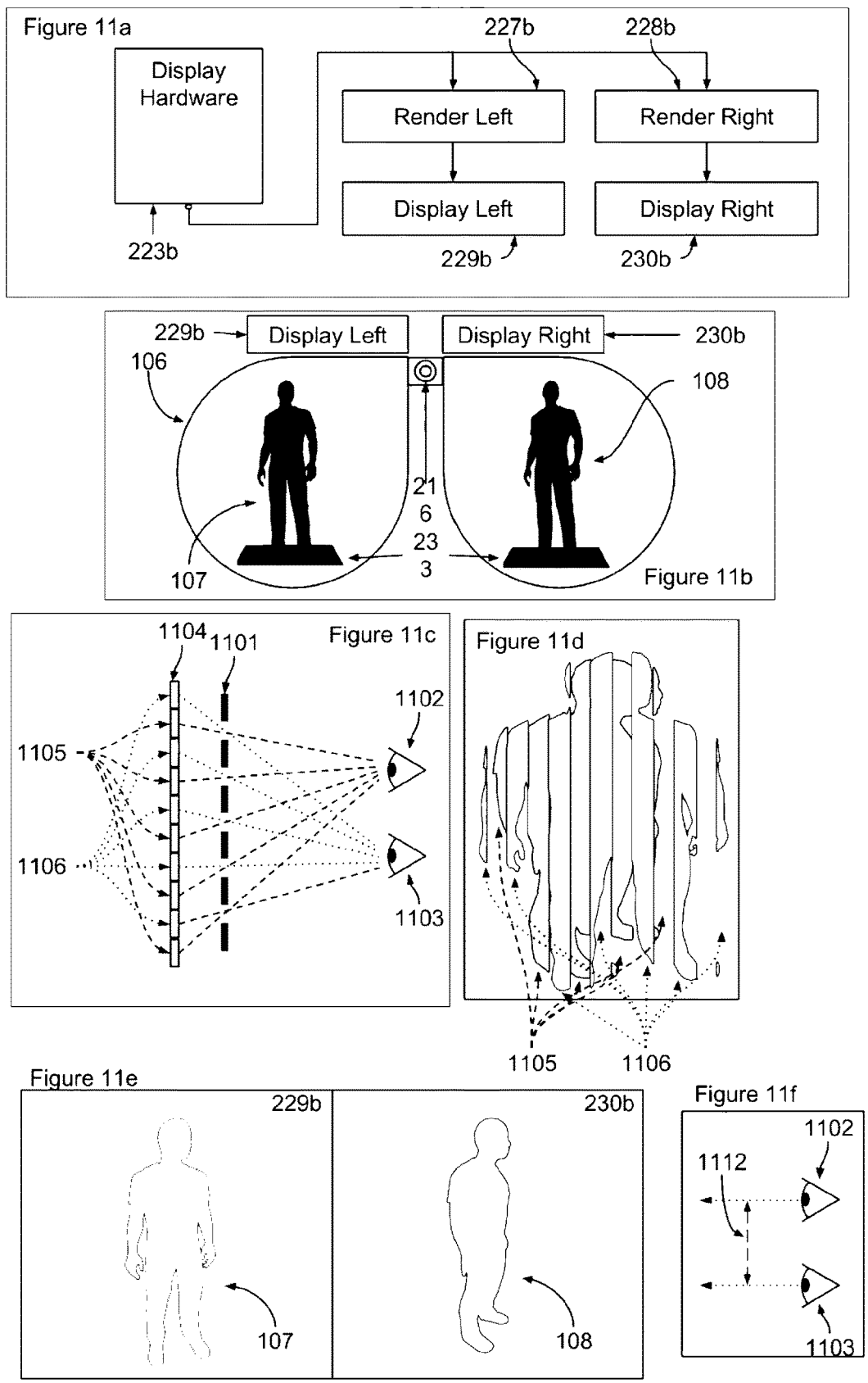
FIG. 11 illustrates various methods of showing stereoscopic images across one or more displays.

Employing the values calculated through the use of techniques outlined in FIG. 11, the location and orientation of the marker 233 is known and stored as location 219a of marker object 233. This location is the information delivered to player application 221a. Knowing the location and orientation of the marker object, player application 221a can tell display hardware 223a to render content data 220a in such a way as to match the angle and location 219a of the marker object 233. This has the effect of displaying the content data 220a in the real world, relative to a marker object 233. The illusion of the content data 220a occupying the real world is very convincing.

As the user of the mobile device 104 moves the mobile device 104 around the marker object 233, the player application 221a takes the new location and orientation of the marker object 233 and tells display hardware 223a to render content data 220a in such a way as to match the new angle and location 219a of the marker object 233. This maintains and reinforces the illusion that the content data 220a is occupying the real world, as the proprioceptive feedback from moving the mobile device 104 is matched by the visual feedback of the content data 220a appearing to match the motion of the device relative to the world as seen through the display of the device.

Wearable Devices

The main functions of a Wearable Augmented Reality (AR) device are described below in further detail with reference to FIG. 2.

While mobile devices 104 are ubiquitous, they have some distinct disadvantages when compared to wearable displays 106 in the area of Augmented Reality.

Mobile devices 104 require the viewer to hold the device up in front of their face in order to see the display and consume the experience which may cause fatigue.

The displays of most mobile devices is a single display, allowing only a two dimensional representation of any three dimensional content being displayed.

Wearable devices which have two displays, one for each eye, allow content creators to show a different angle of the content to each eye, and the device does not need to be held up by one hand.

These devices are commonly built using the same internal components as modern mobile devices, with differences in the area of displays. Cameras, gyroscopes and many other features now common in mobile devices are present in most binocular wearable devices. From the perspective of the methods and systems described in this document, they are almost functionally identical, until the issue of displaying the content is addressed.

A camera or other sensor, a display and the internal computational components necessary for combining those parts with the augmented reality application and the content are all required for the consumption of augmented reality. Devices with these components have existed for some years, though their use as augmented reality viewing devices is not yet mainstream.

As described above, augmented reality content may be displayed superimposed on a background image feed captured by a camera and displayed on a display of a mobile device. Computational components may be used to position and orient the augmented reality content on the display relative to a predetermined marker, being a pre-registered pattern or image, in the background image. The process of identifying and tracking a marker using a wearable device is discussed in further detail below with reference to FIG. 2.

Example wearable device 106 may contain a sensor 216b, memory 211b, and CPU 212b. Memory 211b may store software code that can be executed by CPU 212a. The software may include a pattern or image recognition component 217b, which may use computer vision to recognise patterns in the images captured by the sensor 216b. The software may further include a player application 221b, which may contain pre-loaded image and pattern datasets for the pattern recognition component 217b to compare against each frame of captured image data, in order to allow the pre-determined images and patterns to be identified. In some embodiments, player application 221b may communicate with a remote file server (not shown) to check against a database of previously registered patterns and images for the pattern or image recognition component 217b to recognise. In some embodiments, the player application 221b may be configured to allow a user of the wearable device 106 to capture and register patterns and images from their immediate surroundings into player application 221b. In some embodiments, sensor 216b may comprise a depth sensor or other kind of sensor that allows the device to physically measure the real-world environment around the device. In some embodiments, the camera being used for pattern recognition component 217b may not be contained within wearable device 106. External sensors may serve this function. In some embodiments, the location and orientation of wearable device may be determined through tracking provided by an external tracking system such as using infrared tracking or some other tracking method.

Once the pattern recognition component 217b detects patterns registered in memory 211b with those captured by sensor 216b, it can begin tracking the location of that pattern in the camera's view in each frame. In some embodiments, pattern recognition component 217b may be located remotely from wearable device 106 on a separate processing device or network of processing devices. Image data may be sent to pattern recognition components 217b from wearable device 106, and data about any recognised patterns or images may be sent back to wearable device 106.

Memory 211b may store further software code including object tracking component 218b, which may be executed by CPU 212b to continue tracking the pattern recognised by the pattern recognition component 217b. Patterns which can be tracked must contain visual information which allows object tracking component 218b to be able to discern the orientation of the pattern. Patterns which contain patterns that make it impossible to discern which orientation the pattern is in in relation to the camera are unsuitable for this recognition and tracking technique. The location of the tracked object is stored in memory as location 219b of marker object 233.

Wearable devices 106 or any other processing device that employs depth sensors, LIDAR, SONAR, RADAR or other physical-world detection methods gather information about the composition of the physical world beyond the information captured by sensor 216b. Many of these sensors are able to provide data from which a location or features of a recording may be understood. This data may include the location and shape of features in the physical world. The data gathered can be aligned to an existing real world coordinate system that fits the scale of the recorded data. This coordinate system may then be used to place virtual content into a background image being captured by sensor 216b and displayed by device 106.

Assuming that the registered and identified pattern contains information that object tracking component 218b can track, the location and orientation of the pattern is known. This location, orientation and scale information is passed to player application 221b once per update, as described below.

In many real-time applications, the update rate of displaying frames or processing outputs is corresponds with frame rate. Each time a frame is made ready to display, or a piece of data is prepared for output to another function (internal or external to the device preparing the function), this is called an update.

Content data 220b may reside in memory 211b. In some embodiments, content data 220b resides in an external memory device, memory card or external network. In some embodiments, content data 220b is streamed from an external file server. In some embodiments, content data 220b may consist of a still image, a video file, an animated or non-animated three dimensional object, a sound, text or piece of software instruction.

Once per update, player application 221b receives the location 219b of the marker object 233 and the relevant portion of the content data 220b. The content may have animations which the player application 221b will execute. Regardless of the type of content 220b, be it flat graphical elements, 3D graphic data or other effect, the content is handled in a virtual space approximating the real world space perceived by mobile device 104. Methods for combining these spaces vary, typically consisting of one or more elements of marker objects 233, gyroscopes, accelerometers, magnetometers, tracking cameras such as infrared, and GPS, but those technologies are non-exclusive.

CPU 212b passes the location 219b of marker object 233 and the location, orientation and scale of content data 220b as it relates to the frame to be rendered, on to the display hardware 223b. Display hardware 223b takes the known location, orientation and scale of the content data 220b and renders it to one or more displays.

In some embodiments, the wearable device will have one display. In these embodiments the wearable device is functionally identical to that of mobile device 104 and display hardware 223b renders the virtual content once.

In some embodiments, wearable device 106 has two displays 29b and 230b, one for each eye. In these embodiments the wearable device functionality differs from that of mobile device 104 in several very important ways. The requirement for the audience to hold the mobile device 104 is not present here, as the display is worn on the face. The ability to display two distinct images on wearable device 106, one for each eye is the important distinction.

Display hardware 223b renders the virtual content twice, once for each display 229b and 230b. These two renders are created to display the content as viewed from two different angles, in order to create a 3-dimensional experience for the viewer. The angles are derived from the process as outlined in the detailed description of FIG. 9, with offsets which take into account the distance between the two displays 229b and 230b.

Render left data 227b is rendered so that it can be shown on display left 229b. Render right data 228b is rendered so that it can be shown on display right 230b. This process is continuously updated, such that the location, orientation and scale of the virtual object represented in content data 220b always appears to be in the correct real-world location as shown on display 229b and 230b, no matter the orientation of wearable device 106 in relation to marker 233.

As CPU 212b is generating the location, orientation and scale of content data 220b, sensor 216b's image for that frame is sent to display hardware 223b to be rendered "before" content data 220b, so as to appear behind content data 220a. This superimposes content data 220b on top of the image from sensor 216b, creating the visual impression that reality has been augmented by the virtual content 220b.

Figure 12:
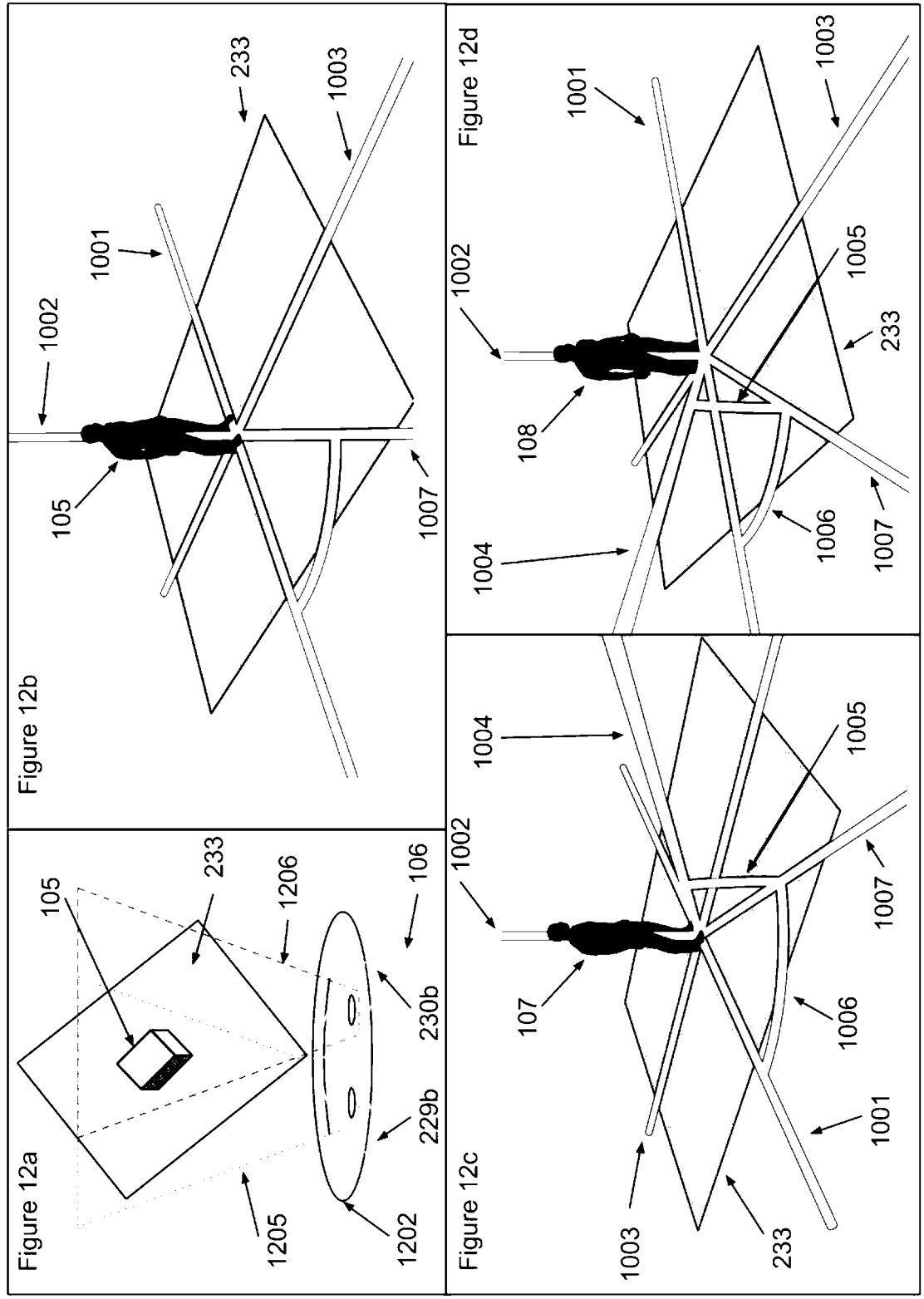
FIG. 12 shows the way stereoscopic rendering would be derived.

Example wearable device 106 in FIG. 12 illustrates a piece of 3D content data 107, 108 rendered to be standing on marker object 233. The two different display examples are showing the content oriented at very slightly different angles. These angles equate to the angles of the observer's eyes as they look through the display left 229b and display right 230b. This takes advantage of the stereoscopic nature of human sight to present the audience with what looks like a naturally three dimensional object.

The location and orientation of the marker 233 can be calculated according to the method described below, with reference to FIG. 10, and is stored as location 219*b* of marker object 233. This location is delivered to player application 221*b*. Knowing the location and orientation of the marker object 233, player application 221*b* can tell display hardware 223*b* to render content data 220*b* in such a way as to match the angle and location of the marker object 233, creating render left data 227*b* and render right data 228*b*. This has the effect of displaying the content data 220*b* in the real world, on top of the marker object 233. The illusion of the content data 220*b* occupying the real world is very convincing.

As the wearer of wearable device 106 moves the wearable device 106 around the marker object 233, the player application 221*b* takes the new location and orientation of the marker object 233 and tells display hardware 223*b* to render content data 220*b* in such a way as to match the new angle and location of the marker object 233. This maintains and reinforces the illusion that the content data 220*b* is occupying the real world, as the proprioceptive feedback from moving the wearable device 106 is matched by the visual feedback of the content data 220*b* appearing to match the motion of the device relative to the world as seen through the displays of the device.

In some embodiments, display left 229*b* and display right 230*b* may be transparent displays which allow the wearer of wearable device 106 to see the real world behind rendered content 107 and 108.

In some embodiments, display left 229*b* and display right 230*b* include one or more transparent, opaque or partially opaque displays that are worn on the face. In such embodiments, sensor 216*b* provides video footage to display left 229*b* and display right 230*b*, allowing the wearer of wearable device 106 to perceive the outside world beyond the wearable device 106.

Referring generally to FIG. 9, the three main components of a mobile device based Augmented Reality system are shown from various viewing angles. Mobile device 104 contains sensor 216. Sensor 216 is aimed at trackable marker 233. The location of trackable marker 233 is recognised by pattern recognition component 217. Through the process outlined above, displayed content 105 is displayed on trackable marker 233, as seen through display 225*a* on mobile device 104.

In some embodiments, trackable marker 233 is not required, as player application 221 is able to use sensor 216 to understand the geometry of the real world as it exists outside mobile device 104. In some embodiments, a depth sensor or other device may be used to understand the geometry of the real world as it exists outside mobile device 104.

In some embodiments, Simultaneous Localization and Mapping (SLAM) may be used to understand the relative offset of key objects in the real world through tracking the location and change in distance of points of contrast in the camera frame. This process requires no trackable marker object.

FIG. 9*a* shows the interaction between mobile device 104, content 105 and trackable marker 233 from the perspective of the mobile device 104. Through display 225*a* on device 104 content 105 may be seen, rendered on top of trackable marker 233.

FIG. 9*b* shows the interaction between mobile device 104, content 105 and trackable marker 233. Through display 225*a* on device 104 content 105 may be seen, rendered on top of trackable marker 233.

FIG. 9*c* shows the interaction between mobile device 104, content 105 and trackable marker 233, depicted from a side angle. On device 104 content 105 may be seen, rendered on top of trackable marker 233.

FIG. 9*d* shows the interaction between mobile device 104, content 105 and trackable marker 233, depicted from a top angle. On device 104 content 105 may be seen, rendered on top of trackable marker 233.

Referring generally to FIG. 10, four diagrams depicting the positional offset of viewing device 104 from the position of the trackable marker 233 are shown. The positional offset of viewing device 104 is the result of the function of object tracking component 218, and results in the relative location 219 of marker object 233 being determined with reference to device 104.

The positional offset is calculated with reference to Marker X axis 1001, Marker Y axis 1002 and Marker Z axis 1003, which intersect at the center of trackable marker 233. These axes provide object tracking component 218 with the exact location of the center of trackable marker 233. All preceding values are calculated as offsets from this location/angle.

The terminus of ray 1007 is the X, Z position of mobile device 104. The terminus of ray 1002 is the Y position of mobile device 104. Angle 1006 is the direction of ray 1007. Angle 1005 is the angle of ray 1004. The location of mobile device 104, having been determined as a position/angle relative to the position/angle of trackable marker 233, can be stored for later use.

In order to calculate the position and angle of trackable marker 233, a buffer may be maintained and updated incrementally as sensor 216 obtains data. In some embodiments, this sensor 216 may be a CMOS-like sensor, and a "rolling shutter" may update the buffer as sensor 216 scans a scene. In these cases, software may read from the buffer many times before the scene is completely refreshed. In some embodiments, hardware or software may be used to update the image buffer all at once, resulting in an updated "frame". In some embodiments, sensor 216 may have multiple scanning elements, in which case sensor 216 may not operate strictly based on a frame rate.

Computer program code executing on device 104 will query the buffer, which on some platforms may be contained in extraneous wrappers. For example, mobile platforms such as Android and iOS manage the camera at the operating system level, returning the buffer as an operating-system request. Others, such as most Windows platforms, use a variety of methods which then interface at a driver level.

After querying the buffer, software of device 104 attempts to recognize patterns in the captured frame or scene. On many platforms, such as those with depth cameras, gyroscopes, accelerometers, magnetometers, or other positioning hardware, additional features besides the image sensor data are used to stabilize and contextualize the sensor input to the software. Using additional positioning hardware means that in the case of a device movement, complex operations, such as determining motion through the image alone, can be simplified.

Typically detection of image features works on the principle of feature analysis, typically using a branch of analysis where easily detected features such as points of contrast or lines are converted to a general detection space where higher level patterns may be determined. For example, in some embodiments, a Hough transform may be used.

FIG. 10*a* shows the interaction between mobile device 104, content 105 and trackable marker 233 from the perspective of the mobile device 104. Through display 225*a* on device 104 content 105 may be seen, rendered on top of trackable marker 233. Marker X axis 1001, Marker Y axis 1002, Marker Z axis 1003, ray 1004, angle 1005, angle 1006 and ray 1007 are visible for clarity in this figure.

FIG. 10*b* shows the interaction between mobile device 104, content 105 and trackable marker 233 depicted from a top angle. Through display 225*a* on device 104 content 105 may be seen, rendered on top of trackable marker 233. Marker X axis 1001, Marker Y axis 1002, Marker Z axis 1003, ray 1004, angle 1005, angle 1006 and ray 1007 are visible for clarity in this figure.

FIG. 10*c* shows the interaction between mobile device 104, content 105 and trackable marker 233 depicted from a side angle. Through display 225*a* on device 104 content 105 may be seen, rendered on top of trackable marker 233. Marker X axis 1001, Marker Y axis 1002, Marker Z axis 1003, ray 1004, angle 1005, angle 1006 and ray 1007 are visible for clarity in this figure.

FIG. 10*d* shows the interaction between mobile device 104, content 105 and trackable marker 233. Through display 225*a* on device 104 content 105 may be seen, rendered on top of trackable marker 233. Marker X axis 1001, Marker Y axis 1002, Marker Z axis 1003, ray 1004, angle 1005, angle 1006 and ray 1007 are visible for clarity in this figure.

Stereoscopic 3D

Creating a three dimensional object, and then displaying that object on a single display results in a two dimensional image. In order to allow a person to see that object as three dimensional, a different image must be shown to each eye. The offset between each image needs to match the distance between the center of each of the viewer's pupils.

Referring to FIG. 11, interpupillary distance (IPD) 1112 represents the distance between the centers of the pupils of the viewer. IPD 1112 varies from person to person, though reliable mean distances can be assumed, and measurement and calibration methods exist.

There are a number of display options available to present each eye with a separate image. In some embodiments, a separate display is used for each eye, such as in wearable device 106. In some embodiments, the two displays may each be driven by separate display hardware modules 223. In some embodiments, a single hardware module 223 may be used.

In some embodiments, a single display is used across both eyes, with the display being split in half as shown on display 229*b*. In such embodiments, a single display hardware module is used. Where a single display is used, the display may be covered with a parallax filter that divides the display into vertical strips as shown on display 230*b*. The vertical strips alternate sending the underlying image to the left or the right side, to be seen by the left or right eye.

To accurately display a different image to two eyes, care must be taken to ensure that the offset of the rendered objects in the displays matches the IPD of the viewer. Non-accurate IPD calibration results in a less-accurate three dimensional sense of presence, but acceptable results are possible within a range of tolerance.

Referring in general to FIG. 11, 12, various examples of stereoscopic displays can be seen. In order to render a stereoscopic image, display hardware 223*b* sends render commands to two matching renderers (shown in FIG. 11*a*). Render left module 227*b* renders the image that will be shown to the left eye 1102, and render right module 228*b* renders the image that will be shown to the right eye 1103. These two images are then sent to the appropriate display or displays.

In some embodiments, there is a single display, but the image is displayed in such a way as to ensure that each of the left and right render goes to the required eye, such as by using interlacing of the left and right images. In such embodiments, the display hardware separates the interlacing through interlaced indexing, where alternating rows or columns of pixels represent multiple component images. This means that the display hardware 223*b* does not need to render the left 107 and right 108 images interlaced, as the interlacing is done when the images are sent to the display.

In some embodiments, the reconstruction is handled entirely by the CPU 212*a* of the mobile device 104. In some embodiments, the reconstruction is shared by the CPU 212*a* and the display hardware 223*a* of the mobile device 104. In some embodiments, the reconstruction is handled entirely by the display hardware 223*a* of the mobile device 104.

In some embodiments, the reconstruction is handled entirely by the CPU 212*b* of the wearable device 106. In some embodiments, the reconstruction is shared by the CPU 212*b* and the display hardware 223*b* of the wearable device 106. In some embodiments, the reconstruction is handled entirely by the display hardware 223*b* of the mobile device 106.

In some embodiments, the features, functions, hardware and software of the mobile or wearable device may be provided instead or in addition to a desktop computer, tablet, networked or local virtual machine, or distributed network of computers.

The calculations used to define the correct angles needed to render the left 107 and right 108 images may be derived from values provided by certain hardware and software combinations. Some hardware may report values such as IPD or other rendering requirements. In some embodiments, these values are manually input by the wearer of wearable device 106. In some embodiments, these values are detected by eye-tracking sensors built into the hardware of wearable device 106.

Shown in FIG. 11*b*, wearable device 106 consists of two separate displays. Display left 229*b* is a separate piece of display hardware from display right 230*b*. In some embodiments, there will be two units of display hardware 223*b*, each servicing a single display. In some embodiments, there may be one unit of display hardware 223*b*, serving both displays. The image shown on display left 229*b* is image left 107. The image shown on display right 230*b* is image right 108. Image left 107 and image right 108 are rendered from different angles, so as to emulate the viewing angle of viewing the scene by a right and left eye separated by an IPD. Sensor 216*b* is the component that is being used to determine the location of the wearable device 106 with reference to a marker 233, through the use of the methods outlined in FIG. 10. This is further explained below in relation to FIG. 12.

As shown in FIG. 11*d*, in some embodiments, image left 107 and image right 108 will be displayed on a single display. In this case, the separation of image left 107 and image right 108 may be handled through the use of a parallax display. Parallax display 1104 (shown in FIG. 11*c*) displays the two images separated in preparations for parallax barrier 1101. Parallax barrier 1101 (shown in FIG. 11*c*) conceals image left 107 from the right eye 1103, at the same time concealing image right 108 from the left eye 1102. Proper alignment of the viewer's eyes in relation to the display are important for this effect to work properly, but this alignment can be achieved through adjusting the distance from the eye to the display, or adjusting the location of the two images in relation to the parallax barrier 1101. Moving the eye closer or further away from the display allows the viewer to find the "sweet spot", where the parallax barrier 1101 allows the viewer to see the left and right images at the correct alignment to achieve the full stereoscopic 3D effect.

The image slices left 1105 and image slices right 1106 may be adjusted through moving either or both of them from side to side in order to direct the vertical strips through the parallax barrier towards slightly different angles. This is another way to accommodate viewers with different IPDs.

FIG. 11*d* shows an interlaced image to be shown on parallax display, where display hardware 223*b* divides image left 107 into vertical strips 1105, and image right 108 into vertical strips 1106. The division occurs when the two images are rendered by display hardware 223*b*. Each image is rendered at an image size that is half the pixel width of the display. Half the pixels of the display are dedicated to the vertical strips of the image that are rendered for the left eye, and the other half of the pixels of the display are dedicated to the vertical strips of the image that are rendered for the right eye. The two renders are then combined in a vertically interlaced format for the display, beneath or behind the parallax barrier 1101 from the viewer's perspective.

For an example auto-stereoscopic display of pixel pitch 65 micrometers, eye separation (IPD) 63 mm, viewing distance 30 cm, and refractive index 1.52, the pixel-barrier separation needs to be about 470 micrometers.

The diagram exaggerates the width of the strips for illustrative purposes. In real applications these strips are extremely thin, and the spacing of the parallax barrier 1101 may be in the range of approximately 470 micrometers. Display 1104 shows the distribution of the two images as they are sliced for display to the two eyes. Render left 227*b* is sliced into slices 1105, and render right 228*b* is sliced into slices 1106. In some embodiments, these slices are a single pixel wide each. In some embodiments, these slices are more than one pixel wide each, for example 2, 3, 4, 5, 6, 7, 8, 9, or 10 pixels wide.

Split display as shown in FIG. 11*e* shows how a single-display device might show separate images to both the left and right eye. Display hardware 223*b* takes each frame, splits the single display into two images, each shown to a separate eye. Display left 229*b* shows image left 107, and display right 230*b* shows image right 108. Lenses between the displays and the viewer's eyes ensure that even though the single display device is worn on the face, the content 105 is in focus.

Each of the two images on display left 229*b* and display right 230*b* (shown in FIG. 11*e*) rendered to the left and right eye need to be rendered in such a way as to make it appear as though the viewer is looking at displayed content 105 from the perspective of either eye accordingly.

Display hardware 223*b* or CPU 212*b* determines the angle to render image left 107 and image right 108 based on the location of the wearable device 106 in relation to marker 233, as well as the location of the eyes of the viewer in relation to the location of the wearable device 106.

FIG. 11*f* shows how the position of the viewer's eyes in relation to the device is determined through the measuring of the IPD 1112. IPD 1112 may be measured through the use of a hardware or software tool. Such tools may typically come with the wearable device 106. Once measured, the wearer's IPD may be stored in the internal memory of wearable device 106. This value is referenced by CPU 212*b* for each frame, so that display hardware 223*b* is able to use the correct values when rendering the two points of view required for render left 227*b* and render right 228*b*.

As the IPD 1112 is the distance between pupil left 1102 and pupil right 1103, and the wearable device's location with reference to the marker 233 location 219*b* is known based on the determination method described earlier with reference to FIG. 10, the location of each eye and the perspective each eye would have on the marker is also known.

Referring to FIG. 12, FIG. 12*b* shows the view from angle 1004 of the wearable device 106 in relation to content 220*b* and marker 233.

For a single-screen display 104, only one image of displayed content 105 needs to be rendered, while a stereoscopic display 106 must render two images from two different angles 107, 108.

FIG. 12*a* shows viewer 1202, wearing wearable device 106. Display left 229*b* and display right 230*b* are in front of the viewer 1202's eyes. Each eye is able to see a given frustum. Frustum left 1205 shows the area that display left 229*b* will display. Frustum right 1206 shows the area that display right 230*b* will display. These two frustums overlap in such a way as to allow display left 229*b* to show an angle of the rendering of content data 220*b* into content 105. The rendered image as seen in frustum 1205 is displayed in display 229*b* would be image 107, as depicted in FIG. 12*c*. The overlapping area between view frustum 1205 and view frustum 1206 would also show the second angle of the rendering of content 220*b*, display right 230*b*. The rendered image as seen in frustum 1206 is displayed in display 230*b* would be image 108, as depicted in FIG. 12*d*.

FIG. 12*b* shows the tracking marker 233, angle 1001, angle 1002, angle 1003, ray 1007 and content 105 as seen from the perspective of sensor 216 on wearable device 106.

In some embodiments, CPU 212*b* of wearable device 106 may execute a player application 221*b*, which causes CPU 212*b* to determine the view areas of frustum left 1205 and frustum right 1206 and what each frustum will show each eye of viewer 1202, by using the location of the wearable device 106 and the IPD of the viewer to determine the correct angle to simulate the view of the rendered content for each eye. The content may be shown on a single display or two displays, as described above with reference to FIG. 11. This process is dependent on the specific hardware configuration of the display hardware. Player application 221*b* instructs display hardware 223*b* to render content 220*a* as it would be seen in frustum left 1205. This is produces render left data 227*b*. Player app 221*b* also instructs display hardware 223*b* to the rendering of content 220*b* as it would be seen in frustum right 1206. This produces render right data 228*b*.

FIG. 12*c* is an illustration of content data 220*b* as rendered for frustum left 1205. The result is image left 107. FIG. 12*d* is an illustration of content data 220*b* as rendered for frustum right 1206. The result is image right 108.

In FIG. 12*c*, ray 1004 can be seen extending off to the right of the image. Ray 1004 is the direct line from the center of wearable device 106 to the center of marker 233. As ray 1004 is going to the center of wearable device 106, and FIG. 12*c* is a representation of image left 107, ray 1004 points to the center of wearable device 106, off to the right.

In FIG. 12*d*, ray 1004 can be seen extending off to the left of the image. Ray 1004 is the direct line from the center of wearable device 106 to the center of marker 233. As ray 1004 is going to the center of wearable device 106, and FIG. 12*d* is a representation of image right 108, ray 1004 points to the center of wearable device 106, off to the left.

Figure 13:
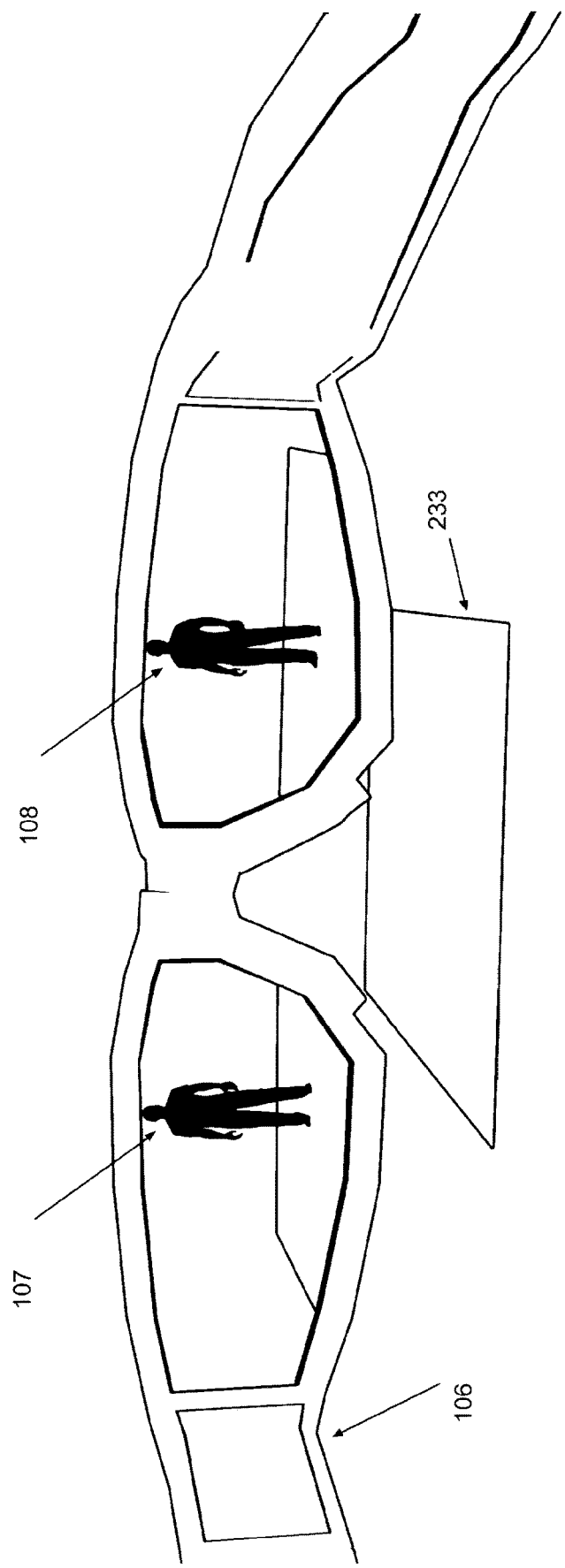
FIG. 13 shows the three necessary components for a head mounted Augmented Reality experience.

Referring generally to FIG. 13, the three main components of a wearable eyewear device based Augmented Reality system are shown. Wearable device 106 contains sensor 216*b*. Sensor 216*b* is aimed at trackable marker 233. The location of trackable marker 233 is recognised by pattern recognition component 217*b*. Through the process outlined above, the rendering of content 220*b* is displayed on trackable marker 233, as seen through display left 229*b* and display right 230*b* on Wearable Device 106.

Depth Sensor Coverage Using One or More Sensors

Traditional video recording employs a set of techniques developed over decades which allow a producer and camera operator to present a subject in a number of different ways. For example, the techniques used for a particular recording may be selected to show the subject in a way that is easily comprehended by a viewer. In some cases, techniques may be selected to show the subject in a more artistic light, or techniques may be employed to show the subject in a flattering way. The set of techniques used may include angles, shots, motions, and other techniques defined within the limitations of the medium.

One example of a technique used is selecting the angle from which to record a subject. A camera cannot see both the front and the rear of a subject simultaneously. A subject may be placed in front of a mirror, or a second camera may be employed to capture a second angle, but these are expansions on the capabilities of a 2D camera. The recording of two angles at once cannot be achieved by a single 2D camera on its own.

When viewing footage of a subject shot by more than one camera from more than one angle, the producer of the recording must decide how to display the recordings of the different angles to the user. They separate recordings of each angle may be displayed sequentially, or they may be displayed simultaneously in a single image or frame.

Recording with depth sensors for volumetric display has much of the same challenge. The difference for volumetric display is that the footage from multiple sensors aimed at a single subject can be assembled in such a way as to create a more coherent 3D volumetric reconstruction of the original subject. Because of this, the playback can be viewed from any arbitrary angle chosen by the viewer.

Ensuring that the subject is presented to the viewer as a coherent object requires a balance between the number and positions of sensors deployed around the subject at the time of recording the subject, and the amount of data the producer wishes to send to the viewer. The more sensors, the more coherent the reconstruction of the subject of the recording will be. However this will result in more data being captured, more processing of the captured data, and more data to download by the viewer. This places an undesirable burden on the network requirements for viewing.

Having made a synchronized multi-angle recording of a subject through the use of multiple sensors, or a single sensor and a reflective surface, the reconstruction of the recordings without destructive post-processing would be desirable.

Figure 14:
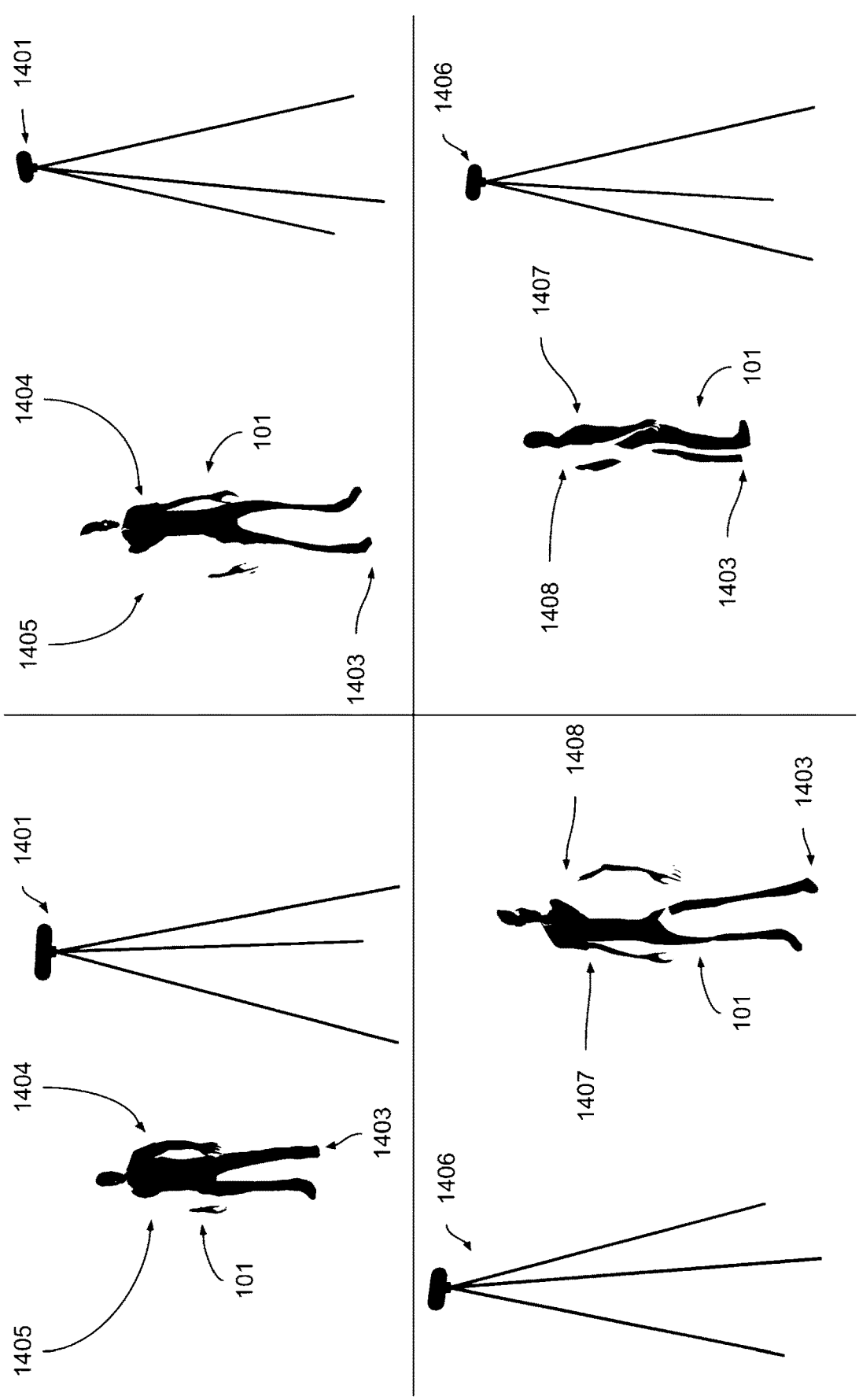
FIG. 14 illustrates the area of the subject which is covered when a single depth sensor is used for capture.

FIG. 14 shows sensors 1401 and 1406 recording Subject 101 from Position 1403. Sensor 1401 and 1406 are part of sensor 102. Sensor 102 may be an individual sensor or an array of sensors. Sensor 1401 and 1406 are depth sensors recording depth information about subject 101. In some embodiments, sensors 1401 and 1406 may be combined with colour sensors. In some embodiments, the depth sensors and the colour sensors may be separate devices.

When a single depth sensor 1401 is used, depth information about the subject 101 may be recorded from a single direction. This means that depth sensor 1401 is able to register the shape of the portions of subject 101 facing sensor 1401 and not obscured by any intervening object. For example, if subject 101 were facing towards sensor 1401, but had their hand between their face and sensor 1401, sensor 1401 would not be able to detect anything within the distance between the hand of subject 101 and the face of subject 101 for the duration that it is blocked by the hand.

Black area 1404 denotes the area of subject 101 which is visible to sensor 1401. White area 1405 denotes the area of subject 101 which is not visible to sensor 1401.

A second individual sensor 1406 is capturing subject 101 from a different angle. Black area 1407 denotes the area of subject 101 captured from this angle. White area 1408 denotes the area of subject 101 which is not captured by sensor 1406 from this angle.

Figure 14B:
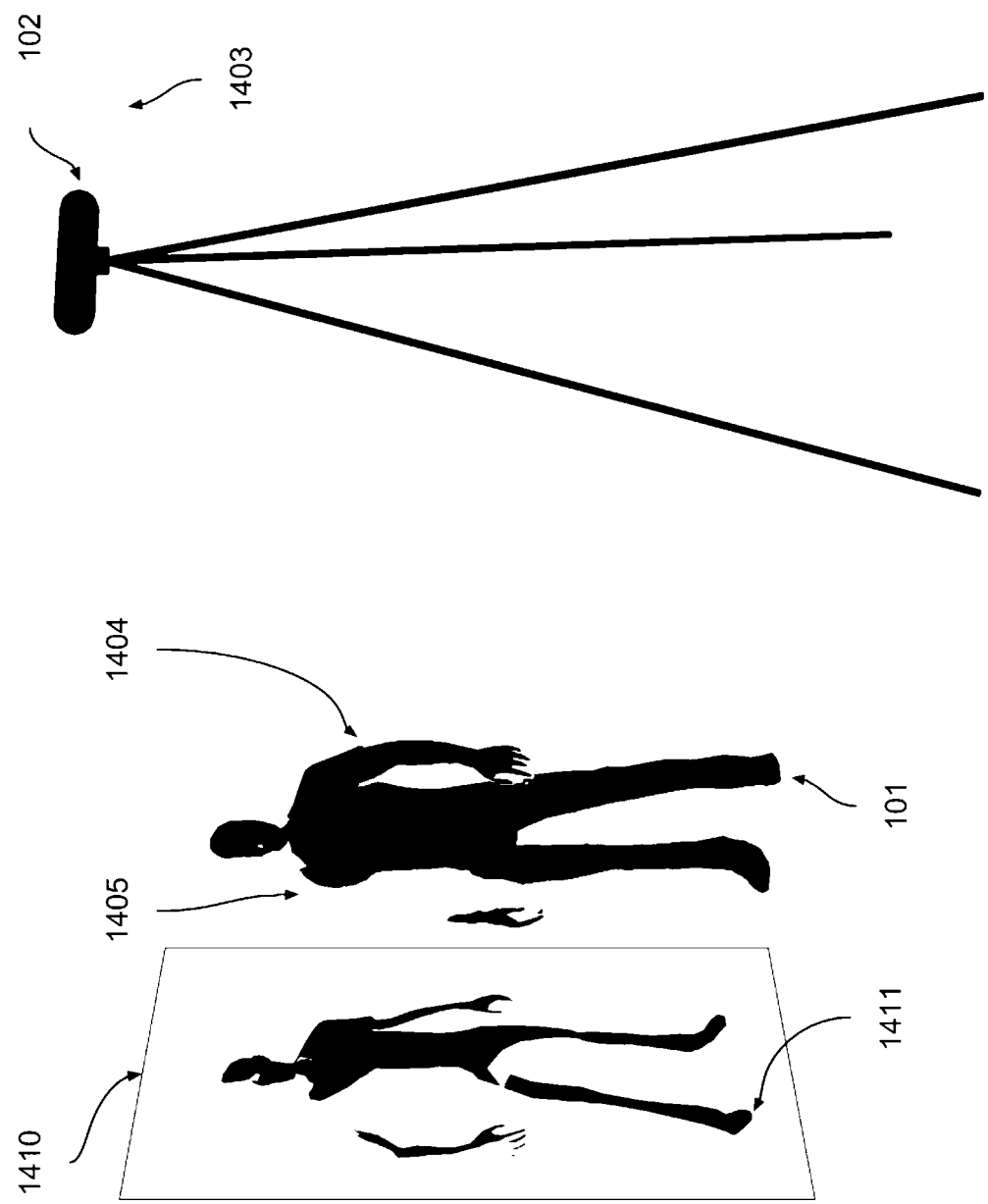
FIG. 14b illustrates the area of the subject which is covered when a single depth sensor and a mirror are used for capture.

As shown in FIG. 14*b*, in some embodiments, it is possible to place a mirror 1410 behind subject 101, such that sensor 102 is able to see portion 1404 and the obscured portion 1411. Mirror 1410 allows sensor 102 to capture the portion of the subject 101 that is facing away from sensor 102. This allows the sensor 102 to read the depth of the objects in the mirror, allowing the sensor 102 to record the portion of subject 101 that was previously obscured 1405. The mirror redirects the depth in a process similar to refraction; where the depth, still measured as distance from camera, bends suddenly after the mirror's surface. As the mirror reflects both the light and the distances from the sensor, many depth sensors perceive the image reflected in the mirror as a valid object at an additional depth starting from the mirror's surface.

The portion of the image captured which is inside the mirror 1410 may be treated as if it were being captured by a separate sensor 102. This means that the reflected subject 101 requires separate calibration distinct from the calibration used for the portion of the subject 101 that is facing the sensor 102. The same calibration tools may be used, though the values will all be very different.

In some embodiments, more than one mirror may be used. A separate calibration will be required for each visible portion of subject 101 which is visible to sensor 102.

Figure 15:
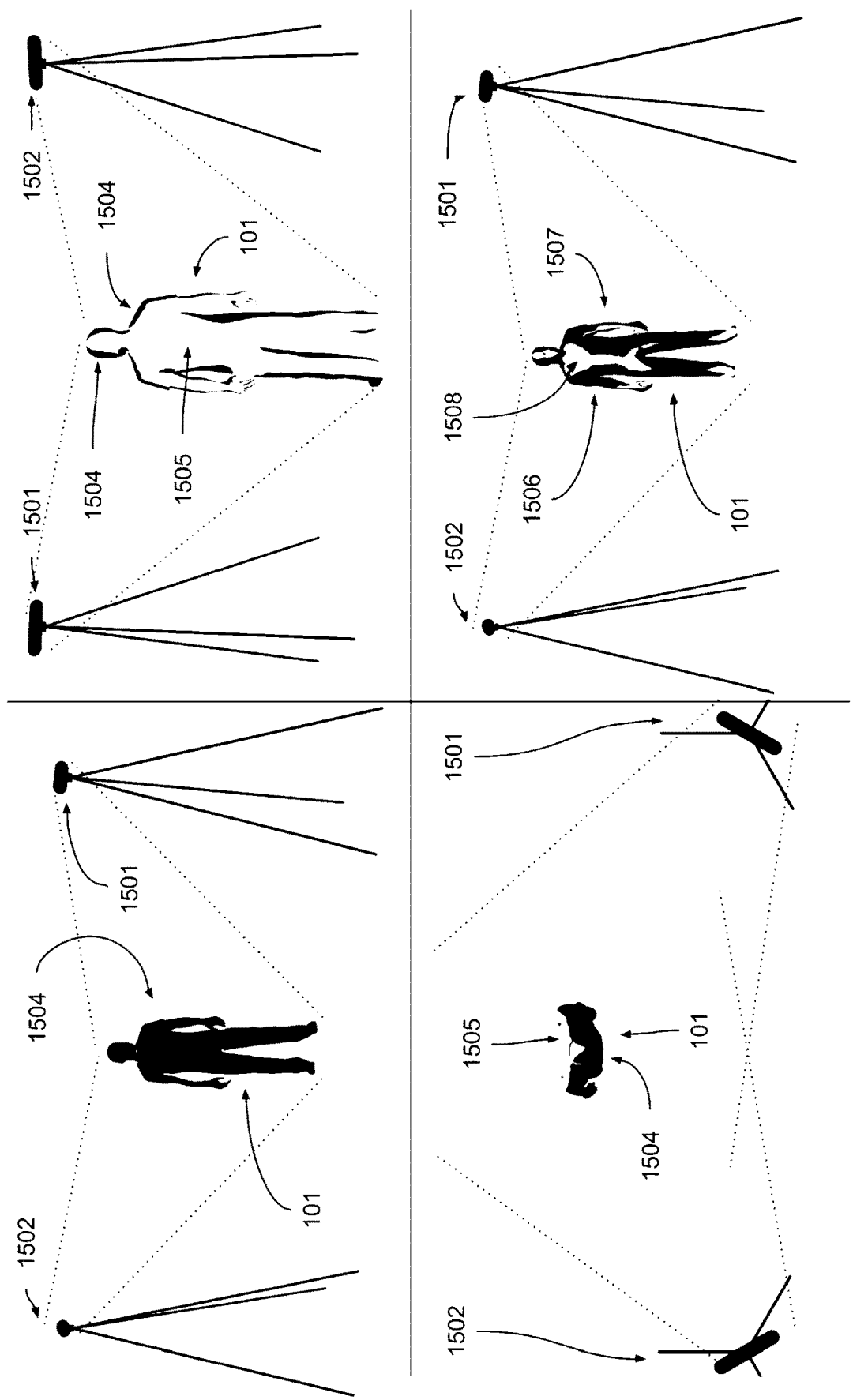
FIG. 15 illustrates the area of the subject which is covered when a pair of depth sensors are used for capture.

Referring generally to FIG. 15, Sensor 1501 and Sensor 1502 capture Subject 101 from two different, overlapping angles. Sensor 1501 and 1502 are part of sensor 102. Sensor 102 may be an individual sensor or an array of sensors.

When two sensors 102 are used in an array comprising of two sensors 1501 and 1502, subject 101 may now be captured from two different directions. The resulting overlap has many positive effects, and some negative ones. The effects of an intervening object obscuring one sensor is lessened, as the other sensor's data can be used to fill in the missing areas. However, using more than one sensor may require more than one recording/processing device 205, and may place higher demands on processing network 103.

Black area 1504 denotes the combined coverage of both Sensor 1501 and Sensor 1502. White area 1505 denotes the area of Subject 101 that is not covered by either of the two sensors. Grey area 1506 is specifically the area captured by Sensor 1502, while grey area 1507 is specifically the area captured by Sensor 1501. Area 1508 is the overlap zone captured by both Sensor 1502 and Sensor 1501.

Figure 16:
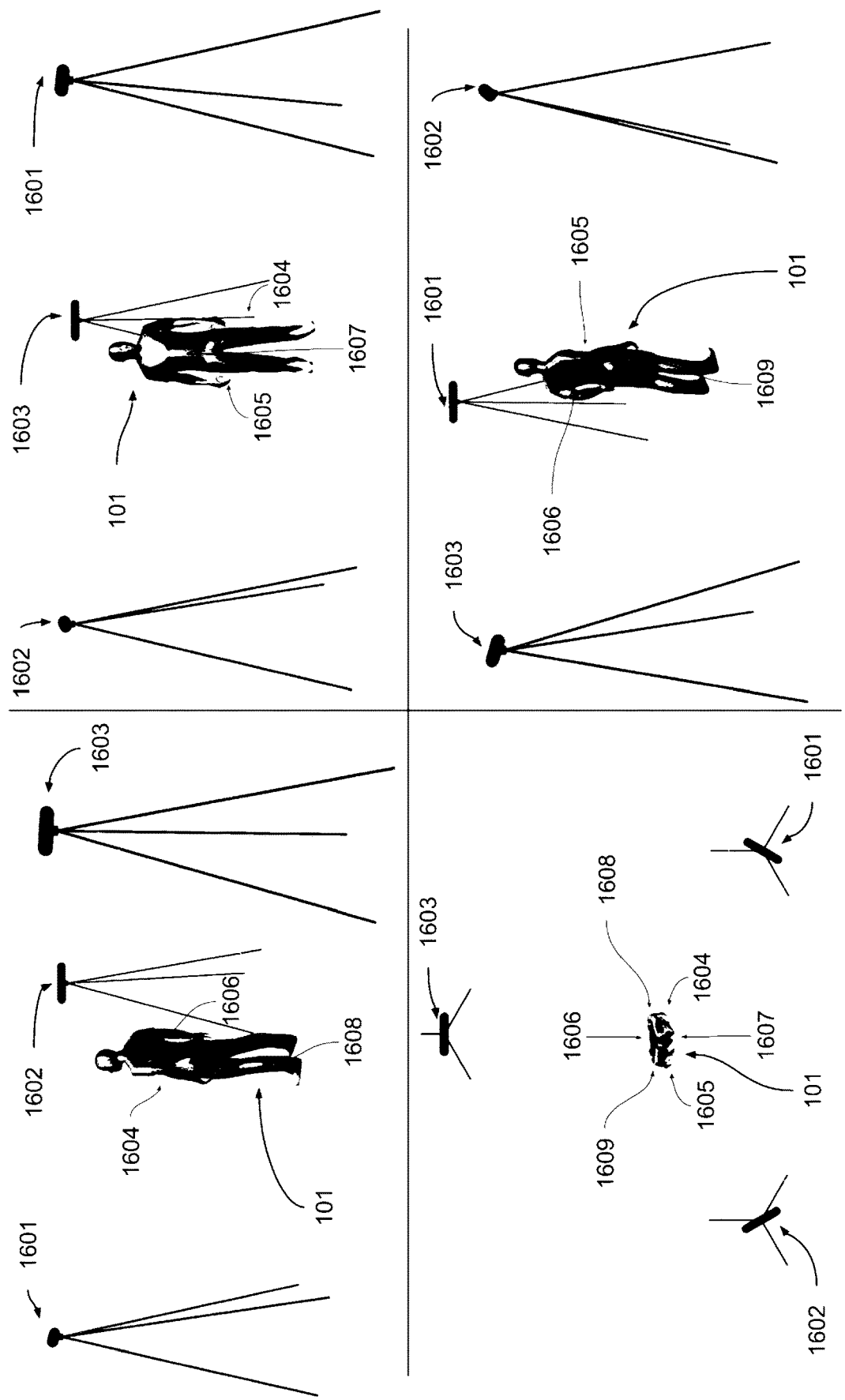
FIG. 16 illustrates the area of the subject which is covered when three depth sensors are used for capture.

Referring generally to FIG. 16, Sensor 1601, Sensor 1602 and Sensor 1603 surround subject 101. Sensor 1601, 1602 and 1603 are part of sensor 102. Sensor 102 may be an individual sensor or an array of sensors. Three or more sensors 102 may provide all-around coverage of a subject 101. As an example, sensor arrays 102 that include more than three sensors 102 provide greater confidence that the recording will suffer from fewer holes that may occur due to a hand, limb, or other object obscuring the face or some other part of subject 101. In some embodiments, sensors 1601, 1602 and 1603 may be placed at different heights to ensure that areas only visible at high or low angles are also recorded. The goal with larger arrays of sensors is to ensure as much of the subject 101 is visible to the array as possible. This may have the consequence of creating a larger volume of data recorded. Some ways of ameliorating this are listed below. In some embodiments, there may be a different number of depth sensors than colour sensors. In these embodiments the colour data is matched or projected to the depth data. In some embodiments, the sensors may be mounted on stationary mounts, or they may be mounted on mobile mounts controlled either automatically or manually.

Sensor 1601 captures Area 1604, Sensor 1602 captures Area 1605 and Sensor 1603 captures Area 1606. Area 1607 is the overlap between Area 1604 and Area 1605, captured by both sensors 1601 and 1602. Area 1608 is the overlap between Area 1604 and area 1606, captured by both sensors 1601 and 1603. Area 1609 is the overlap between Area 1606 and Area 1605, captured by both sensors 1603 and 1602.

In some embodiments, the overlapping areas may encompass the capture area of more than two sensors. For example, an area of subject 101 may be captured simultaneously by three or more sensors. The amount of area a given sensor covers depends on the configuration of the sensor array.

Seamless Multiple Mesh Integration Through Viewer Angle Derived Crossfading

Figure 17:
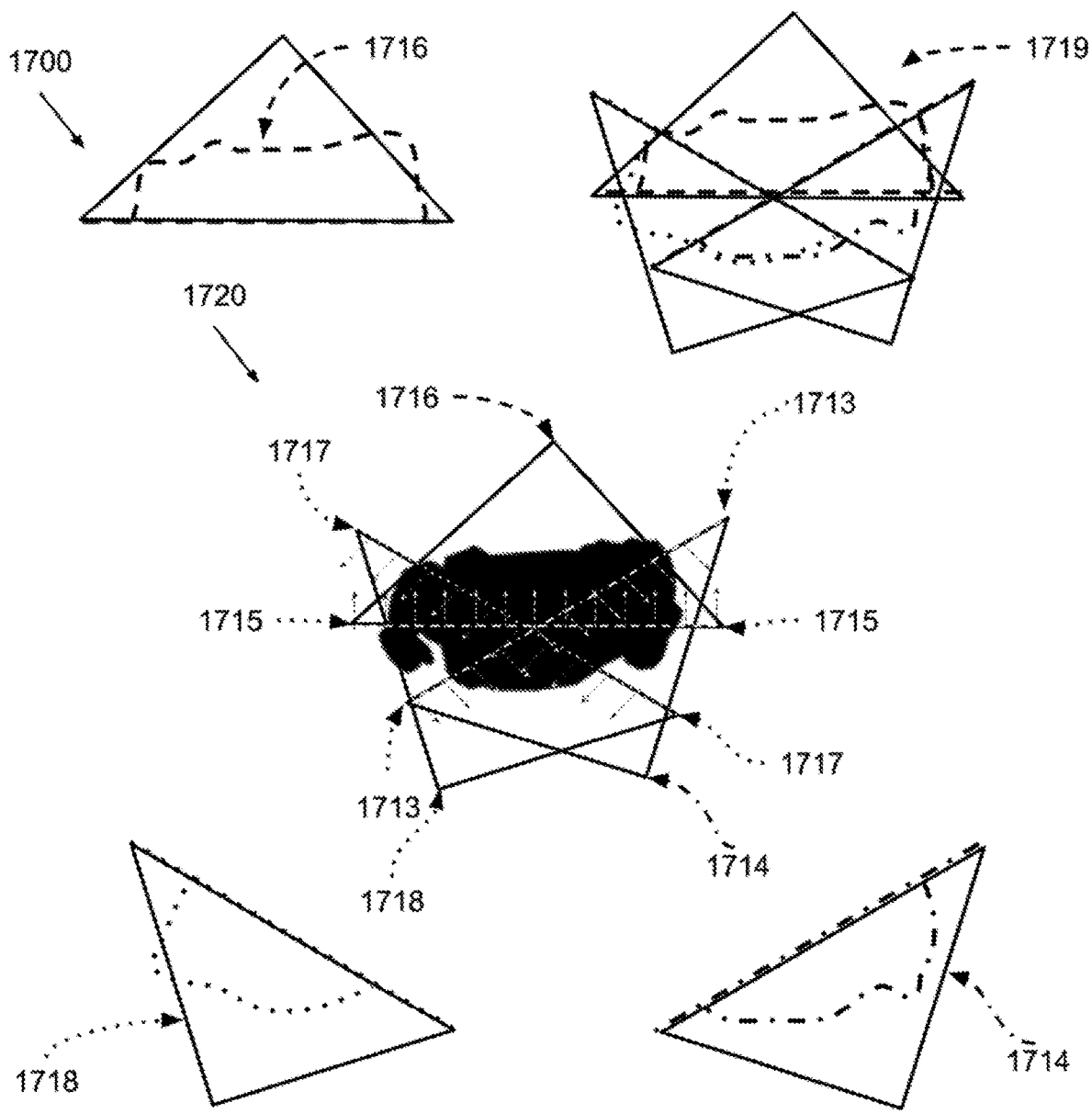
FIG. 17 depicts the assembly of the various skins.

Referring generally to FIGS. 17 and 18, image 1700 illustrates the way recorded sensor data taken from various sensors 102 at different angles can be combined to reconstruct extruded skins 1714, 1716 and 1718 of a recorded subject 101. Image 1700 also shows the overlap that may be created when using more than one sensor 102 positioned around a subject 101. In image 1700, coherently arranged skin 1720 depicts a human reconstruction as seen from above. The top-down viewing angle is used in this image for illustrative purposes, showing how skins 1714, 1716 and 1718 might be combined to produce coherently arranged skin 1720.

In this context, a skin is a virtual reconstruction of at least a portion of a subject from a set of depth points. As the depth points as recorded by sensor 102 are typically arranged based on the viewing frustum of each sensor 102, generating a skin from the data points involves altering the data to conform to a shape of subject 101 as recorded by sensor 102 as depth data 204. An example of a skin is skin 1714. Skin 1714 is a virtual object which is a reconstruction of data derived from a depth recording captured by sensor 102. Skin 1714 is a three dimensional virtual representation of a three dimensional real-world object or subject 101 as viewed from a particular angle.

Where more than one sensor 102 has been used on a given subject 101, more than one skin may be generated to reconstruct the virtual representation of subject 101. The reconstruction may be performed by mobile device 104 or wearable device 106. In some embodiments, the reconstruction may be performed by a code module executed by a virtual camera processor (VCP) 3003 of a device external to mobile device 104 or wearable device 106. The VCP 3003 is detailed in FIG. 30, described in further detail below. The VCP 3003 may run on processing network 103, or on a computer, laptop, tablet, or any other computing device. In some embodiments, reconstruction may be performed across multiple devices, networked wired or wirelessly to each other or another network.

The device performing the reconstruction receives the combined colour and depth data 208 from all sensors 102 that were used to create the recording of subject 101. In the example illustration in FIG. 17, three sensors 102 have been used to create skins 1714, 1716 and 1718. The individual skins 1714, 1716 and 1718 are reconstructed by calibrating the depth data recordings from each of the sensors 102. The depth data recordings may be calibrated to each other manually on the recording/processing device 205. In some embodiments, the calibration task may be automated, using common features identified in each depth data recording to calibrate and match the recordings to one another. The various sensor 102 feeds are input into the processing network 103, where the TRS 803 or a similar guide may be used to align the data from the various sensors 102.

In order to convert the sensor feeds or data points into a skin, additional transformations aside from common translation, scale and rotation may be required in the calibration. For example; lens distortion often needs to be compensated for. Additionally, transformations may also be employed when a desired subject has been recorded by surrounding the subject with multiple sensors or by placing one or more outward facing or rotating sensors in an environment, or even by restricting the captured data to a certain area.

Among such schemes, perspective projection transformations of the depth data may be used to compensate for most lens distortions one would expect from most depth sensors. Additional projection transformations, such as cylindrical transformation, may be used to compensate for lens distortion when using rotating or LIDAR style depth sensors. A spherical projection transformation may be used to compensate for lens distortion when using a fish-eye or reflective probe type sensor. Using these projection transformations allows the data points from the recording to be reconstructed in the proper 3D space. Skew and Oblique transformations may be required for cropped or offset views, such as those present in mirrors.

In some embodiments, where the sensor 102 may be represented by a virtual camera, these projections and more may be employed by the virtual camera as if it were a sensor 102.

In some embodiments, the reconstruction of the depth data is handled entirely by the CPU 212a of the mobile device 104. In some embodiments, the reconstruction is shared by the CPU 212a and the display hardware 223a of the mobile device 104. In some embodiments, the reconstruction is handled entirely by the display hardware 223a of the mobile device 104.

In some embodiments, the reconstruction is handled entirely by the CPU 212b of the wearable device 106. In some embodiments, the reconstruction is shared by the CPU 212b and the display hardware 223b of the wearable device 106. In some embodiments, the reconstruction is handled entirely by the display hardware 223b of the mobile device 106.

In some embodiments, the features, functions, hardware and software of the mobile or wearable device may be provided instead or in addition to a desktop computer, tablet, networked or local virtual machine, or distributed network of computers.

As the recording/processing device 205 receives images from the sensors 102, it creates skins 1714, 1716 and 1718 based on the colour and depth data 208 received. Skins 1714, 1716 and 1718 are aligned with one another in virtual space to match the physical alignment of the original sensors 102. In some embodiments, the virtual alignment of skins 1714, 1716 and 1718 may be altered with virtual camera techniques, as is described below with reference to virtual camera 3002. Proper alignment is demonstrated in FIG. 8l.

The data-points used to generate skins 1714, 1716 and 1718 may be deformed to conform with the depth recordings made by the sensors 102, transforming skins 1714, 1716 and 1718 from depth maps into a virtual volume of space as aligned by the TRS 803. The deformation may be performed once, or once per update or per frame of the data recording.

Where the viewing frustum of original sensors 102 overlap, the resulting skins 1714, 1716 and 1718 overlap. These can be merged together to create the appearance of a single, coherently arranged skin 1720. In some embodiments, this deformation may be accomplished via a planar-extrusion, cylindrical extrusion, or a similar transformative process.

Deformation by a planar extrusion may involve deforming a virtual surface by the value of the depth data-points, and aligning the transformed surface using TRS 803. Some embodiments may additionally be transformed using cylindrical, spherical, cubic or other projection techniques to transform the data-points into a 3D space using the depth values recorded.

In some embodiments, rendering of the virtual surface may be accomplished using methods such as geometric instancing, where data-points are represented by disconnected separate shapes. In some embodiments, rendering may use alternate geometric representations, such as lines, strips, patched surfaces or billboards.

The operator should pay attention to the angle of the sensor 102 to the subject 101 at the time of the capture of depth data 204. The angle of the sensor 102 can be compensated for with rotation adjustment buttons or settings in the user interface of the recording device. These adjustments can be made in the recording application's 209 user interface, allowing the operator to angle the sensor 102 in whatever way they decide best suits the goals of the recording. In some embodiments, motorised sensor mounts may be used to align a sensor 102 with a subject 101 automatically.

A sensor 102 facing the front of a subject 101 provides excellent resolution of the areas of the subject 101 that directly face that sensor 102. As the surface of the subject 101 becomes more parallel to the sensor 102's line of sight, the sensor 102 is able to perceive less and less of those surfaces. A sensor 102 can see only a limited area of coverage of a subject or subjects 101, so the fidelity of the captured data lowers as the surfaces of subject 101 face further and further away from the sensor 102.

To recover the edge information that a given sensor 102 cannot resolve clearly due to angle inaccuracy, a second sensor 102 may be placed in a way such that its viewing frustum overlaps the outer edges of the viewing frustum of its neighbouring sensor or sensors 102. By ensuring overlap, no point between the two sensors is without data, greatly limiting visual issues such as stretching or distortion that would occur from missing or limited data. This is described above with reference to FIG. 16.

In scenarios where there is more than one sensor 102, each sensor's coverage of the subject 101 overlaps the coverage of the sensor 102 next to it. The overlap allows any surfaces that are too close to parallel to a given sensor 102 to be captured clearly by that sensor, to also be captured by a neighbouring sensor 102.

The overlapping areas created by capturing a given subject 101 from a number of sensors 102 can be combined to create coherently arranged skin 1720. For the best result visually, the overlap should have no visible seams between the data captured by one sensor 102 and a neighbouring sensor 102. Neighbouring skins can be combined simply by stitching them together at a seam. The location of the seam may be calculated in order to create the visually smoothest transition between one skin portion and another. However, the amount of processing time required to calculate the most visually appropriate location for a seam between two skins is significant. For real-time processing, a faster solution is required that allows for two or more skins to consist of overlapping points without causing visual artefacts.

Image 1700 illustrates the result of the method outlined in FIG. 18, which will now be described in further detail. Assuming the example sensor layout illustrated in FIG. 16, the recorded depth data 204 may result in three skins, 1714, 1716 and 1718, to be extruded, as shown in FIG. 17. Skin 1718 is the result of the depth data gathered from sensor 1602 of FIG. 16. Skin 1714 is the result of the depth data gathered from sensor 1601 of FIG. 16. Skin 1716 is the result of depth data gathered from sensor 1603 of FIG. 16. Skins 1714, 1716 and 1718 are placed in a configuration that ensures that the overlapping areas are very close during reconstruction.

FIG. 18 illustrates a method of combining skins without needing to calculate a seam line, which reduces the amount of processing time needed to display a coherently arranged skin 1720. The method involves selectively fading out one or more skins, and changing the fading of each skin as theviewing angle of device 104/106 changes compared to a marker 233 being viewed through device 104/106.

Figure 17B:
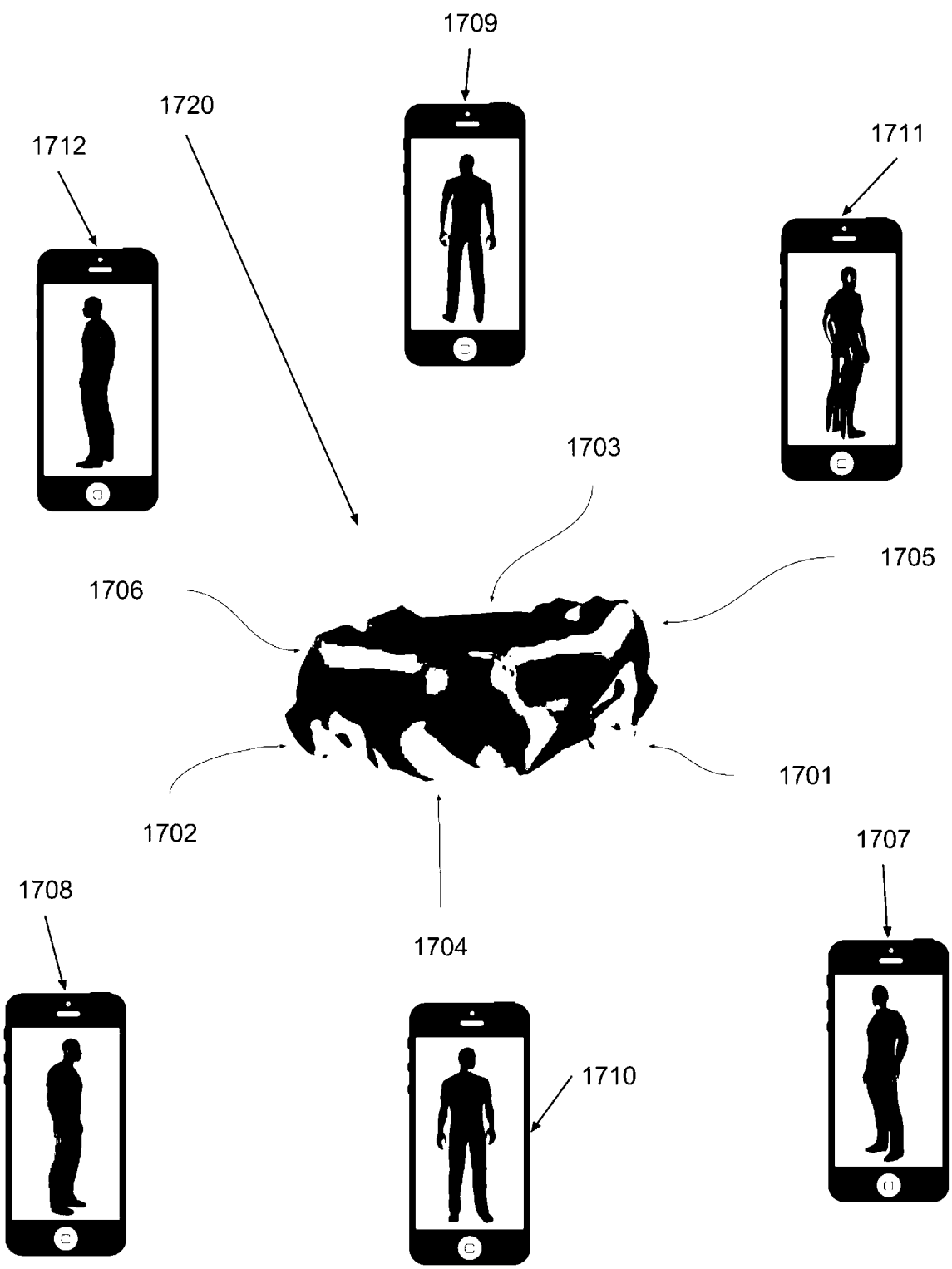
FIG. 17b shows how viewing a marker on a device shows a coherently arranged skin.

FIG. 17*b* shows how viewing a marker 233 from view 1707 may show portion 1701 of the coherently arranged skin 1720 on the mobile device 104 or wearable device 106 used to view marker 233. From view 1707, the viewer would be looking straight on at the portion of the subject 101 shot by sensor 1601, as shown in FIG. 16, captured as skin 1714. When viewing the recording from view 1707, the two other skins of data-points which were made from the data captured by sensors 1602 and sensor 1603, being skins 1716 and 1718, are faded out.

FIG. 17*b* shows how viewing a marker 233 from view 1708 will show portion 1702 of the coherently arranged skin 1720 on the mobile device 104 or wearable device 106 used to view marker 233. From view 1707, the viewer would be looking straight on at the portion of the subject 101 shot by sensor 1602, as shown in FIG. 16, captured as skin 1718. When viewing the recording from view 1706, the two other skins of data-points which were made from the footage shot by sensors 1601 and sensor 1603, being skins 1714 and 1716, are faded out.

FIG. 17*b* shows how viewing a marker 233 from view 1709 will show portion 1703 of the coherently arranged skin 1720 on the mobile device 104 or wearable device 106 used to view marker 233. From view 1709, the viewer would be looking straight on at the portion of the subject shot 101 by sensor 1603, as shown in FIG. 16, captured as skin 1716. When viewing the recording from view 1709, the two other skins of data-points which were made from the footage shot by sensors 1601 and sensor 1602, being skins 1712 and 1718, are faded out.

FIG. 17*b* shows how viewing a marker 233 from view 1710 will show portion 1704 of the coherently arranged skin 1720 on the mobile device 104 or wearable device 106 used to view marker 233. From view 1710, the viewer would be looking at an overlap between left skin 1714 and right skin 1716. Performing a crossfade between left skin 1714 and right skin 1718 as described with reference to FIG. 18 ensures that time, and data processing capacity need not be wasted trying to detect the edges of each skin where they intersect in order to stitch them together at a seam. Instead, when viewing the recording from view 1710, skin 1716 is faded out, and skins 1714 and 1718 are each faded to a degree to allow a blending of the skins 1714 and 1718 to occur.

FIG. 17b shows how viewing a marker 233 from view 1711 will show portion 1705 of the coherently arranged skin 1720 on the mobile device 104 or wearable device 106 used to view marker 233. From view 1711, the viewer would be looking at an overlap between the left skin 1714 and the rear skin 1716. Performing a crossfade between left skin 1714 and rear skin 1716 as described with reference to FIG. 18 ensures that time, and data processing capacity need not be wasted trying to detect the edges of each skin where they intersect in order to stitch them together at a seam. Instead, when viewing the recording from view 1711, skin 1718 is faded out, and skins 1714 and 1716 are each faded to a degree to allow a blending of the skins 1714 and 1716 to occur.

FIG. 17b shows how viewing a marker 233 from view 1712 will show portion 1706 of the coherently arranged skin 1720 on the mobile device 104 or wearable device 106 used to view marker 233. From view 1712, the viewer would be looking at an overlap between the right skin 1718 and the rear skin 1716. Performing a crossfade between right skin 1718 and rear skin 1716 as described with reference to FIG. 18 ensures that time, and data processing capacity need not be wasted trying to detect the edges of each skin where they intersect in order to stitch them together at a seam. Instead, when viewing the recording from view 1711, skin 1714 is faded out, and skins 1716 and 1718 are each faded to a degree to allow a blending of the skins 1716 and 1718 to occur.

However, having these three (or more) skins overlap and combine using cross-fading does not prevent the edges of the skins being stretched or deformed due to capture surfaces of subject 101 being close to parallel with the sensor 102's line of sight. The stretched edges will still be visible when the viewer moves to an angle that allows them to look at that portion of the reconstruction.

Referring to FIG. 17, skin 1714 is extruded back to plane 1713. Any points of skin 1714 that are at grazing angles, most notably around the border of the skin, near line 1713, will be stretched or deformed due to the surface they were created from being close to parallel to sensor 1601 at the time of recording.

However, some of the points of skin 1714 near plane 1713 that may be stretched overlap with some of the points near the center of skin 1718. This allows the processing device 104/106 to employ the points of skin 1718 in place of some of the points of skin 1714 where needed to reduce the visibility of stretching.

In some embodiments, the reconstruction of the skins may take place in a virtual camera processor 3003, rather than on device 104/106. This processor's functions and operations are outlined in FIGS. 30, 31, 32, 33, 34.

In some embodiments, the reconstruction of the skins may take place on the viewing device. This viewing device may be a mobile device 104, a wearable device 106, a desktop or laptop computer, a tablet, or a local or remote network of computers, for example.

Similarly, plane 1717 marks the horizon of skin 1718, and plane 1715 marks the horizon of skin 1716. Points near planes 1717 and 1715 may be stretched or deformed due to their position in relation to sensors 1602 and 1603 at the time of recording. Due to limited sensor data for elements not aligned to the sensor, data may be sparse or non-existent for portions of the surface, resulting in artefacts (such as stretching) or in some cases missing data. If a planar extrusion method were being used, this would cause those points to be stretched and non-optimal. These areas will overlap with the areas of the other two skins. Consequently these stretched points too can be crossfaded with points from skins that offer better coverage of those areas.

Using the method described with reference to FIG. 10, mobile device 104 calculates its position and orientation relative to trackable marker 233, and uses this position to calculate the level of fade to apply to each skin 1714, 1716 and 1718 based on the viewing angle. For example, when device 104 is positioned at view 1707, coherently arranged skin 1720 is visible on device 104 from angle 1701, and is not visible from angles 1702, 1703, 1706. At this time, the sub-skin components of coherently arranged skin 1720 that are visible from angles 1702, 1703, 1706 are faded down to zero in accordance with graph 1820 as shown in FIG. 18.

Referring generally to FIG. 18, point fading based on the viewer's angle from the normal of a given skin is shown. Point fading is achieved by scaling the size of each point of a skin. For example, where the skin is to be faded out, each point of the skin may be scaled to 0% of its default size. Each skin from a depth projection has a normal vector. This normal is perpendicular to the alignment of the skin. Each skin is aligned to match the alignment of the sensor which recorded the data being used to reconstruct it. It can be said that each skin is a direct projection from the sensor. This allows us to know the angle of the skin, and consequently the angle of the normal of that skin. Each skin may comprise at least one group or set of points.

Figure 18A:
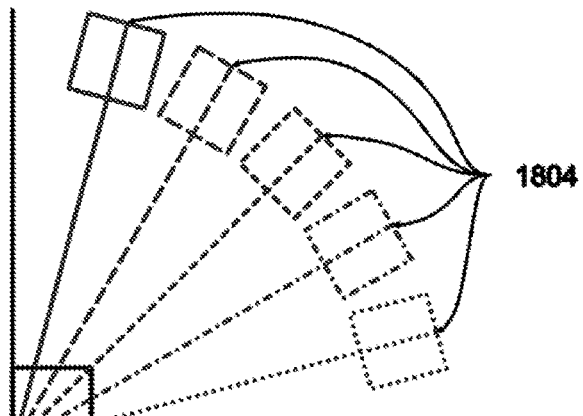
FIG. 18 contains diagrams that define how points in the assembled skins are scaled as defined by the angle of the viewing device relative to the tangent of the assembled skin, as well as the appearance of the assembled skins from a given angle.
Figure 18B:
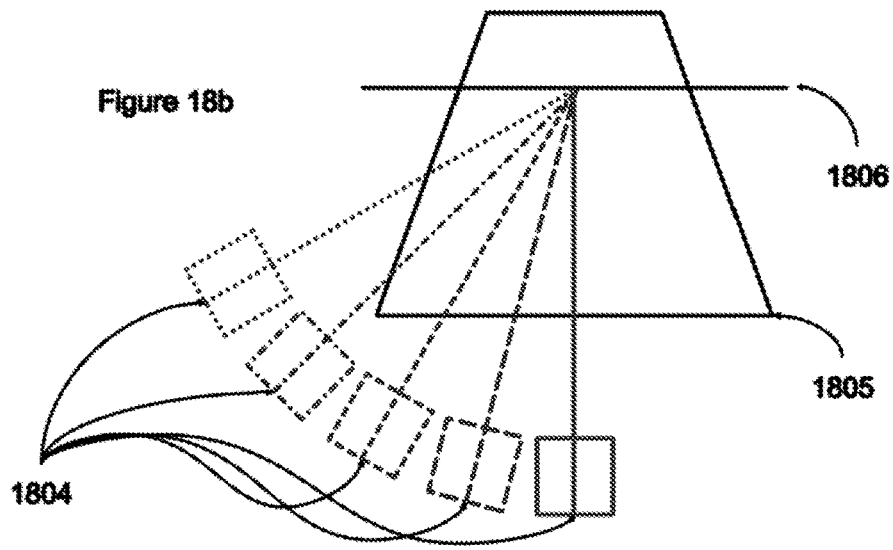

As shown in FIG. 18a and FIG. 18b, as the viewer orbits a deformed skin, the position of their viewing device 104/106 is always at some angle 1804 relative to the normal of that skin. All of the points in that skin share a common viewing angle 1804. As the angle 1804 of the viewing device 104/106 approaches tangent 1802, the visibility of that skin or points composing that skin are reduced, to allow points from the neighbouring skin to show through.

The visibility of a given point or skin is determined through CPU 212 (a/b) of viewing device 104/106 calculating the angle of viewing device 104/106 relative to the normal of each skin being viewed. The CPU 212 (a/b) sends this value to the display hardware 225a/229b/230b, which alters the visibility of the points in the skin either uniformly or individually.

As the angle 1804 of the viewing device 104/106 approaches normal 1803, the visibility of the associated skin may be increased, to ensure elements which were most directly facing the sensor 102, and consequently of highest visual fidelity, are clearly seen by the viewer. This fading may be accomplished using methods such as transparency, dithering, or blending operations. In some embodiments, this fading may also be accomplished by a scaling operation, as in the case of instanced geometry, billboards, or other rendering methods, allowing data-points to be faded individually. Conversely, in some embodiments, such as 1830, point size may refer to the size of a billboard, opacity of a skin, or scale of an instanced geometric shape. In some embodiments, the scaling or opacity may be non-uniform across the data-points for a given skin.

Figure 18C:
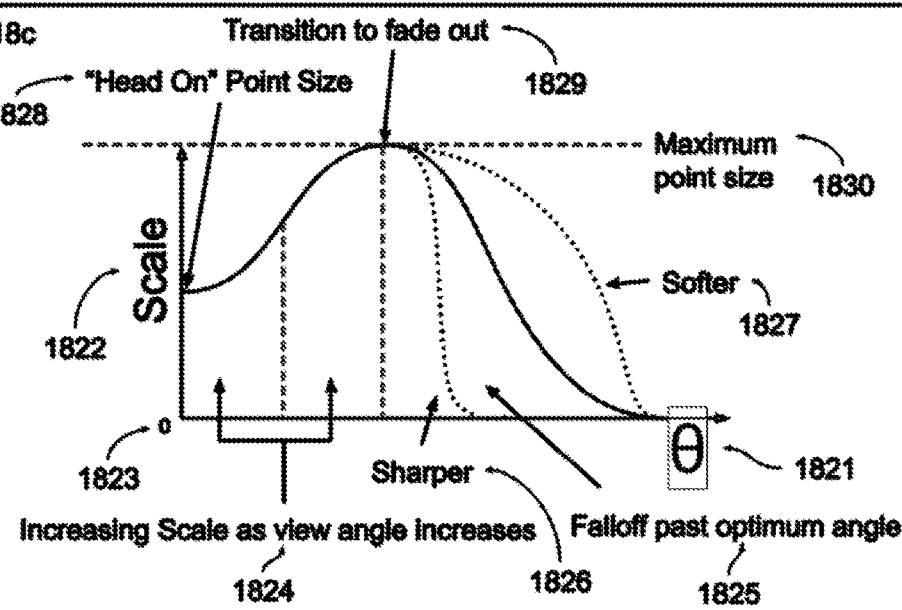

FIG. 18c outlines the curve that defines how the visibility of points of a given skin is governed, in relation to the angle of the device 104/106 to the skin's normal. The X-axis of the graph is the angle or theta 1821 of the viewing device 104/106 to the normal of the skin being observed. The Y-axis of the graph is the scale 1822 of the points in the skin being observed. At head-on angle 1828, the device is facing directly the normal 1803 of the skin. As the device is orbited around the skin, the angle moves away from the normal 1803. Area 1824 shows the points increasing in scale to a predefined size, the scale to which a point is displayed, defined by the operator when the content is processed. At transition to fade out point 1829, the points reach their largest size 1830. From the transition to fade out point 1829 towards the most extreme angle from normal 1803, the points decrease in size at a rate defined by the curve in graph 1820. While various transitions to the maximum may be sufficient, it is considered that Smooth-Step functions, or similar functions such as cosine or Bezier functions that have been adjusted to have a smooth transition in and out of the endpoints work well, as there is no sudden change in the rate at which scale changes. Sharper 1826 and softer 1827 define variations on curve 1820 that will cause a difference in the appearance of the scaling. Sharper 1826, signifies a curve which may be used to cause rapid de-scaling as the angle exceeds the transitional point 1829, as opposed to Softer 1827, which portrays a more gradual slope.

As one skin's points fade from view, the neighbouring skin's points scale up according to the same graph. This ensures that at no time does the viewer see points from two neighbouring skins conflicting. It also ensures that as the viewer's device approaches the limits of one skin's ability to display points that were captured from the best advantage, the points on that skin fade out and are crossfaded automatically with the points from the neighbour.

The more sensors 102 used in recording the subject, the more assurance exists that tangential, stretched points will have a replacement available in data captured by a neighbouring sensor.

Viewer Feedback and Analytics.

When producing video content, the efficacy of the message conveyed in the content is often difficult if not impossible to accurately measure. Viewing platforms are not designed to allow two way communication of information between the producer and the consumer of the video content on a scale that would allow a producer to know exactly what parts of a video caught the viewer's attention. Nor is the performer being captured in the recording able to see at the time of performance exactly what part of their performance has the most appeal to their audience.

The ability to record video volumetrically and to create a path for viewer behaviour and feedback to flow back to the performer, allowing for metrics to be presented to a performer or producer, has not previously existed.

Fitting a performer with a wearable display or other Augmented Reality device allows for the display of the exact position and viewing orientation of each viewer, or an average of the viewers, to the performer in real time. This feedback brings the advantages of live venue performance to a remote location. A performer can know exactly where their audience is watching from, and alter their performance in real-time to suit the demands of their audience. The performer can also alter their performance to improve the penetration of the message they are trying to convey, by attracting the viewers to the key aspects of their presentation.

Fitting a producer or performer with a wearable display or other Augmented Reality device that provides such feedback would allow the producer or performer to see viewer habits in a way that is otherwise unavailable today. A global audience's viewing habits can be mapped onto a virtual globe, allowing the producer to understand the global market penetration of their content. A heat map showing the areas of a recording that were viewed the most can also be displayed, to illustrate in a comprehensive way which parts of a performance drew the attention of the viewing audience. Furthermore, viewer position/orientation data can be projected onto any number of 3D shapes to allow the producer or performer to gain a clear and intuitive understanding of the viewer's habits and reactions to a piece of content.

Social networking can benefit from a 3D method of commenting on a piece of content by leaving notes and comments in the physical space around a piece of content. Given that the content is three-dimensional, and in motion, these comments can have both positional and temporal significance.

Figure 19:
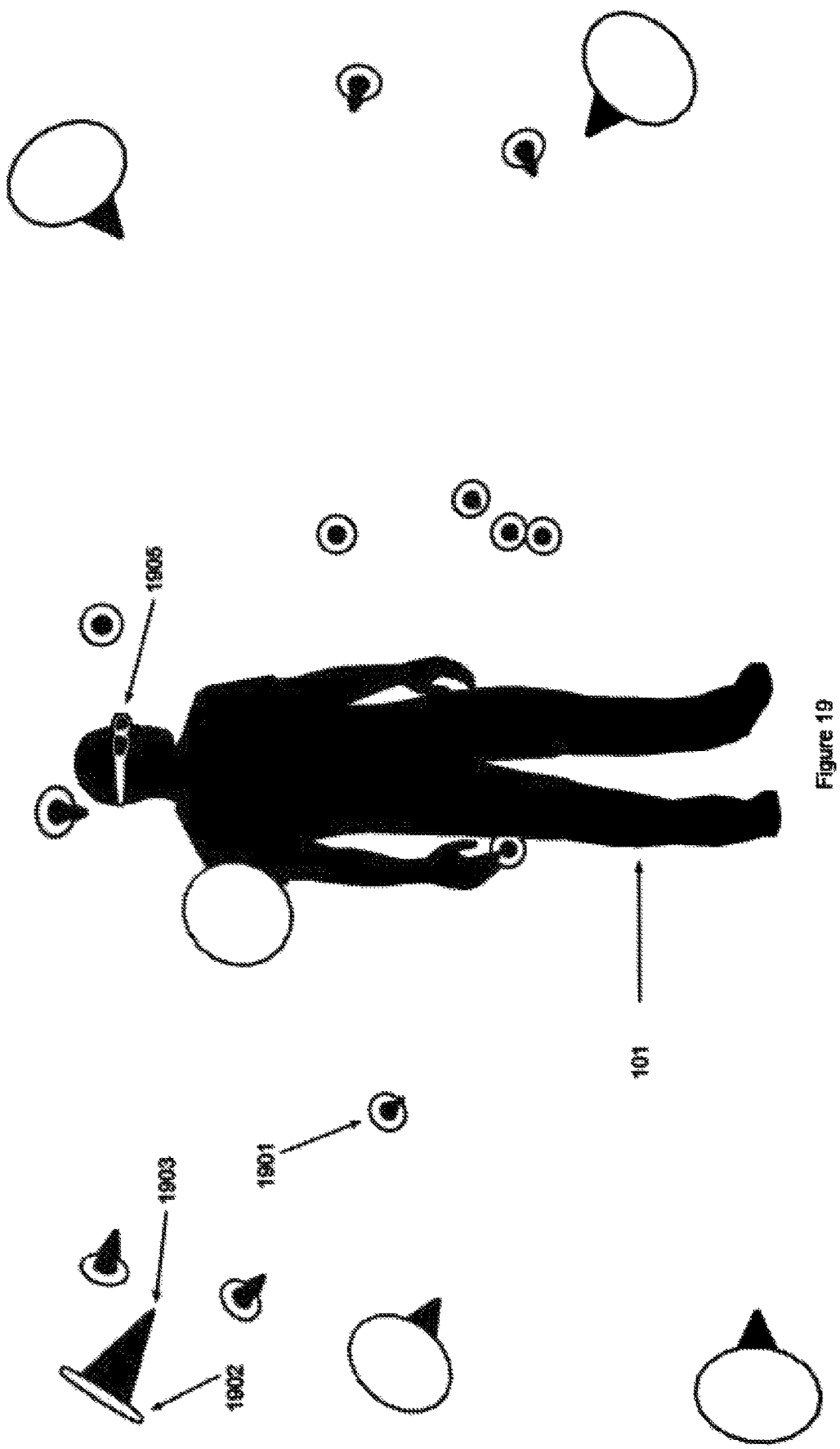
FIG. 19 depicts a performer seeing the view positions and angles of various viewers.

Referring generally to FIG. 19, 20, an example system for providing feedback to a Performer 101 as to the location and orientation of any viewers viewing their performance is shown. The viewers receive and view images captured using at least one sensor 102 and processed by hardware and software on devices 104/106 as described above.

Performers, producers, sponsors, and anyone else with any interest in the viewing habits of content consumers wish to know as much as possible about the ways their viewers watch, and what parts of a given piece of content are the most compelling. The ability to feedback viewer data to the content creators has developed alongside most forms of media.

Using the position and orientation of a viewer's device 104/106 operating as described above in relation to FIGS. 2c and 2b, and as outlined with reference to FIG. 10, head mounted device 1905 worn by a performer, being subject 101, can be configured to send this information back to the performer at run time. The result may be a visualisation of the audience which provides full, recordable feedback to the performer 101 and allows them to tune the performance as required.

Example Viewer representational object 1901 is shown, the position of which is determined by the location of a first viewer's viewing device 104/106 as derived in FIG. 10. The location/orientation information of each viewer's viewing device 104/106 may be passed once per update to the wearable device 1905 currently being worn by the performer 101. FIG. 19b illustrates an example of Performer 101's actual view. Depth sensor 102 is visible in Performer 101's view.

Example viewer representational object 1901 may consist of two components, representing the location and the orientation of a first viewer's viewing device 104/106. In some embodiments, these components may be a location disc 1902 and a pointer cone 1903.

The location and orientation of location disc 1902 relative to performer 101 may be derived from the position and orientation information of the first viewer's viewing device 104/106 relative to marker 233 being viewed by device 104/106. This positional and orientation data may be sent to the service providing the content.

The location and orientation of pointer cone 1903 relative to performer 101 may be derived from the location and orientation information of the first viewer's viewing device 104/106 relative to marker 233 being viewed by device 104/106 as reported by the first viewer's player application 221(a/b). This positional and orientation data may be sent to the service providing the content.

In some embodiments, the performer 101 may be wearing a wearable device 1905 which is running software which displays viewer location nodes as feedback to the performer in the form of representational objects 1901. This performer feedback software may be a part of the viewing software of wearable device 1905. In some embodiments, the recording application 209 may be communicating with a local or remotely networked computer 205 or a network 103 which is gathering the viewer locations as sent by the viewer software outlined with respect to FIGS. 10 and 12 above.

The software present in recording/processing device 205 or the processing network 103 may send this collected viewer location data in the form of data-points to the performer's wearable device 1905. The performer's wearable device 1905 may render icons or nodes or other indicative visual aids such as representational objects 1901 on each data-point, updating the location of the representational objects 1901 for each frame, in synch with the updated data-points received from the recording application 209.

The data-points gathered may contain the positional and orientation values of each viewer. This will allow the performer to perceive feedback nodes in the form of representational objects 1901 to contain information about the location and the orientation of each device 104/106 being used by the audience viewing the performance. This information may be relayed in real-time or recorded for later consumption. Alternative display options for this data are described below with reference to FIGS. 24,25, 26 and 27.

In some embodiments, the player feedback may be displayed to the performer on a computer display 15, teleprompter, projector screen, mobile device or other display hardware.

This performer feedback function may or may not be integrated into the recording application 209, processing application 207 or some other part of processing device 205.

Figure 20:
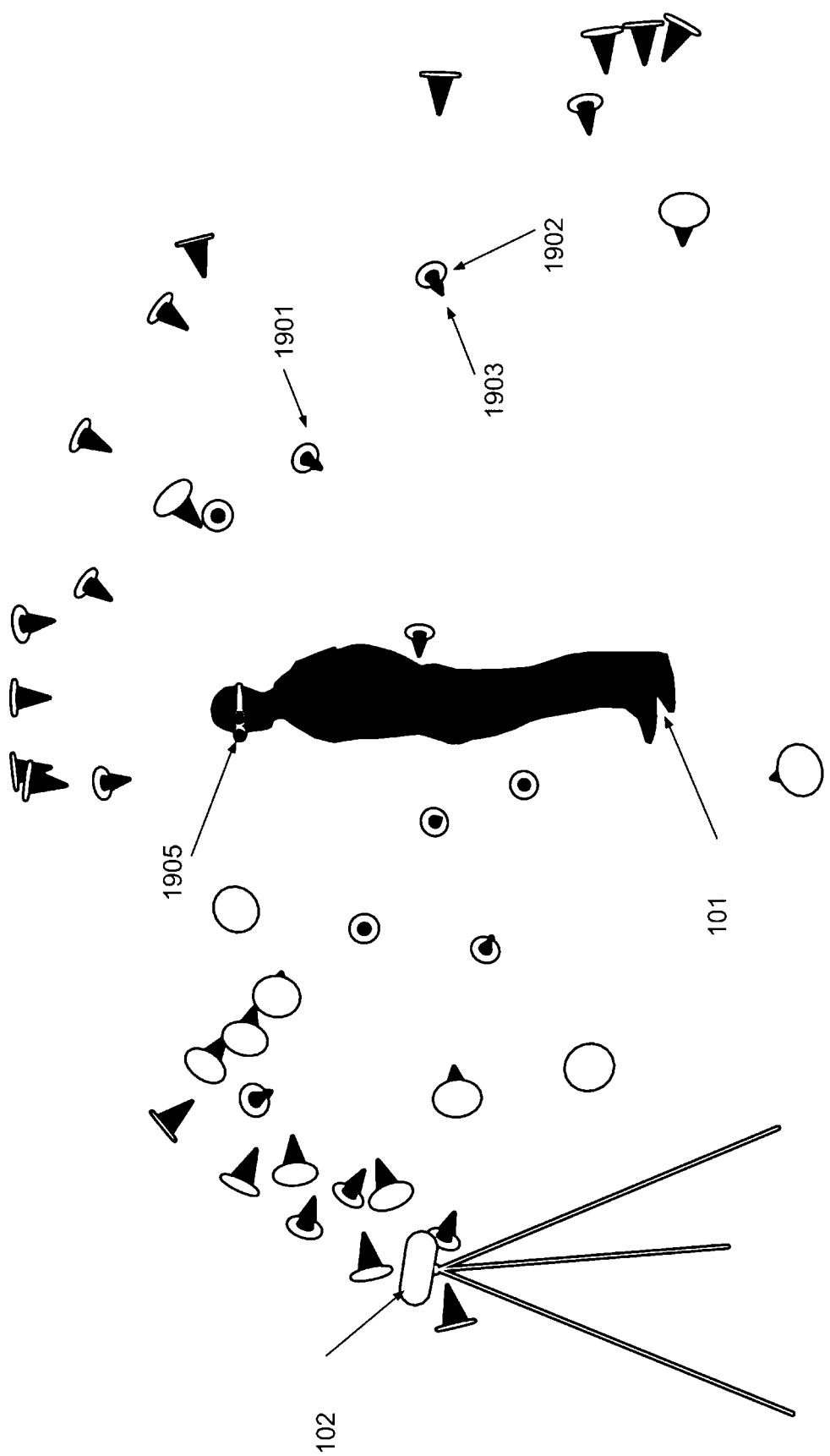
FIG. 20 is an external view of a cloud of viewers around a performer. This is an example only.

Referring generally to FIG. 20, an expansion on FIG. 19 is shown. Performer 101 is wearing head mounted display 1905, allowing them to see a representational object 1901 for each member of their audience. Various viewers are represented in this false image, each consisting of elements similar to those described above with reference to FIG. 19. Each representational object 1901 is made up of location disc 1902 and pointer cone 1903, which illustrate each viewer's location and orientation. This information may be updated, typically once per frame, and may be visible in every direction. The performer 101 need only turn their head to allow their head mounted display 1905 to show them the position and orientation of anyone viewing them at a given moment.

In the context of FIGS. 19*a*, 19*b* and 20, sensor 102 may include a camera or other image or data capturing sensor, which may capture image data including colour data 203 and depth data 204, also known as volumetric data. The data may be captured as a series of still images or frames. In some embodiments, sensor 102 may further capture additional data such as sound data or heat data. While the described embodiments relate to a depth sensor, in some other embodiments the sensor may be any sensor that can detect aspects of its surrounding environment. A depth sensor may use light, sound, lasers or other methods to detect the distance of objects from the sensor. In some embodiments, sensor 102 may comprise multiple sensors, such as a first sensor for capturing colour data, and a second sensor for recording depth data. In some embodiments, sensor 102 may comprise an array of sensors, such as two or more devices arrayed in such a way as to surround a subject and gather data from multiple angles at once.

Figure 21:
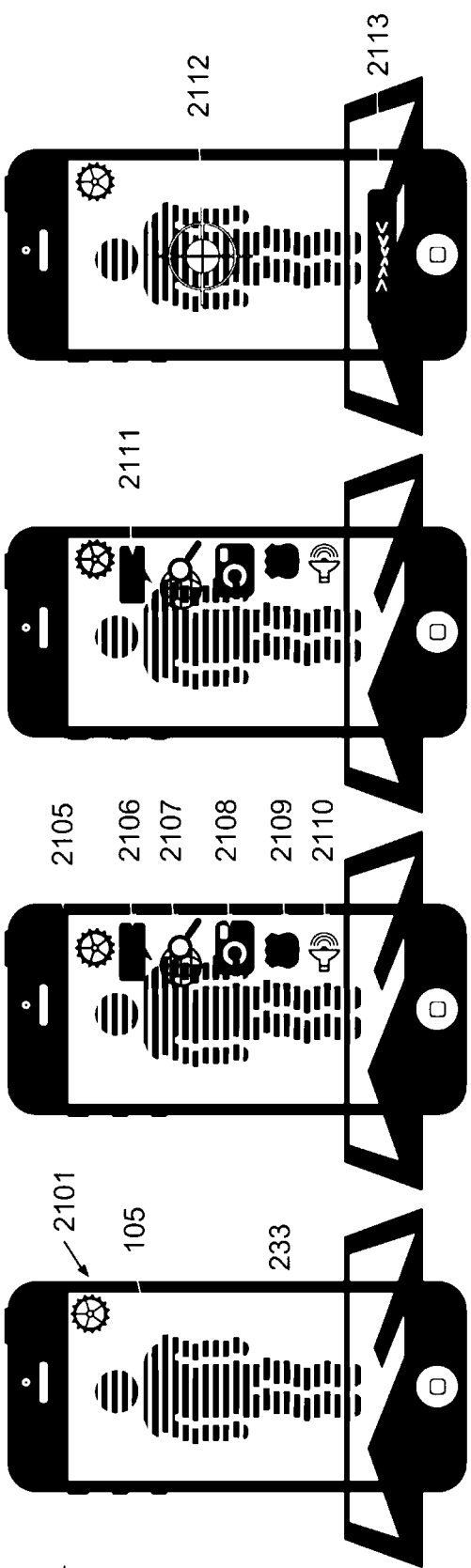
FIG. 21 shows the steps involved in creating, positioning and sharing a note or notes.

Referring generally to FIG. 21, this figure depicts an example case of a user with mobile device 104 watching a piece of content 105 displayed as an augmented virtual object on trackable marker 233.

The ability for viewers to communicate with each other or the content creator requires a tool (i.e. mobile device 104 or wearable device 106) that recognizes that the content is being viewed via a three dimensional medium. Points of interest and notes can be created and shared with other viewers that relate to the content three dimensionally. Notes can be left for social contacts or the viewer's own reference.

A sensor button 2101 may be superimposed on the image being viewed on a mobile device 104 to allow a user to communicate with other viewers of content 105 and with the content creator.

Figure 21I:
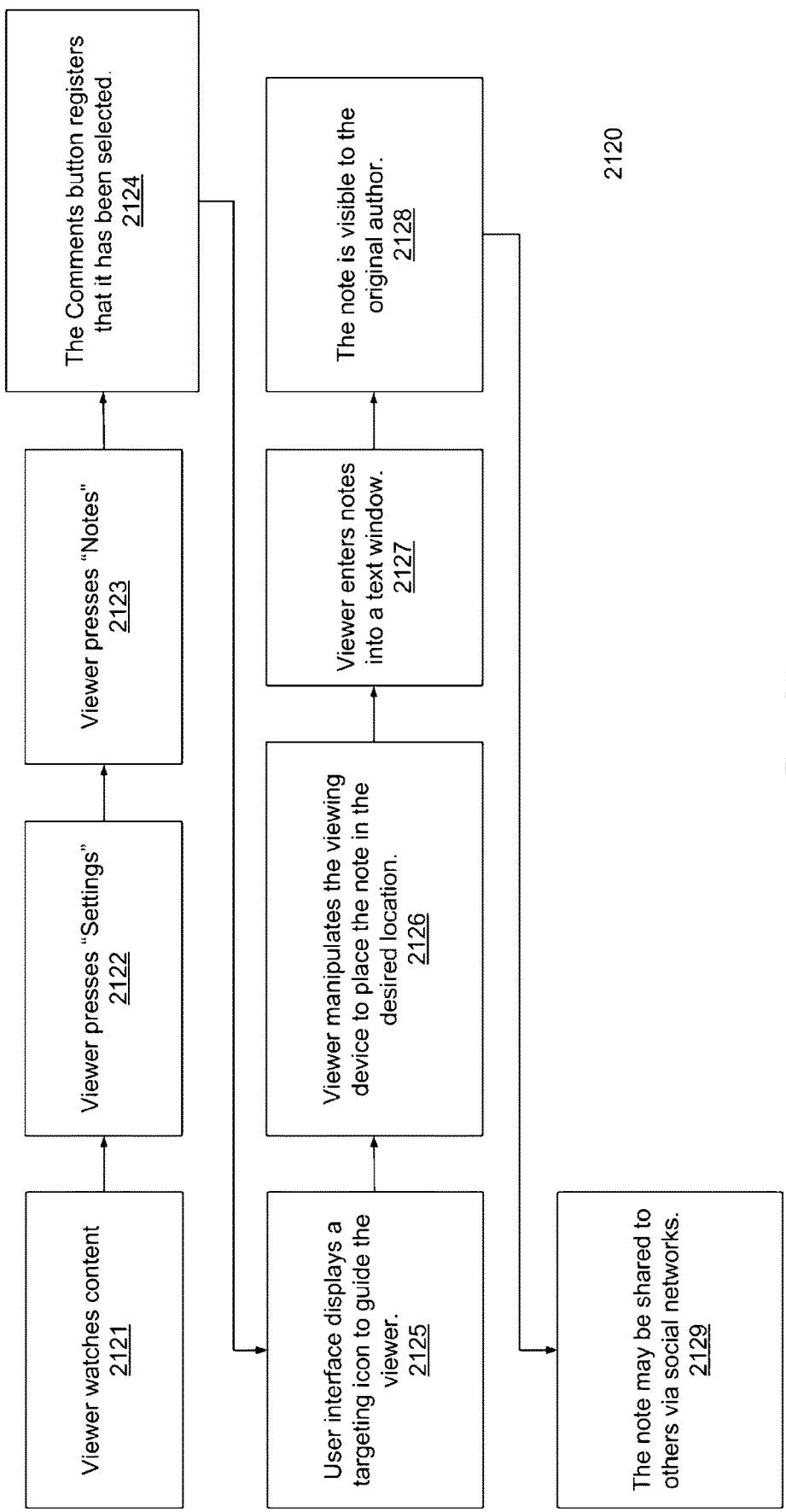

Referring generally to FIG. 21*i*, Flowchart 2120 illustrates an example method of sensor button 2101 in order to communicate with other viewers of content 105 and with the content creator.

At step 2121 (FIG. 21*a*), a viewer is watching content 105 on device 104.

The viewer pushes the settings button 2101 at step 2122 (FIG. 21*b*).

This causes settings menu 2105 to appear. Settings menu 2105 is populated with various functions. For example, menu 2105 may contain Notes 2106, search the web 2107, screenshot 2108, private mode 2109, and/or volume control 2110 functions. The functions listed here are not an exhaustive list.

User selects Notes 2106 at step 2123 (FIG. 21*c*), causing it to provide visual feedback that it has been selected 2111 at step 2124.

Target crosshairs 2112 appears, in the centre of mobile device 104's display at step 2125. Apply button 2113 appears at the bottom of the display (FIG. 21*d*).

User moves mobile device 104 to cause target crosshairs 2112 to be positioned above some area of the displayed content 105, and presses apply button 2113 at step 2126 (FIG. 21*e*).

Note entry field 2115 appears. User may enter text using an OS input component 2116 at step 2127 (FIG. 21O.

Positioned note 2117 shows the location of the note just made by the user at step 2128 (FIG. 21*g*).

Social network buttons 2118 appear, prompting the user to share their notes with their social contacts at step 2129 (FIG. 21*h*).

To allow for at-a-glance recognition of notes 2117, the notes 2117 may be read by the software and contain metadata components relating to how they are displayed. The ability to differentiate between a sender and a receiver's messages requires a method to tell each kind of message apart.

Figure 22:
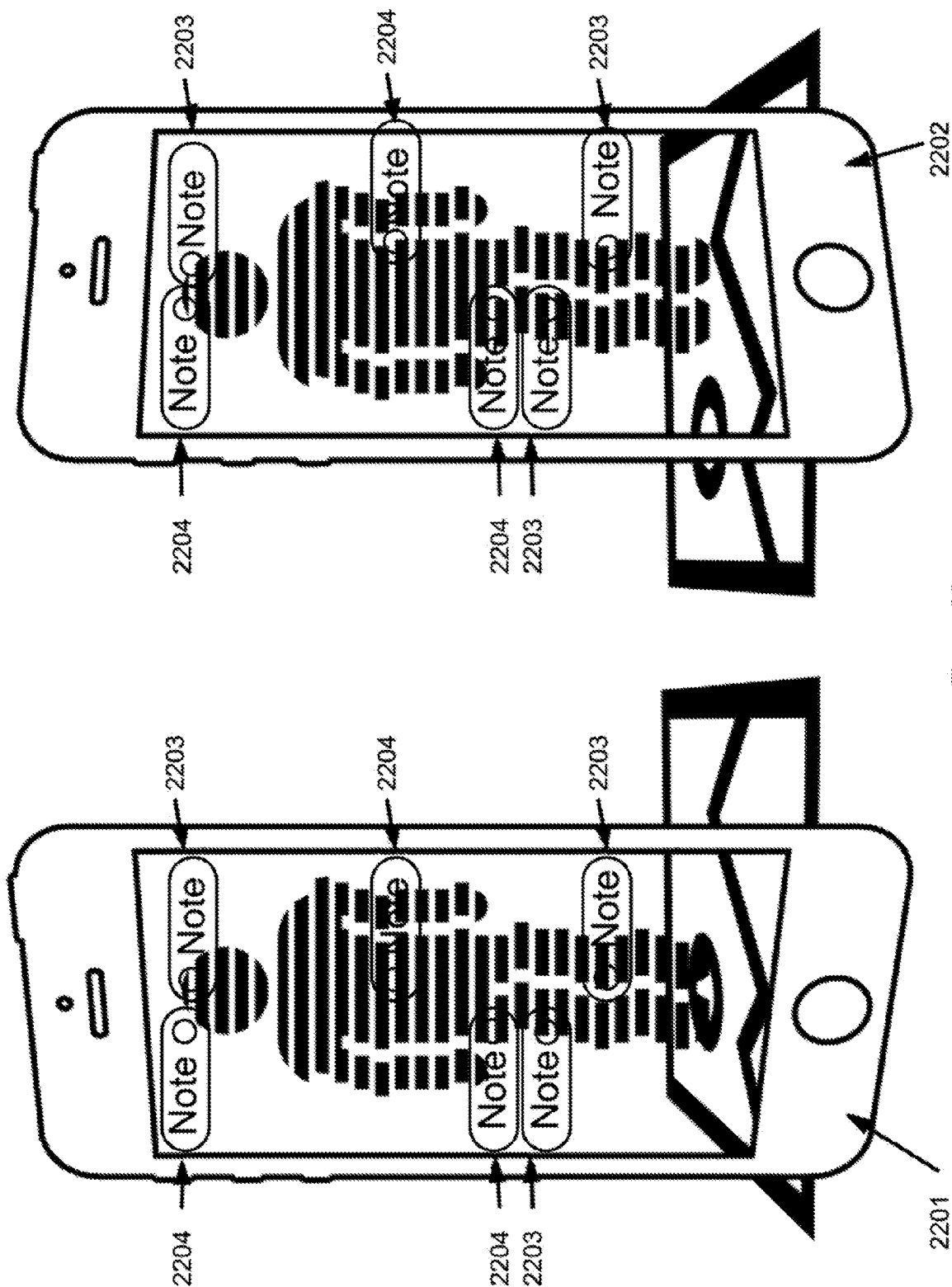
FIG. 22 shows how notes left by two viewers appear to each other.

Referring generally to FIG. 22, this figure depicts an example case in which user A, using device 2201, and user B, using device 2202, have created notes that they have shared among one another. As illustrated in the Figure, user A's notes 2204 are faded but visible on user A's mobile device 2201. User B's notes 2203 are clear and easy to read on user A's mobile device 201. User B's notes 2203 are faded but visible on User B's mobile device 2202. User A's notes 2203 are clear and easy to read on User B's mobile device 104.

When leaving notes for others, it is important that the notes that have been left by one user be easily identifiable from those left by other users. When a given user is looking at a displayed content with notes left by themselves and others, knowing which notes are theirs and which notes have been made by others is important. Changing the colours or opacity of a note depending on who left the note may make identification clear.

Figure 23:
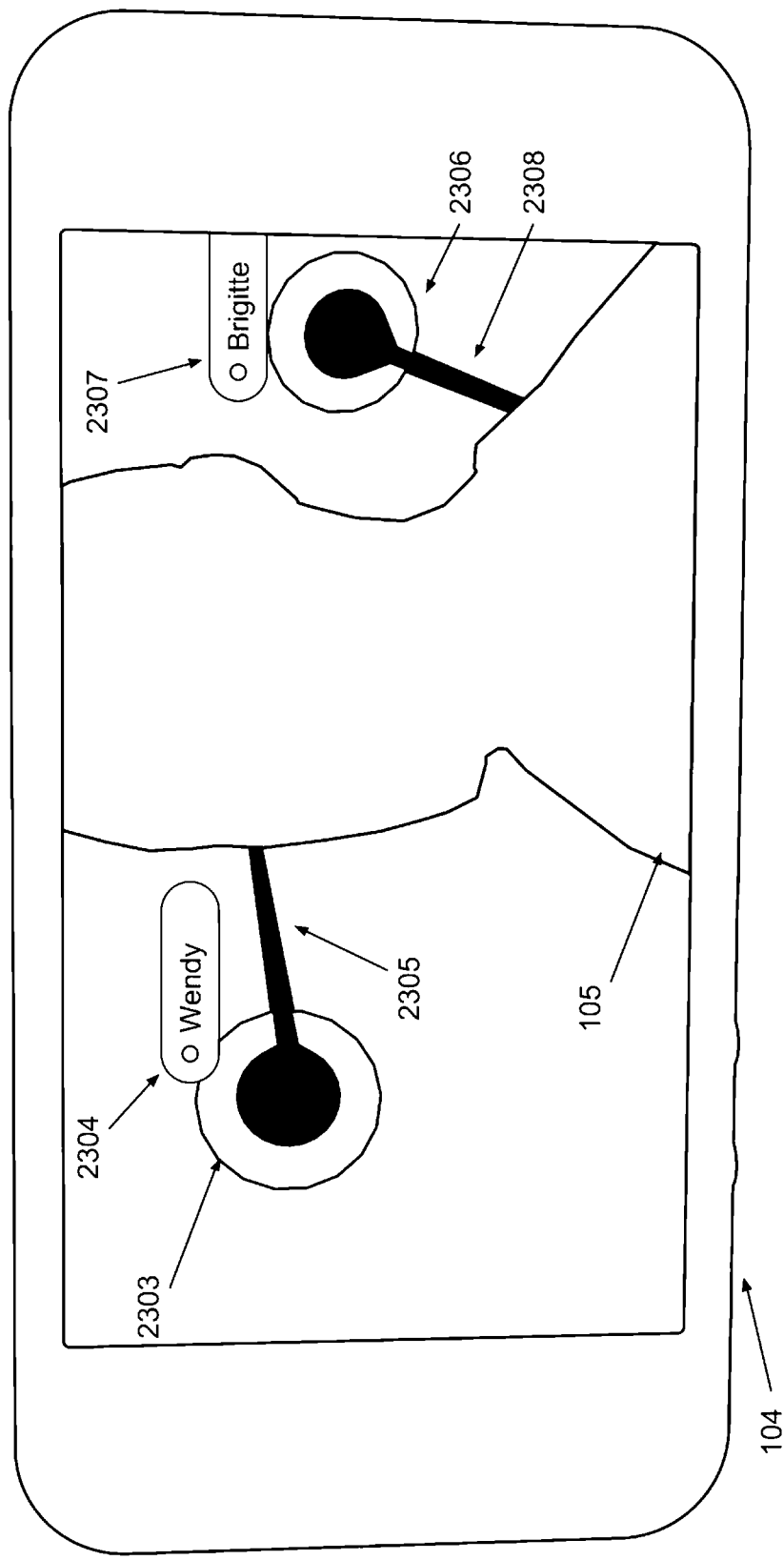
FIG. 23 shows a viewer watching a volumetric video playback while also seeing their friend's locations and orientations. Allowing the viewer to know what their friends are looking at at any time.

Referring to FIG. 23, this figure depicts an example case in which mobile device 104 is viewing displayed content 105 in Augmented Reality. The user of mobile device 104 has signed on to a social network. Other contacts that are friended on the same network are watching the same displayed content 105. These contact's locations, orientations and registered names may be visible to each other and any other shared contacts.

In some embodiments, one or more of the viewers may be using a wearable device 106 and viewing content 107 and 108.

In some embodiments, each viewer who is connected to another may have the option to pause, scrub or otherwise manipulate the content of all shared viewers.

Viewer node 2303 indicates the live or recorded location of the viewing device of a second simultaneous viewer of displayed content 105. Orientation pointer 2305 indicates the live or recorded orientation of the viewing device of the second simultaneous viewer of displayed content 105. Name tag 2304 indicates the name of the second simultaneous viewer at location 2303, orientation 2305.

Viewer node 2306 indicates the live or recorded location of the viewing device of a third simultaneous viewer of displayed content 105. Orientation pointer 2308 indicates the live or recorded orientation of viewing device 104 or 106 of the third simultaneous viewer of displayed content 105. Name tag 2307 indicates the name of the third simultaneous viewer at location 2306, orientation 2308. These elements may be displayed at varying stages based on the environment, such as being added to the rendered data elements 224a, 227b, 228b to be processed onto the respective devices displays 105, 107 and 108, or may be directly output to display element 117.

Locations 2303, 2306 and orientations 2305, 2308 are updated, typically once per frame, so that the viewer of mobile device 104 has an accurate understanding of the areas of interest to the other viewers 2304, 2307.

Figure 24:
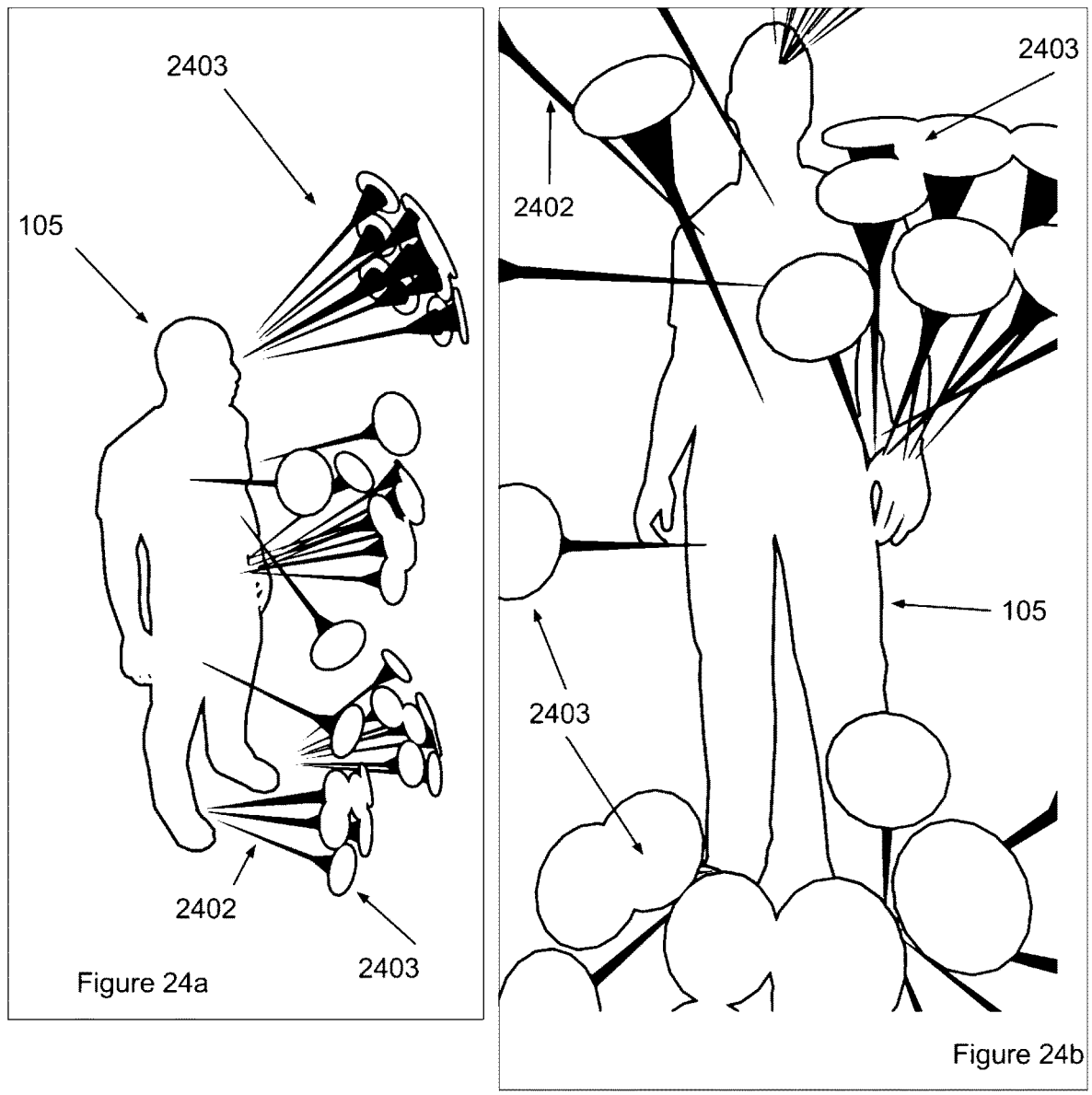
FIG. 24 shows a piece of Augmented Reality content with viewer nodes pointing at specific locations on the content.

Referring generally to FIG. 24, which depicts an example case where displayed content 105 is being viewed by many Viewers, as shown by viewer nodes 2403. Viewer's devices are oriented towards sections of displayed content 105. Orientation pointers 2402 show the orientation of the devices of the viewers, which indicate the points of interest on displayed content 105.

FIG. 24a and FIG. 24b show two different angles of the example outlined above for clarity.

Viewer location and orientation data can be recorded for later analysis. In some embodiments, viewer data can include region data, for example what country the viewer is in at the time. In some embodiments, viewer data can be used to tune virtual cameras for re-rendering. In some embodiments, viewer data can be displayed in more ordered forms, like the surface of a hemisphere (see FIG. 26) or cylinder (see FIG. 27). In some embodiments, viewer data can be used to affect the location and orientation of remote, motorised devices including robots, ROVs, cameras (FIG. 28).

Figure 25:
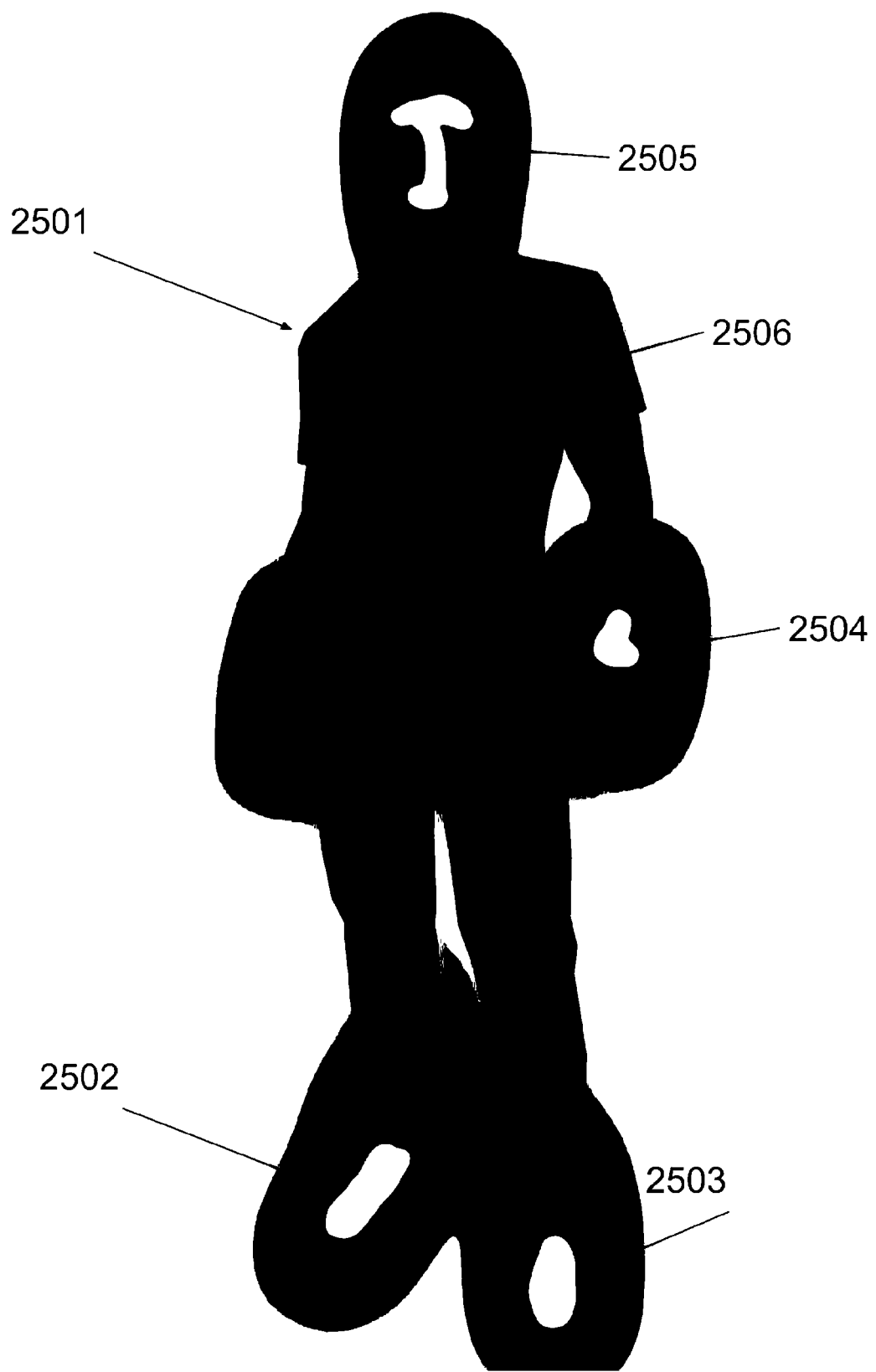
FIG. 25 shows a heatmap generated from the data collected from the process defined in FIG. 24.

Referring generally to FIG. 25, this image portrays an example case where the displayed content 105 is overlaid with a virtual Heatmap 2501 to provide intuitive feedback to a producer or content creator indicating the points of interest of a piece of content 105. In some embodiments, two or more heatmaps from the same content, created under different circumstances may be overlaid to analyse the difference between the two recordings.

FIG. 24 illustrates the way this data would be gathered. Each viewer location and orientation is known. A virtual ray may be cast in the virtual space from the location of a given viewer's device, angled by the orientation of that viewer's device, until it intersects with the three dimensional displayed content, 105 or 107 and 108. Once it has intersected, the location that the virtual ray intersected with the displayed content 105, 106 or 107 may be understood. This provides the ability to understand the place on the displayed content 105 or 107, 108 that this example viewer was looking.

As the viewer moves their device, and consequently their point of interest, over the image over time, the system may record this motion, and combine it with the previous data. This will allow the creation of an animated heatmap, such that it shows the points of attention across the image over time.

Heatmaps, such as heatmap 2501, are generated by aggregating multiple data-points over time. As viewers consume a piece of content, whether it be a single display content like displayed content 105 or a double displayed content like 107 and 108 or more than two displays, the direction of each viewer's device 104/106 is a known quantity. Aggregating the many viewer angles and locations over time allows the building of a map of the areas viewed. Areas which are known to have more attention paid to them by viewers can be false-coloured in this map to be a colour that indicates that traffic. In many cases the colour pallet chosen to graph the attention paid to one area over another may be the same as the pallet associated with heat. Darker blues for cold, non-trafficked areas, through warmer colours for areas that received moderate attention, to bright reds, yellows and then white for the areas that received the most attention.

These colours can be overlaid on the displayed content 105, or 107 and 108 in such a way as to match exactly the shape of those three dimensional images. This may be done by substituting or otherwise enhancing the existing colour data 203 with this generated heatmap 2501.

If the viewers were most interested in a specific sub-section of the image, this point of interest can be quickly analysed with a glance. Multiple points of interest may be easily visualised in this way. The producer can easily see if the audience is interested in the face, hands, jewelry or any other combinations of areas.

Hotspots 2502, 2503, 2504, 2505 correspond to the clusters of Viewers 2403 in FIG. 24. Heatmap 2501 provides visual feedback over time of the viewing habits of the viewers of Content 105 or 107 and 108.

Figure 26:
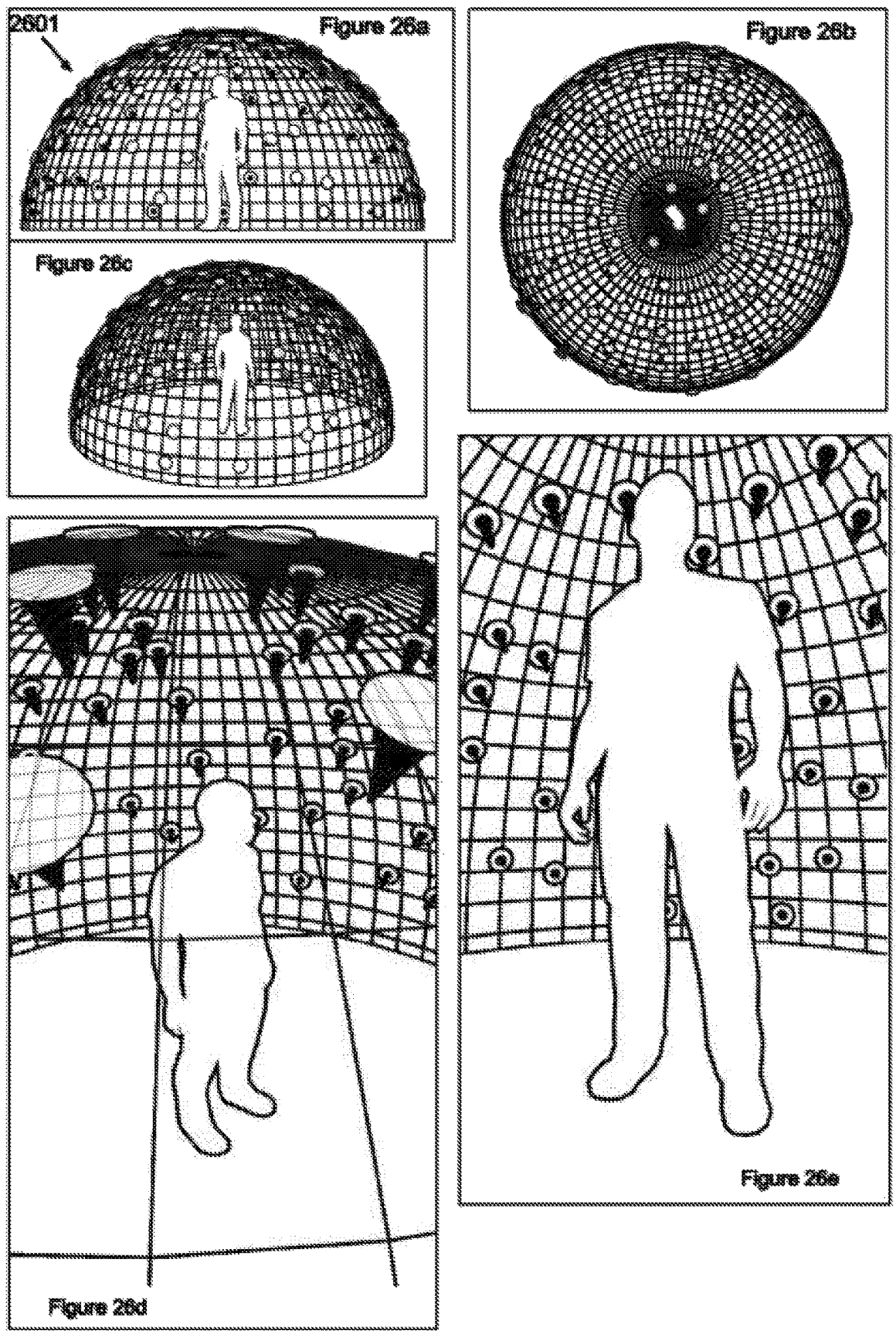
FIG. 26 shows a hemispherical mapping of viewer nodes for analysis.
Figure 28A:
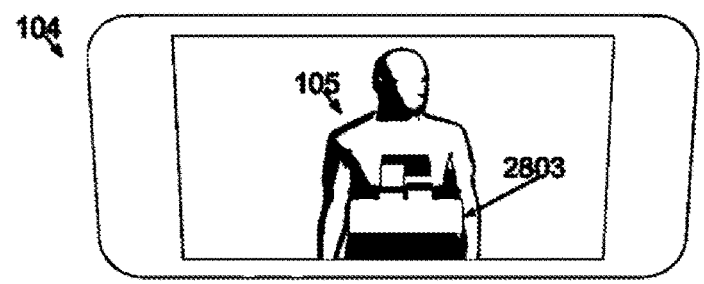
FIG. 28a illustrates how an operator or viewer would look through a mobile device to perceive objects in front of a remote robotic device upon which is mounted a depth sensor.
Figure 28B:
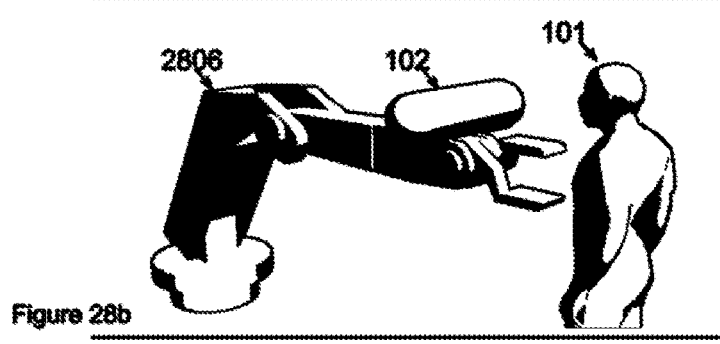
FIG. 28b illustrates a depth sensor mounted on a robotic device.
Figure 28C:
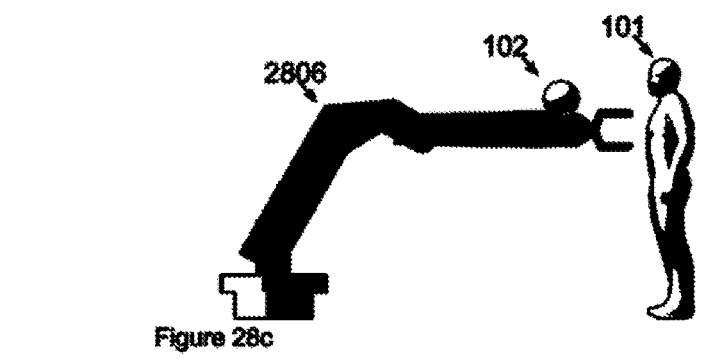
FIG. 28c illustrates a depth sensor mounted on a robotic device.
Figure 28D:
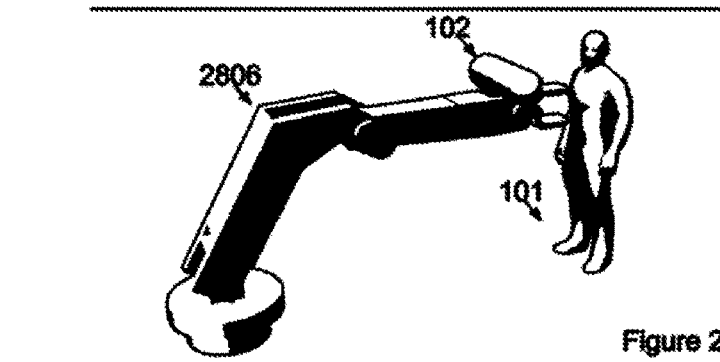
FIG. 28d illustrates a depth sensor mounted on a robotic device.
Figure 28E:
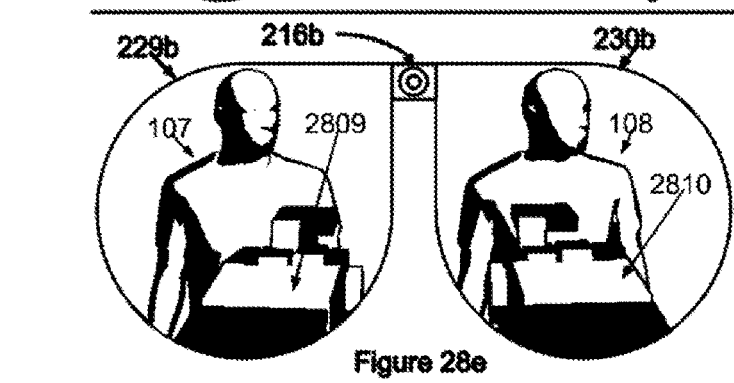
FIG. 28e illustrates how an operator or viewer would look through a wearable eyewear device to perceive objects in front of a remote robotic device upon which is mounted a depth sensor.

Referring generally to FIG. 26, Hemispherical Mapping illustration 2601 shows an example hemispherical representation of the viewer nodes 2403.

When viewing analytics of a given scene, the producer may be interested in only examining a single aspect of the viewer data. A hemispherical or spherical mapping allows the producer to clearly see the clumping of the viewer's locations as they watched a given piece of content. Were the viewers mostly looking at the content from the left? From the top?

A spherical mapping arrangement could alternatively illustrate where the viewers were on a globe of the Earth, thus helping the producer understand which aspects of the content were most appealing to a given region on Earth.

FIG. 26a shows the hemispherical mapping illustration 2601 from a side angle.

FIG. 26b shows the hemispherical mapping illustration 2601 from the top angle.

FIG. 26c shows the hemispherical mapping illustration 2601 from an external angle.

FIG. 26d shows the hemispherical mapping illustration 2601 from an angle close to the content.

FIG. 26e shows the hemispherical mapping illustration 2601 from an angle close to the content.

Referring generally to FIG. 27, Cylindrical Mapping illustration 2701 shows a cylindrical representation of the viewer nodes 2403.

A cylindrical mapping would allow the producer to instantly see the distribution of viewers so that they could understand the angle and location of the viewers, just by glancing down from above.

FIG. 27a shows the cylindrical mapping illustration 2701 from an external angle.

FIG. 27b shows the cylindrical mapping illustration 2701 from the top angle.

FIG. 27c shows the cylindrical mapping illustration 2701 from an angle close to the content.

FIG. 27d shows the cylindrical mapping illustration 2701 from a side angle.

Depth Sensors as a Component of Bi-Directional Manual Robot/Drone Manipulation

One of the biggest challenges facing the real-time operation of remote drones and robots today is enabling operators to navigate the robot or drone safely through the environment. Correctly interpreting the video signal from a drone or remote robot is a specialist trained field.

Intuitively understanding the environment in which a remote drone or robot is operating is of vital importance, particularly in situations where time is not a luxury, such as during search and rescue operations. The time spent trying to navigate a chaotic environment can be negatively impacted by the need to operate through a two-dimensional interface like a standard computer display screen, which may not give the operator a full understanding of the features of the 3D environment, and may therefore slow the navigation process.

Displaying the environment around a robot, instead of communicating only the direct video feeds from sensors located on the robot, is becoming an increasingly popular option to aide in remote control and robotics. Fitting an operator of a robot or drone with a wearable display leads to a more natural control experience, promoting greater efficiency and accuracy during operation.

Through a wearable headset, even though a drone or robot may be controlled remotely by a human operator, the operator can be caused to perceive the environment as if they were in the same location as the remote device.

To create the 3D data showing the environment for the operator to experience, one or more depth sensors may be employed. These may be attached to the remote drone or robot, or they may be deployed separately and their data fed back to the operator for viewing.

Employing the visualisation and reconstruction techniques outlined in "Viewer Feedback and Analytics" above, an operator could be provided with a virtualized environment which is updated in real-time, which also contains perspectives unavailable to the position of any single sensor, by blending visual data received from two or more sensors. Sensors can present captured depth footage which would then be reconstructed such that one or more virtual cameras could roam about the reconstruction, presenting the operator with viewing angles that are independent of the location of the recording sensors.

Location which may be obscured by obstacles from one sensor may be visible to one or more other sensors, allowing the operator to view the location from one or more arbitrary positions. This improved 3D interface allows for more effective and accurate control than earlier approaches using traditional 2D cameras for visualisation and control of robots and drones.

Referring generally to FIG. 28, an example case in which mobile device 104 displays displayed content 105 and remotely manipulates an arm 2806, which is displayed as virtual arm 2803, is depicted.

Real-time control of robotics relates strongly to the sense of presence from the robot to the operator. If the operator has a true sense of understanding the environment around the robot, they can control the robot much more accurately. Typical real-time robot control interfaces are based around 2D cameras and displays. Sometimes, a control system will employ a heads up display (HUD) in combination with two cameras. This however limits the operator to only the view provided by the position of the cameras.

Employing one or more depth sensors 102 as part of the sensor suite on a remotely operated robot provides the ability to introduce many new options to the interface between operator and machine.

Sensor 102 is attached to remote manipulator arm 2806, as remote manipulator arm 2806 manipulates subject 101.

Mounting a single depth sensor 102 allows the operator to see the environment around the robot arm 2806 in full 3D. In some embodiments, established reconstruction techniques will allow the sensor 102 to build a static reconstruction of the environment that persists once the sensor 102 has been moved on to another part of that environment. In some embodiments, software tools that can analyse an environment and detect differences will be able to alert an operator to a potentially dangerous event occurring in environments too dangerous for humans, by comparing from one update to the next whether any detectable changes have occurred. Employing false-colour may help to alert an operator in identifying hazards that would otherwise be undetectable.

In some embodiments, a wearable device 106 may be used to display the content 105 and control arm 2806. Display left 229b of wearable device 106 displays left eye content 107 and left eye virtual manipulator 2809. These components are displayed from a different angle than those in display right 230b of wearable device 106. Right eye content 108 and right eye virtual manipulator 2810 when seen in conjunction with left eye content 107 and left eye manipulator 2809 create a stereoscopic view of the environment in front of remote manipulator arm 2806.

Reproducing the environment to the operator in stereoscopic vision would grant a sense of presence to the operator which would be far more immersive than existing techniques allow.

The previously covered issue of holes and coverage raised by only using one depth sensor 102 would be addressed by employing more than one sensor equipped robot, or more than one sensor 102 on a given robot. These other sensors 102 would provide the same benefits as the array outlined in FIGS. 15 and 16, and would be reconstructed on devices 104/106 employing the methods outlined in FIGS. 17 and 18.

In some embodiments, the sensor 102 of the drone or robot may comprise a remotely controllable, movable object, such as an arm or manipulator 2806. In this case, the position of the viewing device 104/106 relative to marker 233 may be used as a controller for the arm or manipulator. The operator may be able to control the position and attitude, of the manipulator 2806. Motions and rotations made by the viewing device would be mimicked by the drone or robot. This can be used to control the motion of the entire drone or robot, or designated sub-motions like an arm or manipulator.

The method for understanding the relative positions of the sensor and the trackable marker or real world is examined in relation to FIG. 10, employing inbuilt sensor 216b.

Referring generally to FIG. 29a, an illustration shows three Remote Manipulator Arms 2902, 2903 and 2904, each fitted with a depth sensor 102. These are being used to capture the subject 101 from more than one angle, providing the operator(s) with a much greater effective field of view of the subject 101 than a single sensor would provide.

This system would allow robots deployed to unpredictable locations such as collapsed buildings or other random locations to deploy their sensors 102 arbitrarily. This would allow the operators to be able to see behind obstructions, by leveraging the views of the other sensors 102.

Remote Manipulator Arm 2902, Remote Manipulator Arm 2903 and Remote Manipulator Arm 2904 are all operated by one or more operators viewing subject 101 on one or more devices 104/106. The view that the operator or operators see is either live, or reconstructed using virtual cameras. Subject 101 can be seen from any of the angles captured by the sensors 102, by any of the operators.

FIG. 29b shows a single Remote Manipulator Arm 2907 with two extra sensors 2908 and 2909 attached to it. These outlying sensors 2908 and 2909 provide a much wider field of view of Subject 101 to the operator, without the need for other operators.

FIG. 29c shows remotely operated vehicles (ROV) 2912 and 2913, each fitted with a depth sensor 102. These ROV's can be flying, submarine or any other kind of drone. In some embodiments, their control may be manual, each piloted by a different operator. In some embodiments, their control may be automatic, based on any one of a number of automated control techniques such as swarming, flocking or marker tracking. In some embodiments, their control may be through the process outlined in FIG. 28, employing positional and orientation feedback through the Augmented Reality viewing devices 104/106.

Once the three dimensional reconstruction of the environment in the sensor's views is available, the operator may employ camera virtualization to see the environment from angles unavailable to real cameras. Virtual cameras may be placed arbitrarily throughout the virtual reconstruction, paying no attention to real-world obstructions.

The method employed to create the virtual camera is described in FIG. 30 below.

Camera Virtualization

Depth recordings, by nature of the medium, typically store more information that is necessary or required for display to the viewer. This is due to the fact that multiple camera angles of the subject may be captured, while only one angle is required at the time of viewing the recorded content. Particularly with the advent of multiple sensor recordings, overlap between viewpoints contributes to large data size requirements, making typical depth data cumbersome to transfer or generally unsuited for mass networking.

With these concerns in mind, a virtual camera can be used to decrease the amount of data stored for a depth recording. The virtual camera may emulate a depth sensor positioned and aimed within an existing reconstruction of recorded or streaming data, may be used to simplify or refine the depth data to a more practical subset, by restricting the data to one camera angle. Advantages of a virtual camera scheme are that the amount of input data to be processed can be reduced to smaller subsets of data, and that the viewing angle of the content can be controlled, to allow for emphasis of specific regions or viewing angles.

Through addition or variation of virtual cameras, the data size of the content may be precisely controlled, facilitating distribution and storage concerns. Further, through use of viewer analytic data, virtual camera output may be targeted to the audience, placing the virtual camera in areas that are determined to be popular viewing locations for the content.

The areas of interest for a virtual camera's position and orientation can be generated using a system such as the one described above in "Viewer Feedback and Analytics". Data relating to viewer habits, such as attention heat maps and other data relating to viewing trends, can be used as input data to fine tune the position and angle of one or more virtual cameras. The viewer analytics can be provided to the virtual camera as a set of coordinates describing the positions and orientations of the viewing audience. Using these coordinates allows the virtual depth camera to create a volumetric dataset which satisfies the majority of the audience, by placing the virtual camera in a position that correlates to the most popular viewing angle of the content.

Figure 30:
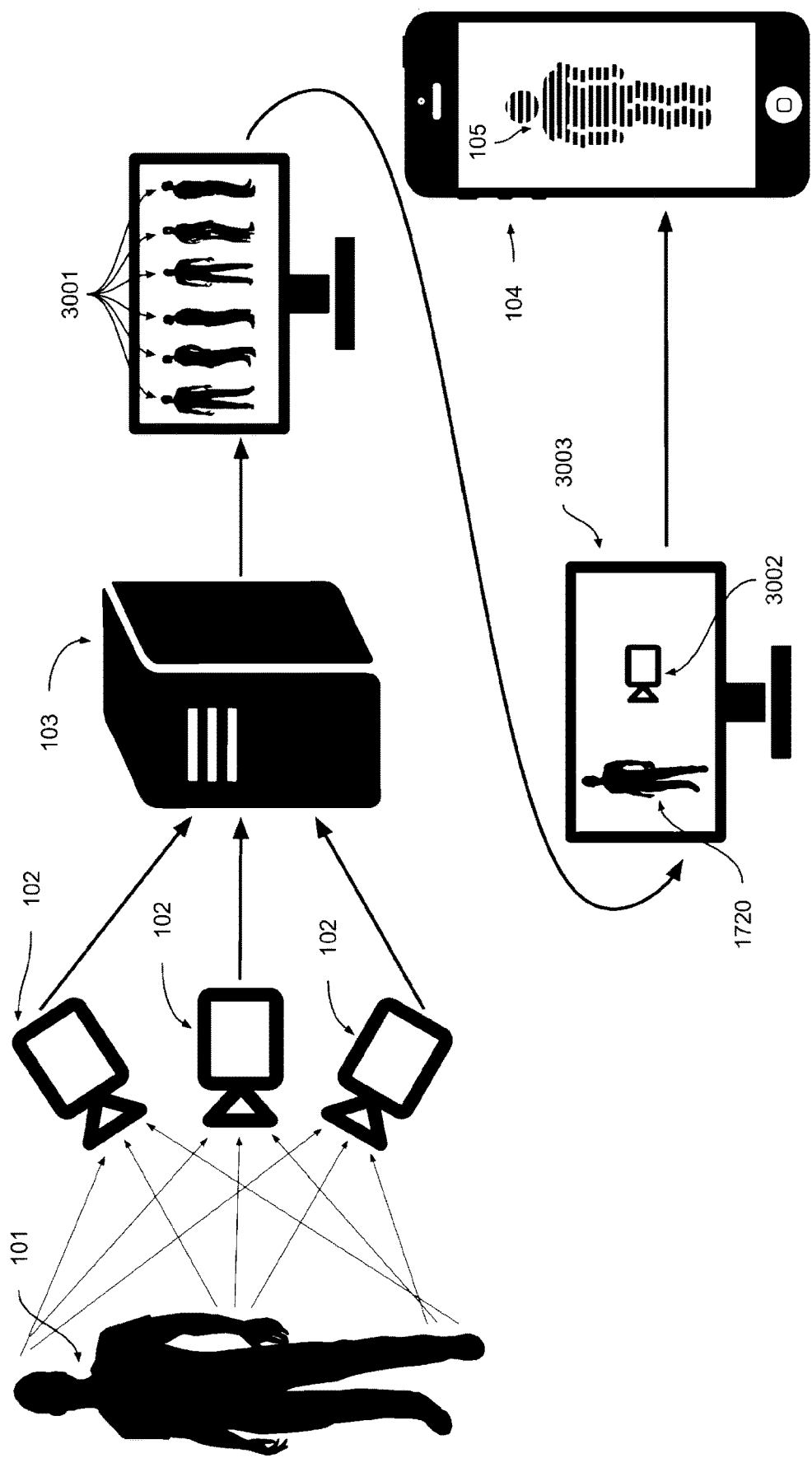
FIG. 30 is an overview of how multiple depth/colour sensor feeds can be compressed into a single depth/colour feed through using a virtual camera.

Referring generally to FIG. 30, a diagram outlining the use of a virtual camera 3002 is shown. When using one or an array of sensors 102 to cover a subject 101 from one or more than one angle, large amounts of data are quickly produced. To reduce the resource demands on the viewing device 104/106 and the processing requirements for reconstruction of skins, abstraction of the cameras provides benefits.

Once an array of sensors 102 is producing combined colour and depth data 208, all the data may be gathered by a processing network 103 which processes the data in preparation for a virtual recording by the virtual camera 3002. In some embodiments, there may be two or more sensors 102 producing data. The virtual camera processor (VCP) 3003 receives the colour and depth feeds 208 from the various sensors 102 and assembles them all into a single, coherently arranged skin 1720 using the techniques outlined in FIG. 17 and FIG. 18. The VCP 3003 may run on processing network 103, or on a computer, laptop, tablet, or any other computing device or combination of computing devices, for example.

Display data sets 3001 display skins generated based on data from each of the sensors 102. Coherently arranged skin 1720 shows the various recorded colour and depth data sets 3001 fully assembled. This assembly may use a dedicated desktop computer, distributed network of computers, one or more laptops, tablet, mobile devices or any other computing devices to process the bandwidth of data arriving from the various sensors in the array.

Virtual camera processor 3003 shows the coherently arranged skin 1720 and the virtual camera 3002. By rendering coherently arranged skin 1720 from an imaginary viewpoint, virtual camera 3002 converts the coherent arranged skin 1720 digitally, reproducing colour and depth information 208 from the coherently arranged skin 1720. Coherently arranged skin 1720 itself may be used as a skin analogous to a virtual sensor or camera 3002. Virtual Camera 3002 is directly analogous to sensor 102. In some embodiments, the virtual camera 3002 is guided as to the location and orientation from which to record by an operator. In some embodiments, the virtual camera 3002 may be guided by analytics or statistical modelling. This volumetric data may be broadcast to viewers who wish to view the content.

In some embodiments, more than one virtual camera 3002 would be used. This would create a virtual array feed that could be tuned using values not available to real-world sensors 102.

In some embodiments, the real-world array might be many hundreds of sensors 102. In some embodiments, the source footage may be derived from a virtual source, like a movie or computer game. In some embodiments, the data source may be a collection of data points.

In some embodiments, the virtual camera 3002 may be configured to output a signal which is compatible with established broadcast camera processing systems.

Figure 31:
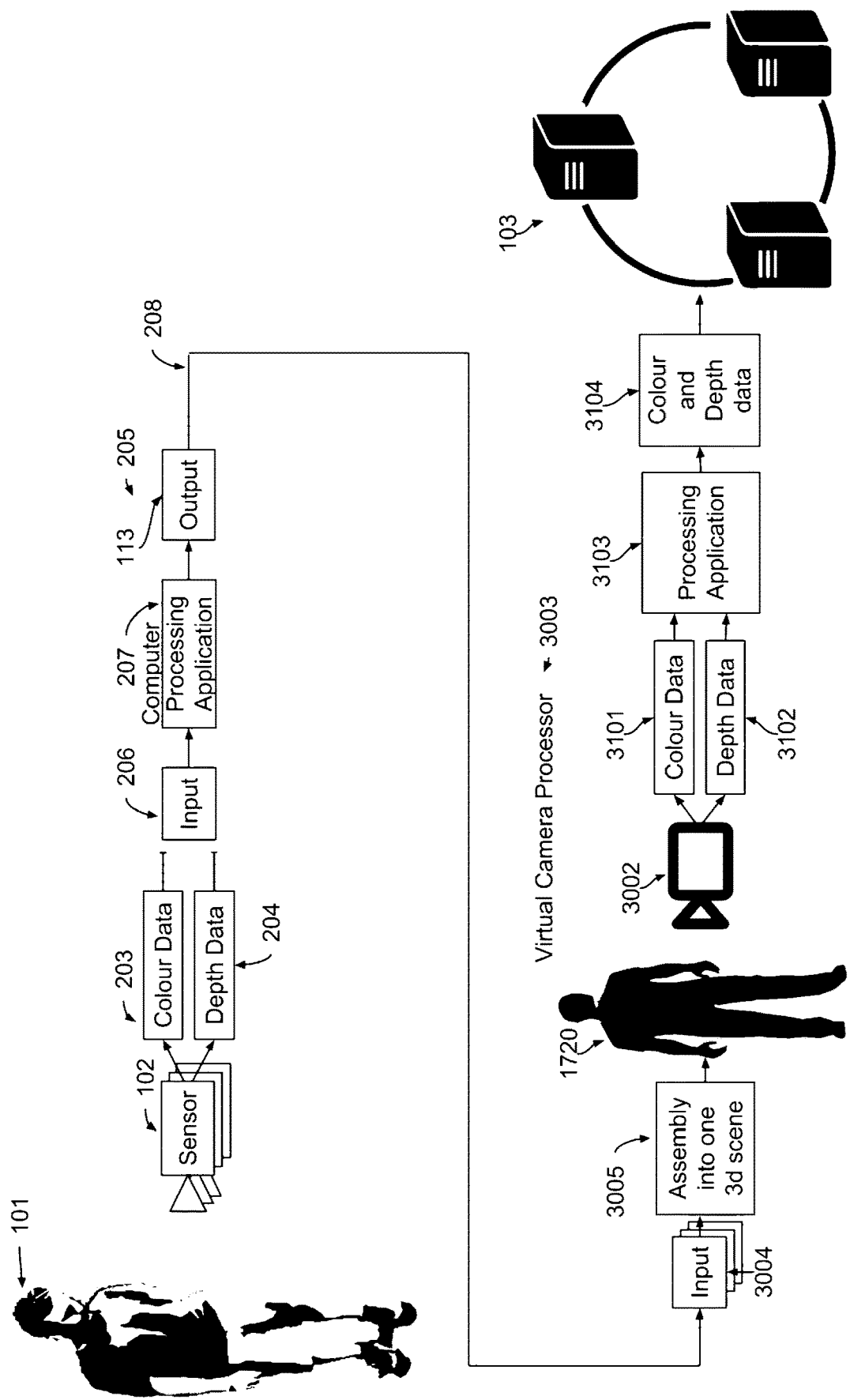
FIG. 31 is a more detailed examination of the method for using one or more virtual cameras to reduce the bandwidth requirements of a high quality volumetric reconstruction.

Referring generally to FIG. 31, a subject 101 is captured using an array of more than one sensor 102. This results in a volume of data far too high to process on a modern mobile device 104. The requirement is to reduce the data produced to as low a volume as possible, while still maintaining visual integrity.

A virtual camera 3002 is then used to reduce the resulting bandwidth for broadcasting. In some embodiments, one virtual camera 3002 will be used, resulting in a single depth and colour feed 208 to be broadcast to the viewer or viewers. In some embodiments, more than one virtual camera 3002 will be used, resulting in more than one depth and colour feed 208 to be broadcast to the viewer or viewers.

In this example subject 101 is captured by an array of more than one sensor 102. The colour data 203 and depth data 204 may be fed into an input module 206 of recording/processing device 205 for each sensor 102 in the array. In some embodiments, a single recording/processing device 205 or a distributed network of computers or one or more devices may serve the function of the recording/processing device 205. The data is processed in processing application 207 and then output to the virtual camera processor 3003 by output module 208. Input module 3004 of virtual camera processor 3003 accepts each frame from each recording/processing device 205 in the array of sensors 102. In some embodiments, input module 3004 may be a data input device such as a network port. In some embodiments, input module 3004 may be computer program code running on in a CPU of a computer or network of computers, or on a CPU of a tablet or other mobile computing device. These inputs are assembled into one coherently arranged skin 1720 at assembly module 3005. In some embodiments, assembly module 3005 may be computer program code which is running on the CPU of a local or remote computer, or on a local or remote network of computers. Virtual camera 3002 module then captures the depth 3102 and colour 3101 for processing in the processing application 3103 before it is output for transmission to processing network 103 by output module 3104. Virtual camera 3002 module is a set of computer program code which resides on a computer. In some embodiments, virtual camera 3002 module is a set of computer program code which is running on a CPU of a local or a remote computer, or on a CPU of a table or other mobile computing device. In some embodiments, virtual camera 3002 module is a set of computer code running on the CPUs of a local or remote network of computers, tablets or other mobile computing devices.

The VCP 3003 is a set of computer program code which may run on processing network 103, or on a computer, laptop, tablet, or any other computing device.

Figure 32:
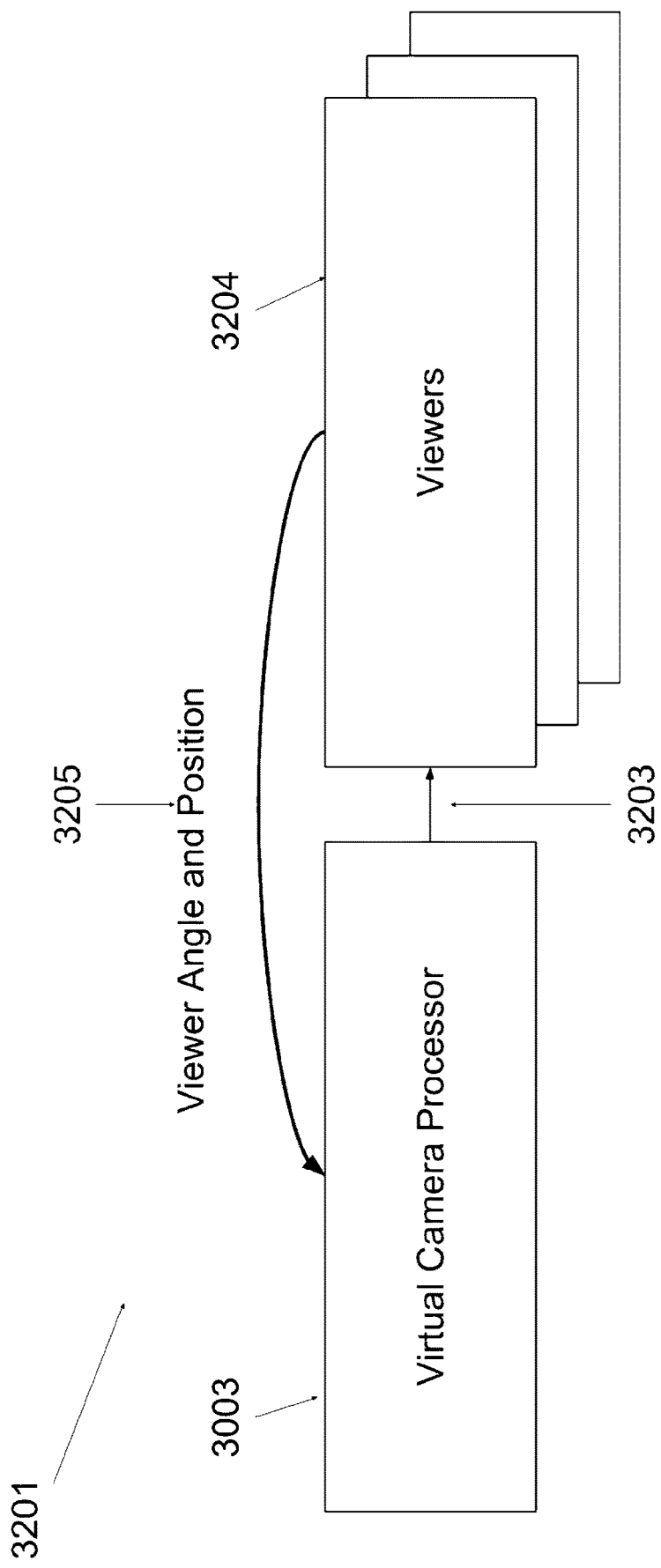
FIG. 32 blocks out the feedback mechanism used to reduce bandwidth requirements.

In some cases, mobile device 104 may be configured to provide virtual position and orientation feedback to a virtual camera processor 3003. FIG. 32 shows Viewer device 3204 orientation and position data 3205 being fed back to the virtual camera processor 3003. This can in turn alter the form or format of the virtual camera's footage 3203, which is sent to the viewer devices 3204. Through this iterative process, viewer devices 3204 define the areas of the originally captured footage that are focused on and enhanced by the VCP 3003.

As more viewers come online and view a given piece of content, the viewer's positions and orientations will leave a trail across the content using the method outlined in FIG. 25. This record will allow a specialised piece of software to map out the most important areas of that content.

The more important the area to the viewers, the more attention the virtual camera processor 3003 may give that area, resulting in certain areas of content 105 being captured in a higher resolution, for example. As the virtual camera processor 3003 pays attention to a given area more than another, it begins to alter the way the output combined depth and colour data 208 for that frame is composed. Areas of higher interest may be scaled up in the outgoing image. Areas of lower interest may be scaled down in the image. Data is received at the maximum available resolution based on the sensor 102 specifications. VCP 3003 may reduce, reorganize, reorder and/or alter the original data.

Use of this rescaling scheme allows for content to be delivered with selective detail from what may otherwise be a substantially larger dataset, allowing for minimal loss in content quality reduced data amounts.

Figure 33:
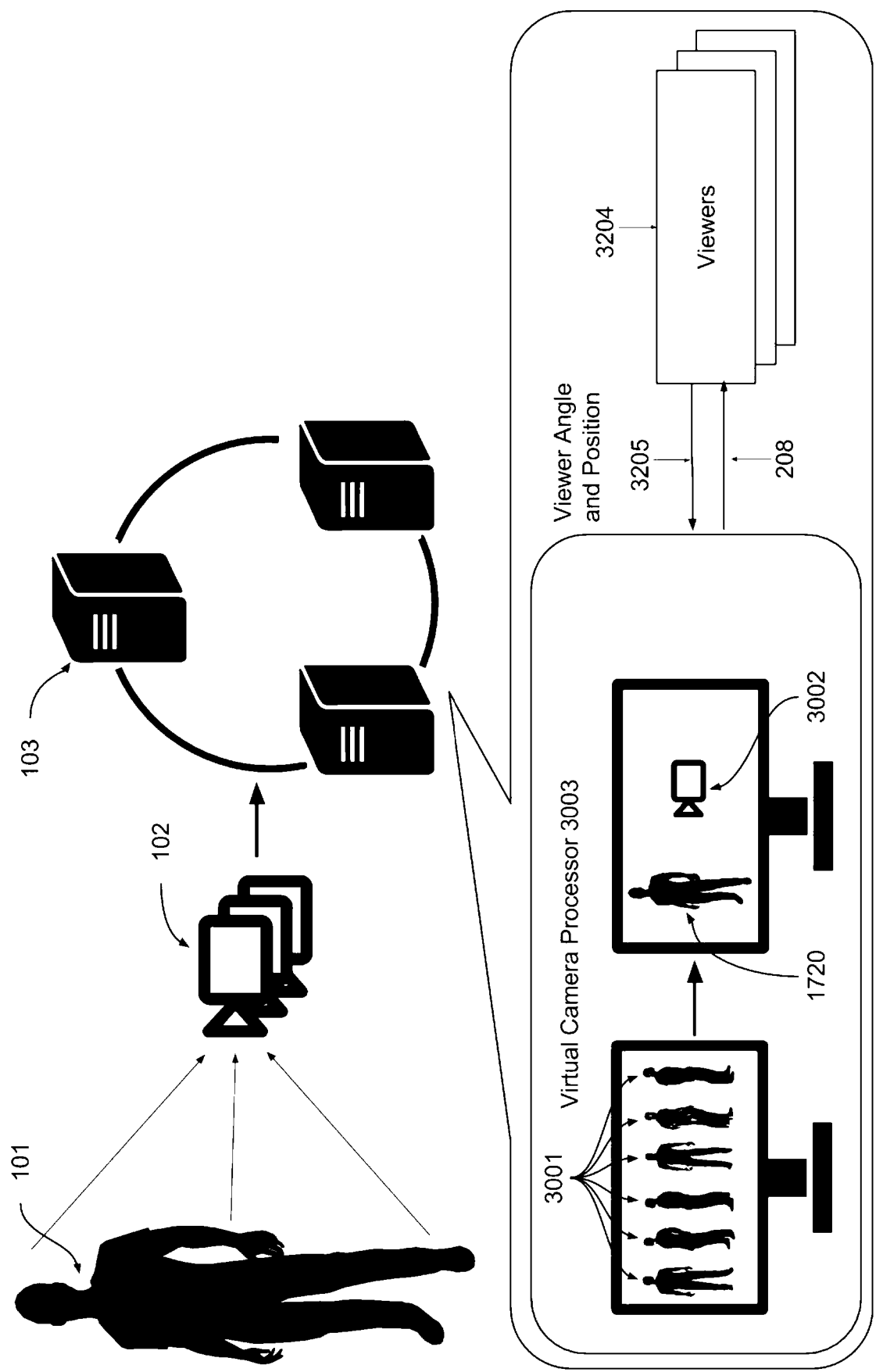
FIG. 33 illustrates how viewer angle and position is is fed back to the virtual camera for a more efficient render and reduced bandwidth.

Referring generally to FIG. 33, the iterative virtual camera feedback process shows subject 101 being captured by sensor array 102. Virtual camera processor 3003, being either a computer or distributed network of computers, tablet, mobile device or other device or collection of devices, receives the data from sensor array 102 or from virtual camera 3002 and combines the data sets 3001 into one coherently arranged skin 1720. Virtual camera 3002 is controlled by VCP 3003, which processes the viewer angle and positional data 3205 that is fed back from the actions of the viewer devices 3204. The VCP 3003 may run on processing network 103, or on a computer, laptop, tablet, or any other computing device. The VCP 3003 then decides how to direct the virtual camera 3002 using the methods outlined in FIG. 32 and FIG. 34, relying on data collected and aggregated using methods outlined in FIG. 25. The VCP 3003 then iterates through this process every update, which may be every frame in some embodiments, to fine-tune the virtual camera 3002's output to ensure the data 208 that is sent to viewer devices 3204 is delivered in an efficient way and has a high level of detail in areas determined by VCP 3003 to be of higher interest.

Figure 34:
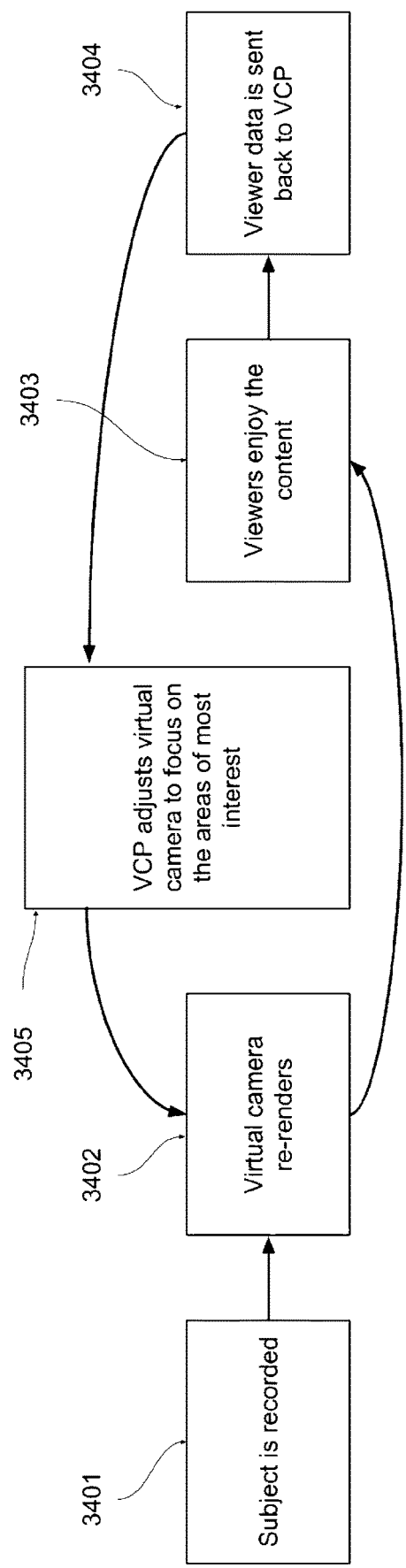
FIG. 34 blocks out how viewer position and rotation data can be fed back to the virtual camera processor in real time.

Referring generally to FIG. 34, the iterative process shows the feedback flow from the subject 101 being recorded at step 3401 to the recorded data being re-rendered by the virtual camera 3002 at step 3402. The output of the virtual camera 3002 goes to the viewer devices 3204 at step 3403, where their feedback is sent back to VCP 3003 at step 3404 and this dictates the way the VCP 3003 directs the virtual camera 3002 using the position and orientation data 3205 at step 3405.

This may act as a feedback loop. The location and orientation information 3205 gathered from the viewer's viewing habits is fed back to the virtual camera processor 3003. This information allows the VCP 3003 to employ the data as outlined in FIGS. 24 and 25 to allocate more resources towards the virtual camera 3002 to record those more trafficked areas over the areas that viewers are not paying as much attention to.

The longer this system is used per piece of content, the more accurate and efficient the results. When a piece of content first becomes available, there will be no analytical data available to the VCP 3003, preventing it from refining the virtual camera's attention. Even a single viewer may supply the VCP 3003 with enough data to begin weighting the virtual camera 3002 towards areas that the single viewer has paid more attention to. As more viewers come online, the pool of data available to the VCP 3003 will increase, increasing the efficiency of the virtual camera 3002.

The more the virtual camera 3002 uses this analytical data, the better it can adjust the virtualized colour and depth data 208 to make the most efficient use of the available bandwidth.

Figure 35:
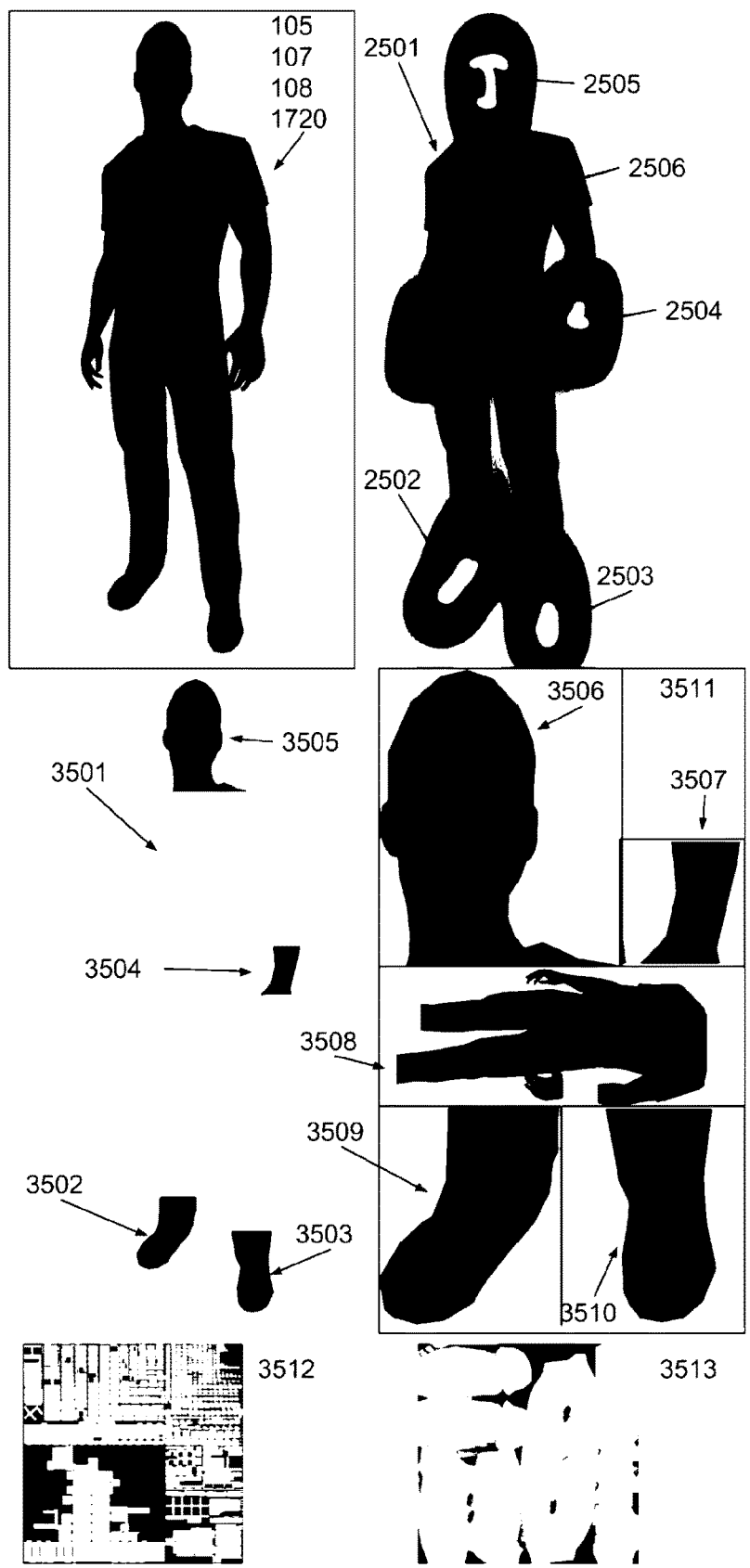
FIG. 35 shows how the virtual camera would be edited in an offline process to improve the resolution and reduce bandwidth at the highest possible efficiency.

Referring generally to FIG. 35, a method of dividing a frame based on either the aggregated feedback from collected viewer data, or the areas of interest defined by an operator, is shown.

Displaying content 105 or 107 and 108 or coherently arranged skin 1720 at the resolution of the recording may not be the most efficient use of a frame. Around the image there is a great deal of whitespace, and all areas of the recording of the subject 101 are of equal size relative to the real-world version of subject 101. While this makes for a consistent image, it does not take into account the areas of interest. Nor is it an efficient use of the image frame.

Heatmap 2501 along with areas of interest 2502, 2503, 2504 and 2505 show how in this example the areas of the content that were the most viewed have been aggregated and highlighted by the heatmap process outlined in FIG. 25. These are the areas that the VCP 3003 will pay the most attention to, by weighing more strongly for determining space in the contents distribution and layout, as described in FIGS. 30 through 35. Area 2506 is an area of the heatmap 2501 that shows less interest, and so is an area that VCP 3003 will be de-weighted and accordingly marked as lesser importance.

The VCP 3003 process recalculates the distribution of the contents of the image frame based on the information it receives from either the iterative viewer feedback or from the operator. Areas 3502, 3503, 3504 and 3505 show the areas of interest isolated and ready for redistribution. Area 3508 is the area of least interest, and so is isolated from the areas of greater interest.

Image frame 3511 shows a possible redistribution of the elements nominated in the process outlined above. Image component 3506 is the area designated 2505 in the heatmap 2501. This is a key area of interest, and so is expanded and given a great deal of image real estate to occupy. In other words, this area of the image is captured at a high resolution. This ensures that there are as many pixels dedicated to this portion of the content as possible, increasing quality for this section.

Image component 3507 is the area designated 2504 in the heatmap 2501. Along with image components 3509 and 3510, image component 3507 is also expanded and possibly rotated in the frame to ensure that it is of a high resolution, and is represented by a high number of pixels in the final frame. Though rotation may be avoided, it has been discovered that through rotation data-points may be better stored in more traditional container formats, as low-level data structures are usually weighted for content that may entirely be stored in a uniform-array or box—Accordingly, rotating pieces for optimal fit is a common strategy in the field of packing.

Image component 3508 is the area of least interest based on heat map 2501. Designated area 2506 in the heatmap 2501, image component 3508 is scaled and rotated to occupy less image area than the areas of interest 3506, 3507, 3509 and 3510. Where there would be image overlap, the areas of interest 3506, 3507, 3509 and 3510 are culled from component 3508, to avoid any of the image being stored more than once.

When the image frame 3511 is decoded on the display device 104/106, image components 3506, 3507, 3508, 3509 and 3510 are re-mapped back onto the skin 1720 using the same process as outlined above in FIG. 17. However, now the areas of greater interest are composed of more pixels per unit of area than the areas of less interest. This makes for a more clear resolution of the subject in those areas of interest, and a lower resolution in areas of less interest.

Further, packing techniques such as the one depicted in 3512 and 3513 are examples of other methods of subdividing, transforming and packing a texture for maximum image storage, processing and/or transmission efficiency. These are known techniques, and other techniques may be suitable for various applications of the packing process. The field of packing is the search for the most optimal way to store the most information. For example, packing will change based on the importance weighting of the various areas of interest in a given frame. It has been discovered that important factors when selecting a packing approach to be; scaling of content by weight to allow for non-uniform packing from the source data, rotation of elements, and allowing for wrapping containers which may allow for greater efficiency and data usage.

In some embodiments, weighting may be used to vary content quality in ways other than scaling, such as adjusting bitrate, container quality, or compression amount.

FIG. 36 shows an example of an offline version of virtual camera control. Referencing FIG. 36a, the process begins with the subject 101 being recorded at step 3601. This recording is processed offline at step 3602 by an operator, focusing the virtual camera processor 3003 only on the key points of the original content that the operator deems appropriate. The virtual camera 3002 re-renders the recording at step 3603. This is then sent on to the viewer devices 3204 at step 3604.

Once the subject 101 is recorded, the colour 203 and depth 204 data are processed by recording/processing device 205 and made available to an operator. Whether the processed footage is a coherently arranged skin 1720 or the result of a single sensor 102 recording, displayed content 105 or 107 and 108, there is still the matter of using the limited bandwidth that each viewer downloads as efficiently as possible.

Most forms of professionally created content tend to have the influence of an artist or editor who understands the "language" of the medium in question. These skills separate their refined work from raw, unedited footage. In that spirit, some content creators may want the ability to choose for their audience the most important aspects of their content.

They may want to define the areas of the content which are displayed at a higher quality than other areas, which they consider to be unimportant areas. In the same way that a director alters the focus of a camera, this feature will allow a skilled operator to "focus" the output of the virtual camera or cameras 3002 to accentuate the message they wish to send to the viewer.

This may be done according to the following method. The operator defines areas of the coherently arranged skin 1720 or displayed content 105 or 107 and 108 to be of greater interest to the VCP 3003 than other areas. This definition is marked by the operator selecting the desired area by virtually painting the area in the interface of the VCP 3003. This virtual painting may involve the VCP 3003 displaying a two dimensional representation of the footage, and allowing the operator to virtually paint it with the mouse or touch screen 3606 or any other input device as shown in FIG. 36b. In some embodiments, the designation of the areas of interest can be achieved through the operator using a mobile device 104 or wearable device 106, operating it as outlined in FIGS. 24 and 25. The operator's location and orientation marker 3605 would behave in exactly the same way as the location and orientation markers outlined in FIGS. 19 through 27 as shown in FIG. 36c. Tooltips 3607 might be displayed on the VCP 3003 to assist the operator in performing their task. As the only viewer entering data into the heatmap, the operator's data would be given absolute control over the behaviour of the virtual camera 3002, ensuring that their artistic decisions are reflected in the areas of the output that are given more bandwidth in the resulting output.

In some embodiments, the operator may use a hand-interface or gesture recognition device. In this case the operator's hands would be used to point, paint or otherwise indicate to the VCP 3003 which areas of the coherently arranged skin 1720 or the single skin of displayed content 105 or 107 and 108 to pay more attention to, using a camera communicating with VCP 3003 to capture the movement of the operator's hands, and a gesture recognition module running on VCP 3003 to identify the gestures used.

In FIG. 36d, heatmap 2501 along with areas of interest 2502, 2503, 2504 and 2505 show how in this example the areas of the content that were the most interesting to the operator are highlighted by the heatmap process. These areas will receive additional weight, and thus ultimately allocations of memory in the output container, as demonstrated in the example packing FIG. 36e.

The VCP 3003 process recalculates the distribution of the contents of the image frame based on the information it receives from the operator. Areas 3502, 3503, 3504 and 3505 show the areas of interest isolated and ready for redistribution. Area 3501 is the area of least interest, and so is isolated from the areas of greater interest. This redistribution is performed based on the process described above with reference to FIG. 35.

FIG. 36e shows a possible redistribution of the elements nominated in the process outlined above. Image component 3506 is the area designated 2505 in the heatmap 2501. This is a key area of interest as selected by the operator, and so is expanded and given a great deal of image real estate to occupy. In other words, this area of the image is captured at a high resolution. This ensures that there are as many pixels dedicated to this portion of the content as possible, increasing quality for this section.

Image component 3507 is the area designated 2504 in the heatmap. Along with image components 3509 and 3510, image component 3507 is also expanded and possibly rotated in the frame to ensure that it is of a high resolution, and is represented by a high number of pixels in the final frame.

Image component 3508 is the area of least interest based on the selections of the operator. Designated area 2506 in the heatmap 2501, image component 3508 is scaled and rotated to occupy less image area than the areas of interest, 3506, 3507, 3509 and 3510. The areas of interest 3506, 3507, 3509 and 3510 are culled from component 3508.

When the image frame 3511 is decoded on the display device 104/106, image components 3506, 3507, 3508, 3509 and 3510 are re-mapped back onto the skin 1720 using the same process as outlined above in FIG. 17. However, now the areas of interest are composed of more pixels per unit of area than the areas of less interest. This makes for a more clear resolution of the subject in those areas of interest, and a lower resolution in areas of less interest.

Although selected aspects have been illustrated and described in detail, it will be understood that various substitutions and alterations may be made therein without departing from the spirit and scope of the present invention.

The invention claimed is:

1. A machine-implemented method of combining at least a first depth data recording and a second depth data recording executed by at least one processing device, the method comprising:
   determining, by the processing device, a first viewing angle of a first depth data recording;
   determining, by the processing device, a second viewing angle of a second depth data recording; and
   generating a combined depth data recording comprising each of the first and second depth data recordings, wherein a visibility of each of the first and second depth data recordings within the combined depth data recording is determined by the processing device according to the first and second viewing angles, and wherein generating the combined depth data recording comprises generating a virtual object by reconstructing data derived from the first depth data recording and the second depth data recording, wherein the virtual object is constructed based on depth data recorded by a depth data sensor of a subject, and wherein the capture angle of the virtual object is the angle of the depth data sensor to the subject.

2. The method of claim 1, wherein each depth data recording comprises a plurality of depth data points.

3. The method of claim 2, wherein the plurality of depth data points are arranged into at least one set of plurality of depth data points that share a common viewing angle.

4. The method of claim 2, wherein the visibility of the each of the first and second depth data recordings within the combined depth data recording is altered by the processing device adjusting a display size of at least one of the plurality of depth data points.

5. The method of claim 1, wherein the virtual object is viewed against a background image stream being captured by the processing device in real time.

6. The method of claim 5, wherein a viewing angle of the virtual object is determined based on an angle between the processing device and a physical marker being captured by the processing device in real time.

7. The method of claim 6, wherein visibility of the virtual object is at a maximum when the viewing angle is at a normal to a capture angle of the component of the virtual object, and the visibility is at a minimum when the viewing angle is tangential to a capture angle of the component of the virtual object.

8. The method of claim 5, wherein a viewing angle of the virtual object is determined based on an angle between the processing device and a physical location being captured by the processing device in real time.

9. The method of claim 1, wherein the method is performed for more than one virtual object simultaneously.

10. The method of claim 1, wherein the first depth data recording and the second depth data recording are captured by a single depth data sensor, wherein the second depth data recording is captured based on depth data reflected from a surface.

11. A non-transitory computer-readable medium storing executable program code that, when executed by a computer, causes the computer to perform the method according to claim 1.

12. A system for combining at least a first depth data recording and a second depth data recording, the system comprising:
   a processing device having memory and a processor, the processing device being configured to determine a first viewing angle of a first depth data recording, to determine a second viewing angle of a second depth data recording, and to generate a combined depth data recording comprising each of the first and second depth data recordings, wherein a visibility of each of the first and second depth data recordings within the combined depth data recording is determined by the processing device according to the first and second viewing angles; and wherein to generate the combined depth data recording comprises the processing device being configured to generate a virtual object by reconstructing data derived from the first depth data recording and the second depth data recording, wherein the virtual object is constructed based on depth data recorded by a depth data sensor of a subject, and wherein the capture angle of the virtual object is the angle of the depth data sensor to the subject.

13. The system of claim 12, wherein each depth data recording comprises a plurality of depth data points, and wherein the visibility of the each of the first and second depth data recordings within the combined depth data recording is altered by the processing device adjusting a display size of at least one of the plurality of depth data points.

* * * * *